United States Patent [19]

Ito et al.

[11] Patent Number: 5,253,172
[45] Date of Patent: Oct. 12, 1993

[54] METHOD AND APPARATUS FOR LEARNING NEUTRAL POSITION OF VEHICLE STEERING ANGLE

[75] Inventors: Masayoshi Ito, Okazaki; Kiichi Yamada; Katsunori Otake, both of Nagoya; Yasunobu Miyata, Komaki; Masayuki Hashiguchi, Obu, all of Japan

[73] Assignee: Mitsubishi Jidosha Kogyo Kabushiki Kaisha, Tokyo, Japan

[21] Appl. No.: 645,043

[22] Filed: Jan. 23, 1991

[30] Foreign Application Priority Data

| Jan. 25, 1990 | [JP] | Japan | 2-13553 |
| Jan. 30, 1990 | [JP] | Japan | 2-17821 |
| Jan. 30, 1990 | [JP] | Japan | 2-17838 |
| May 16, 1990 | [JP] | Japan | 2-124289 |
| May 16, 1990 | [JP] | Japan | 2-124293 |
| May 18, 1990 | [JP] | Japan | 2-127016 |

[51] Int. Cl.⁵ .................... B62B 6/00; B62B 15/00
[52] U.S. Cl. .................... 364/424.05; 180/79; 180/79.1
[58] Field of Search .......... 364/424.05; 180/79, 180/142, 79.1; 318/565; 340/465, 475–477, 549, 672

[56] References Cited

U.S. PATENT DOCUMENTS

| 4,455,759 | 6/1984 | Coetsier | 33/288 |
| 4,633,214 | 12/1986 | Miyata et al. | |
| 4,640,557 | 2/1987 | Panizza et al. | 303/100 |
| 4,685,528 | 8/1987 | Suzuki et al. | 180/79.1 |
| 4,719,981 | 1/1988 | Miyoshi | 180/140 |
| 4,779,202 | 10/1988 | Leiber | 364/426.03 |
| 4,914,366 | 4/1990 | Yuasa et al. | 318/612 |

OTHER PUBLICATIONS

Patent Abstracts of Japan, unexamined application, M Field, vol. 7, No. 141, Jun. 21, 1983, pp. 130 M 223, Kokai No. 58-54 270.

Primary Examiner—Jack B. Harvey
Assistant Examiner—Edward Pipala
Attorney, Agent, or Firm—Webb, Burden, Ziesenheim & Webb

[57] ABSTRACT

A method and apparatus for learning the neutral position of vehicle steering angle, in which first neutral position decision means decides that the steering shaft is at a neutral position when a running speed detector detects that the vehicle speed is not less than a predetermined threshold level, that the difference in peripheral speed between the right and left drive wheels is smaller than a predetermined first straight-running threshold value and also when a steering shaft reference position sensor continues to detect a reference position of the steering shaft for at least a first count time. The vehicle steering angle is computed on the basis of the angular displacement from the neutral position thus learned.

12 Claims, 29 Drawing Sheets

| GEAR SHIFT POSITION | $\rho_{KI}$ | $\rho_{KP}$ | $\rho_T$ |
|---|---|---|---|
| 1ST SPEED | 1.0 | 1.0 | 1.0 |
| 2ND SPEED | 0.7 | 0.7 | 1.5 |
| 3RD SPEED | 0.7 | 0.7 | 0.5 |
| 4TH SPEED | 0.7 | 0.7 | 1.5 |
| REVERSE | 1.0 | 1.0 | 1.0 |

METHOD AND APPARATUS FOR LEARNING NEUTRAL POSITION OF VEHICLE STEERING ANGLE

TECHNICAL FIELD

The present invention relates to a method and apparatus for learning the neutral position of steering angle for accurately effecting the turning or slip control of the automotive vehicle.

BACKGROUND ART

A vehicle running on a curved path develops therein a centrifugal force, that is, a lateral acceleration corresponding to the running speed in the direction perpendicular to the direction of running.

In the case where the running speed is excessively high compared with the radius of curvature of the path, the wheels of the vehicle skid out of the path into the footway or the opposite lane, or in the worst case, the vehicle may even turn over. In order to prevent such a problem, it is common practice for the driver to decelerate the vehicle immediately before a curved path, followed by a gradual acceleration in what is called the "slow-in fast-out" driving technique. A curved path of which it is impossible to confirm the other end thereof, or what is called a "blind curve" or the like, however, often has a radius steadily decreasing. In such a situation, a very high driving technique is required.

On the other hand, certain types of vehicle tend to exhibit the trend of "understeering" in which the driving traces are increased in radius for the same steering angle if the vehicle is accelerated from a state of turning along a normal circle. In such a vehicle, it is necessary to increase the steering angle steadily with lateral acceleration. When the lateral acceleration exceeds a predetermined value (critical value) specific to the vehicle, however, the maneuvering is known to become difficult or impossible. A typical vehicle of such type includes a front-engine front-drive vehicle or what is called the F.F vehicle having maneuvering wheels doubling as driving wheels. In recent years, the trend has been more and more toward the F.F system, especially for passenger cars in order to maintain an advantageous position in the spaciousness of the cabin (underfoot space) or the like.

If the lateral acceleration is to be prevented from exceeding a critical value, it is essential that the driver know the radius of curvature of a curved path and adjust the driving force appropriately by accelerator pedal. For unskilled drivers, however, it is very difficult to finely control the amount of force on the accelerator pedal in face of a blind curve or the like.

In view of this situation, various types of driving force control systems have so far been suggested for reducing the driving force of a vehicle automatically before it becomes difficult or impossible to turn. Many of these systems are so constructed that the engine output or unit power is reduced in accordance with the magnitude of rolling of the vehicle body or the like without being interlocked with the amount of force on the accelerator pedal. Specifically, in view of the fact that a vehicle while turning always develops a rolling due to the lateral acceleration which increases with the running speed, the amount of rolling is detected by height sensors or the like mounted on the right and left sides of the vehicle body to reduce the engine output. In another system, the engine output is reduced by detecting the amount of irregular body swing, that is, yawing.

In the above-described driving force control system, after the rolling or the like phenomenon occurs, a TCL (Traction Calculate Unit) computes an optimum drive torque on the basis of the amount of rolling and an ECU (Electronic Control Unit) controls the output of the engine accordingly.

This control system, however, has the following disadvantage: In a situation where the rolling sharply increases, for example, the output control may be delayed, or what is called "hunting motion" is liable to occur in which the cancellation of control after a rolling may cause another rolling, thus requiring another output control.

Under these circumstances, a control system has been closely watched in which the driving force is controlled in accordance with a stability factor (a specific value determined from suspension and tire rigidity) as well as the running speed and steering angle. This driving force control system, in which a data associated with the moment of the driver operating the steering wheel is applied to the ECU, is capable of controlling engine output (in what is called an advance control) before occurrence of an excessive rolling or the like phenomenon. The steering angle indispensable for this control operation is usually based on the neutral position of the front wheels, that is, the steering shaft stored in a RAM (Random Access Memory). The displacement from this neutral position is detected by a steering angle sensor using a slit plate and a phototransistor mounted on the steering shaft, and is applied to the ECU.

The amount of steering for bringing the steering wheel to the position of full steering, that is, the number of revolutions required for lock-to-lock operation is several (generally, 2.5 to 3 revolutions). Even in the case where a slit or the like is formed at the neutral point on the slit plate of the steering angle sensor, therefore, a stationary steering operation with the battery or wiring removed (such as at the time of maintenance) often causes the neutral position to be displaced by one revolution from the normal state. Also, the neutral positions of the steering shaft and the front wheels naturally undergo a change when the gears in the steering unit are worn out or at the time of toe-in adjustment while the vehicle is under repair. As a result, the apparent angle of turning the steering wheel may sometimes differ from the actual steering angle in a minor order.

If the vehicle is driven under this condition, the output control fails to be effected as necessary, with the result that the vehicle falls into a dangerous situation or a small turn of the steering wheel may reduce the output, thus making it impossible for the driver to maneuver the vehicle by his or her own will.

SUMMARY OF THE INVENTION

An object of the present invention is to provide a method and apparatus for learning the neutral position of steering angle in which the neutral position of the steering shaft is learned and corrected during the driving thereby to supply an accurate steering angle data to the ECU.

According to one aspect of the present invention, there is provided a method of learning the neutral position of the vehicle steering angle, comprising a steering shaft reference position sensor for detecting a reference position of the steering shaft, and running speed detection means for detecting the peripheral speeds of the right and left driven wheels and the running speed of the vehicle, the steering angle being decided as being on a neutral position by first neutral position decision means when the vehicle speed is not less than a predetermined threshold level, when the difference in peripheral speed between the right and left driven wheels is smaller than a predetermined first straight-running threshold value and also when the steering shaft reference position sensor continues to detect a reference position of the steering shaft for at least a first count time.

According to a second aspect of the present invention, there is provided an apparatus for learning the neutral position of the steering angle of the vehicle, comprising a steering shaft reference position sensor for detecting the reference position of the steering shaft, running speed detection means for detecting the peripheral speeds of the right and left driven wheels and the running speed of the vehicle, and first neutral position decision means for deciding a neutral position when the vehicle speed produced from the running speed detection means is higher than a predetermined threshold level, when the difference between the peripheral speeds of the right and left driven wheels is smaller than a predetermined first straight-running threshold level, and at the same time, when the steering shaft reference position sensor continues to detect the reference position of the steering shaft for at least a first count time.

According to the present invention, even when the information on the neutral position stored in a RAM is erased or runs out of order due to a vehicle stoppage or maintenance requirement, the rotational angle of a rotative member, that is, the steering shaft comes to be learned as a neutral position after the lapse of a predetermined length of time covered by the vehicle running straight at higher than a predetermined speed, and the angular displacement from the neutral position is subsequently used for computing the steering angle of the vehicle.

The above and other objects, features and advantages of the invention will be made apparent by the detailed description taken below in conjunction with the accompanying drawings.

DESCRIPTION OF THE PREFERRED EMBODIMENTS

Figure 1:
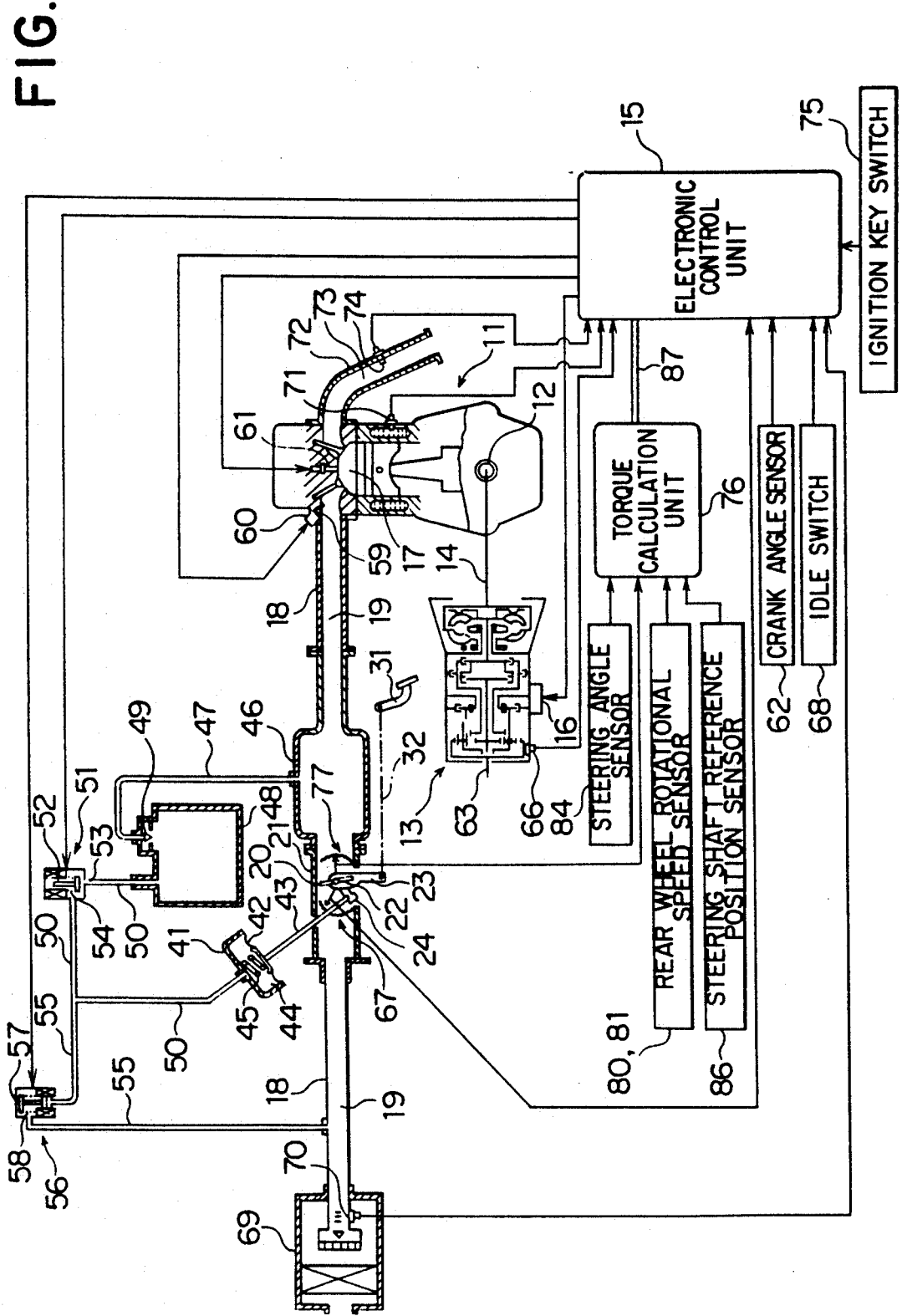
FIG. 1 is a schematic diagram showing a concept of an embodiment of the present invention in which a vehicle output control system according to the present invention is applied to a vehicle of front wheel drive type having built therein a hydraulic automatic transmission of four forward and one reverse shift.
Figure 2:
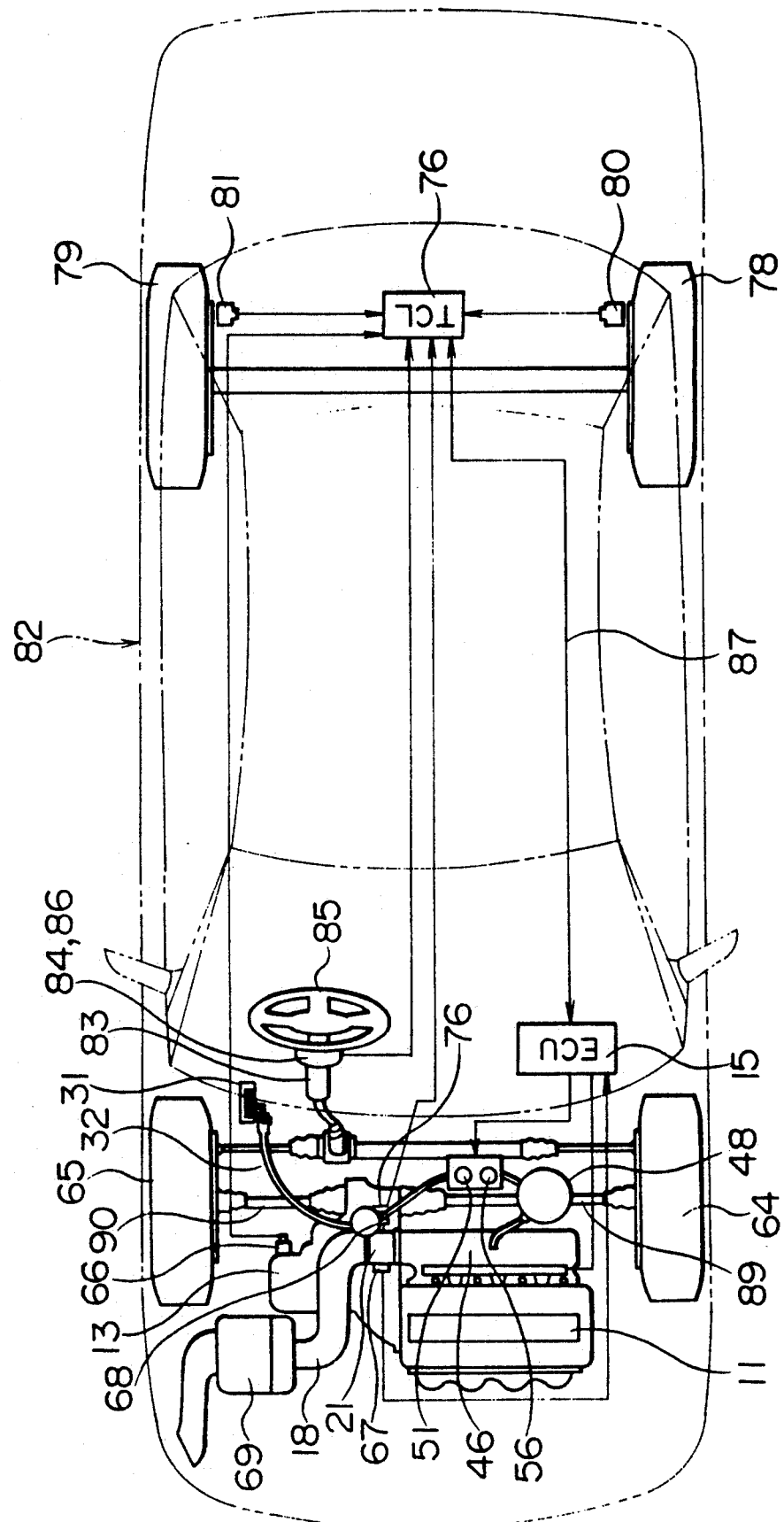
FIG. 2 is a diagram showing a general configuration embodiment of FIG. 1.

The present invention will be explained with reference to FIG. 1 showing a concept of an embodiment in which an output control system for vehicles according to the invention is applied to a vehicle of front wheel drive type having built therein an automatic transmission of four forward and one reverse shift range, and FIG. 2 showing a general construction of the particular type of vehicle. As shown in these diagrams, an output shaft 12 of an engine 11 is connected with an input shaft 14 of an automatic transmission 13. This automatic transmission 13 of oil-hydraulic type is adapted to automatically select a predetermined shift position through hydraulic control means 16 on the basis of a command from an electronic control unit (hereinafter referred to as the "ECU") for controlling the operating conditions of the engine 11 in accordance with the position selected by the driver of a select lever not shown and the operating conditions of the vehicle. A specific configuration, functions and the like of this hydraulic automatic transmission are well known as disclosed in JP-A-58-54270 and JP-A-61-31749. The hydraulic control means 16 have built therein a pair of shift control solenoid valves not shown for making and breaking a plurality of frictional engaging elements making up a part of the hydraulic automatic transmission 13. The turning on and off of these shift control solenoid valves are controlled by the ECU 15, thereby smoothly achieving the speed change operation to a given gear position within the four forward and one reverse shift range.

Figure 3:
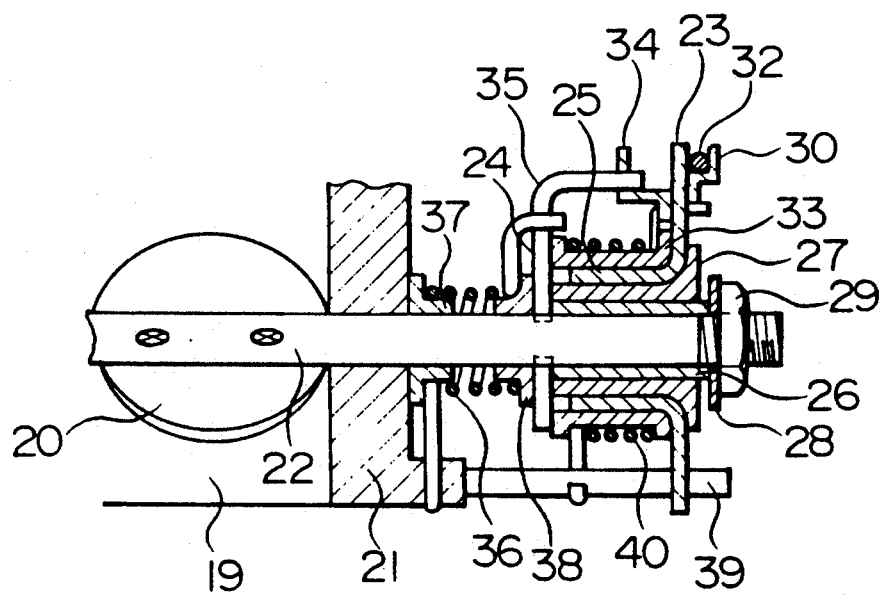
FIG. 3 is a sectional view showing a drive mechanism of the throttle valve used with the same embodiment.

A throttle body 21 incorporating a throttle valve 20 therein is mounted midway of an intake pipe 18 connected to a combustion chamber 17 of the engine 11 for changing the opening degree of an intake path 19 formed of the intake pipe 18 and thereby regulating the amount of intake air supplied into the combustion chamber 17. As seen from FIG. 1 and FIG. 3 showing an enlarged sectional view of the structure of a part of the cylindical throttle body 21, the throttle body 21 has rotatably supported thereon ends of the throttle shaft 22 fixed integrally with the throttle valve 20. An end of the throttle shaft 22 projected into the intake air path 19 is coaxially fitted with an acceleration lever 23 and a throttle lever 24.

A bushing 26 and a spacer 27 are interposed between the throttle shaft 22 and a cylindrical portion 25 of the acceleration lever 23, whereby the acceleration lever 23 is rotatable against the throttle shaft 22. Further, a washer 28 and a nut 29 mounted at an end of the throttle shaft 22 prevent the acceleration lever 23 from coming off from the throttle shaft 22. Also, a cable support 30 integral with the acceleration lever 23 is connected with the accelerator pedal 31 operated by the driver through a cable 32, so that in accordance with the amount of step-on of the accelerator pedal 31, the acceleration lever 23 is rotated against the throttle shaft 22.

The throttle lever 24, on the other hand, is fixed integrally with the throttle shaft 22, and therefore by operating the throttle lever 24, the throttle valve 20 is rotatable with the throttle shaft 22. Also, the cylindrical portion 25 of the acceleration lever 23 is coaxially fitted with a collar 33, and the forward end of said throttle lever 24 has formed there at a stopper 35 engageable with a pawl 34 formed at a part of the collar 33. The pawl 34 and the stopper 35 are set in such relative positions as to engage each other when the throttle lever 24 is rotated in a direction to open the throttle valve 20 or the acceleration lever 23 is rotated in a direction to close the throttle valve 20.

Between the throttle body 21 and the throttle lever 24, there is interposed a torsion coil spring 36 for pressing the stopper of the throttle lever 24 against the pawl 34 of the collar 33 integral with the acceleration lever 23 in such a direction as to open the throttle valve 20. This torsion coil spring 36 is mounted coaxially with the throttle shaft 22 through a pair of cylindrical spring supports 37, 38 fitted in the throttle shaft 22. Also, intermediate a stopper pin projecting from the throttle body 21 and the acceleration lever 23, there is interposed a torsion coil spring 40 for energizing by pressing the pawl 34 of said collar 33 against the stopper 35 of the throttle lever 24 in such a direction as to close the throttle valve 20. This torsion coil spring 40, in order to give a detent feeling to the accelerator pedal 31, is mounted on the cylindrical portion 25 of the acceleration lever 23 coaxially with the throttle shaft 22 through said collar 33.

The forward end of said throttle lever 24 has coupled thereto the forward end of a control bar 43 with the base thereof fixed on a diaphragm 42 of an actuator 41. A pressure chamber 44 formed in the actuator 41 has built therein a compression coil spring 45 for pressing the stopper 35 of the collar 33 together with said torsion coil spring 36 against the pawl 34 of the acceleration lever 23 and urging the same in such a direction as to open the throttle valve 20. The spring force of the torsion coil spring 40 is set to a value larger than the sum of the spring forces of the two springs 36, 45, so that the throttle valve 20 may not be opened until the accelerator pedal 31 is depressed.

A surge tank 46 forming a part of the intake path 19 connected to the downstream side of the throttle body 21 communicates with a vacuum tank 48 through a connecting pipe 47. Between the vacuum tank 48 and the connecting pipe 47, a check valve 49 is mounted for allowing only the air to move from the vacuum tank 48 toward the surge tank 46. As a consequence, the pressure in the vacuum tank 48 is set to a negative level substantially equal to the minimum pressure in the surge tank 46.

The interior of the vacuum tank 48 communicates with the pressure chamber 44 of said actuator 41 through the pipe 50, midway of which there is disposed a first torque control solenoid valve 51 adapted to close under non-energized state. In other words, the torque control solenoid valve 51 has built therein a spring 54 for urging the plunger 52 toward the valve seat 53 in such a manner as to close the pipe 50.

The pipe 50 interposed between said first torque control solenoid valve 51 and the actuator 41 is connected with a pipe 55 communicating with the intake path 19 upstream of the throttle valve 20. A second control solenoid valve 56 adapted to open under non-energized state is disposed midway of the pipe 55. In other words, a spring 58 for energizing the plunger 57 is built in the torque control solenoid valve 56 to open the pipe 55.

The two torque control solenoid valves 51, 56 are connected with the ECU 15 respectively, and the on-off operation of energization of the torque control solenoid valves 51, 56 is subjected to duty control in accordance with a command from the ECU 15. According to the present embodiment, the whole of these functions makes up torque reduction means according to the present invention.

In the case where the duty factor of the torque control solenoid valves 51, 56 is 0%, for instance, the pressure chamber 44 of the actuator 41 is at the atmospheric pressure substantially equal to the pressure in the intake pipe 19 upstream of the throttle valve 20, with the result that the opening of the throttle valve 20 corresponds one-by-one to the amount of step-on of the accelerator pedal. If the duty factor of the torque control solenoid valves 51, 56 is 100%, by contrast, the pressure level in the pressure chamber 44 of the actuator 41 assumes a negative value substantially equal to the pressure in the vacuum tank 48, thereby pulling up the control bar obliquely leftward in FIG. 1. As a result, the throttle valve 20 is closed regardless of the amount of depression of the accelerator pedal 31, thereby forcibly reducing the drive torque of the engine 11. By adjusting the duty factor of the torque control solenoid valves 51, 56 in this way, and thus changing the opening degree of the throttle valve 20 without regard to the amount of depression of the accelerator pedal 31, the drive torque of the engine 11 is capable of being regulated.

Also, instead of controlling the opening degree of the throttle valve 20 by the accelerator pedal 31 and the actuator 41 at the same time like in the present embodiment, the throttle valves in the intake path 19 may be arranged in series, one connected to the accelerator pedal 31 alone and the other to the actuator 41 alone, and controlled independently of each other.

At the extreme downward end of the intake pipe 18, there are provided fuel injection nozzles 59 of fuel injection means for blowing fuel (not shown) into the combustion chamber 17 of the engine 11 corresponding to each cylinder (a four-cylinder internal combustion engine is assumed according to the present embodiment). Fuel is thus supplied to the fuel injection nozzle 59 through the solenoid valve 60 controlled with duty factor by the ECU 15. More specifically, the valve-opening time of the solenoid valve 60 is controlled thereby to adjust the amount of fuel supplied to the combustion chamber 17, so that the spark plug 61 is ignited in the combustion chamber 17 under a predetermined air-fuel ratio.

The ECU 15 is connected with a crank angle sensor 62 mounted on the engine 11 for detecting the engine r.p.m., a front wheel rotational speed sensor 66 for detecting the rotational speed of the output shaft 63 of said hydraulic automatic transmission 13 and computing the mean peripheral speed of the pair of the front wheels 64, 65, a throttle opening sensor 67 mounted on the throttle body 21 for detecting the opening degree of the throttle lever 24, an idle switch 68 for detecting the closed-up state of the throttle valve 20, an air flow sensor 70 such as s Karman vortex meter built in the air cleaner 69 at the forward end of the intake pipe 18 for detecting the air amount flowing to the combustion chamber of the engine, a water temperature sensor 71 built on the engine 11 for detecting the temperature of the cooling water of the engine 11, and an ignition key switch 75 and an exhaust gas temperature sensor 74 built in midway of the exhaust pipe 72 for detecting the temperature of the exhaust gas flowing in the exhaust path 73.

The ECU 15 is supplied with output signals from the crank angle sensor 62, the front wheel rotational speed sensor 66, the throttle opening sensor 67, the idle switch 68, the air flow sensor 70, the water temperature sensor 71, the exhaust gas temperature sensor 74 and the ignition key switch 75.

A torque calculation unit (hereinafter referred to as "TCL") 76 for computing a target drive torque of the engine 11 is connected with an acceleration lever opening sensor 77 mounted on the throttle body 21 together with said throttle opening sensor 67 and the idle switch 68 for detecting the opening degree of the acceleration lever 23, the rear wheel rotational speed sensors 80, 81 for detecting the rotational speed of a pair of the rear wheels 78, 79 which are driven wheels, a steering angle sensor 84 for detecting the turning angle of the steering shaft 83 at the time of turning with reference to the straight-running condition of the vehicle 82, and a steering shaft reference position sensor 86 for detecting the normal phase (including such a phase as to make the vehicle substantially in straight-running state) for each 360 degree of the steering wheel 85 integral with the steering shaft 83. Output signals from these sensors 77, 80, 81, 84 and 86 are supplied to the torque calculation unit 76.

Figure 37:
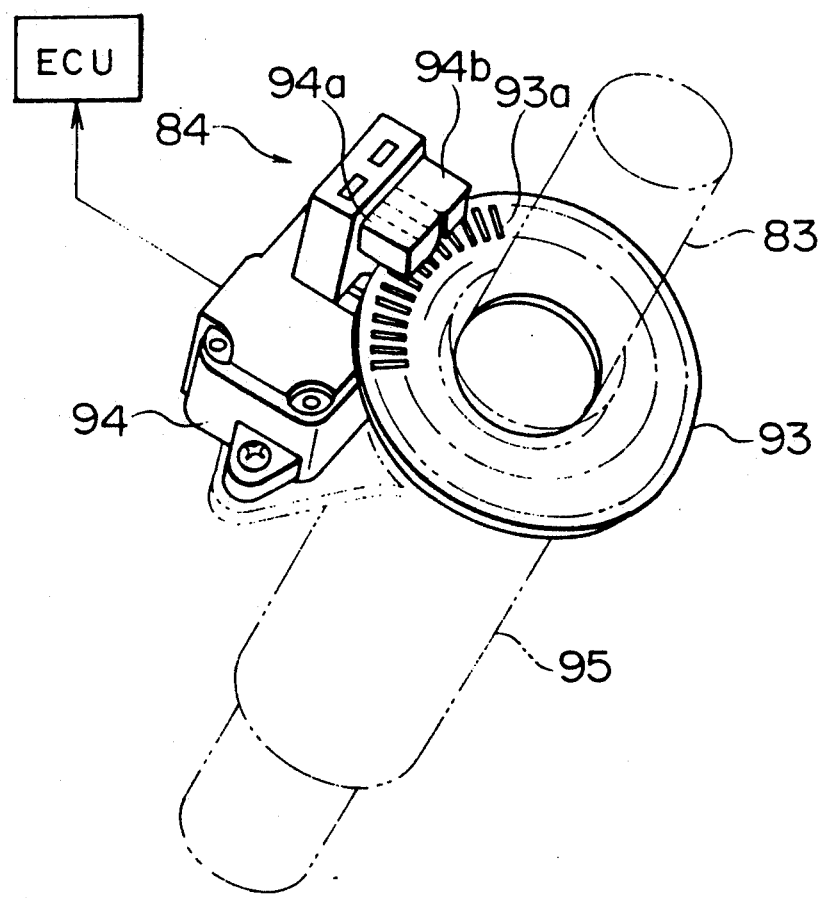
FIG. 37 is a perspective view showing a steering angle sensor in enlarged form.

The steering angle sensor 84, as shown in FIG. 37, includes a slit plate 93 and a rotational angle detector 94. The slip plate 93, which is adapted for rotating integrally with the steering shaft 83, has a multiplicity of slits 93a formed in the outer periphery thereof. The rotational angle detector 94 is fixed on a steering column 95, and has two photo-interrupters 94a, 94b mounted in such a position as to hold the slit plate 93 therebetween on the upper portion thereof. The steering angle sensor 84, which has a resolution in 5-degree units, is capable of detecting also the rotational direction of the steering shaft (clockwise or counterclockwise).

The ECU 15 and the TCL 76 are connected to each other by a communication cable 87. The TCL 76 is supplied with the information on the operating conditions of the engine 11 such as the engine speed, the r.p.m. of the output shaft 63 of the hydraulic automatic transmission 13 and the detection signal of the idle switch 68 from the ECU 15. Conversely, the TCL 76 sends to the ECU 15 a target drive torque computed in the TCL 76 and the information on the retardation rate of ignition timing.

According to the present embodiment, two target drive torques of the engine 11 are computed by the TCL 76: One is associated with the control (hereinafter referred to as the "slip control") effected for securing the maneuverability by reducing the drive torque of the engine 11 while at the same time preventing energy loss in the case where the longitudinal slip of the front wheels 64, 65 providing driving wheels increases beyond a predetermined amount, and the other relates to the control (hereinafter referred to as the "turning control") effected for reducing the drive torque of the engine 11 to prevent a vehicle from displacing out of the curved path while turning in the case where the acceleration in lateral direction (hereinafter referred to as the "lateral acceleration") developed in the vehicle exceeds a predetermined value. An optimum final target drive torque is selected from these two target drive torques, thereby reducing the drive torque of the engine 11 in accordance with the actual requirements. Also, in case the output reduction of the engine 11 is delayed, a target retardation angle of ignition timing is set, in order to reduce the drive torque of the engine 11 rapidly by closing up the throttle valve 20 through the actuator 41.

Figure 4:
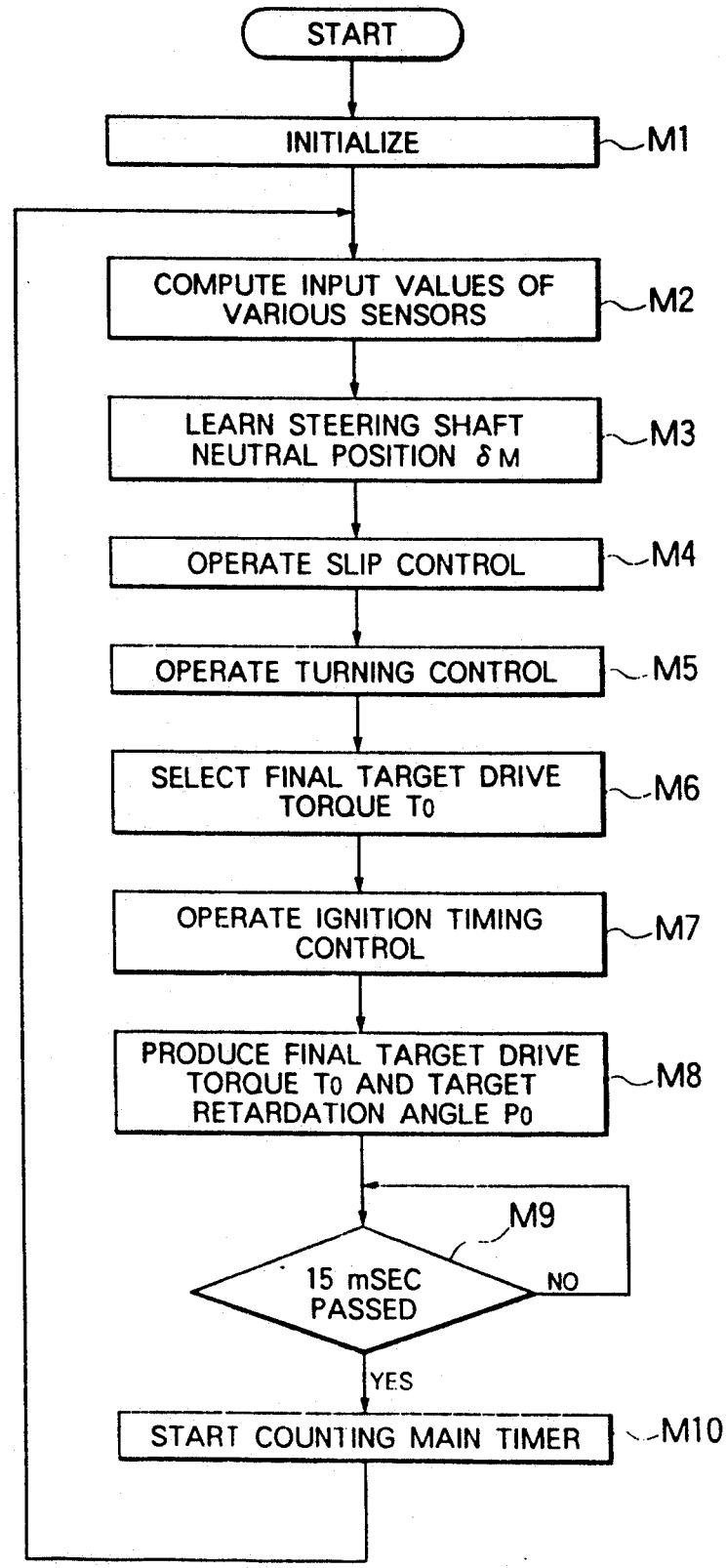
FIG. 4 is a flowchart representing a general flow of control according to the same embodiment.

As seen from FIG. 4 showing a general flow of control according to the present embodiment, the target drive torque $T_{os}$ of the engine 11 associated with slip control is always computed by the TCL 76 in parallel to the target drive torque $T_{oc}$ of the engine 11 related to the turning control. An optimum final target drive torque $T_o$ is thus selected from these two target drive torques $T_{os}$ and $T_{oc}$, thereby reducing the drive torque of the engine 11 as required.

More specifically, a control program according to the present embodiment is started by turning on the ignition key switch 75. First, step M1 follows initialization steps of reading the initial value $\delta_{m(o)}$ of the turning position of the steering shaft, resetting various flags and starting the counting of the main timer at intervals of 15 milli-seconds providing a sampling period of the control.

Then, at step M2, the TCL 76 computes the vehicle speed V on the basis of detection signals produced from various sensors, and corrects by learning the neutral position $\delta_M$ of the steering shaft 83 at step M3. The neutral position $\delta_M$ of the steering shaft 83 o the vehicle 82 is not stored in a memory (not shown) of the TCL 76 or ECU 15. Each time the ignition key switch 75 is turned on, therefore, the initial value $\delta_{m(o)}$ is read, and only when the vehicle 82 satisfies the straight-running conditions described below, the correction by learning is effected. Until the ignition key switch 75 is turned off, this initial value $\delta_{m(o)}$ continues to be corrected by learning.

The TCL 76 then computes the target drive torque $T_{os}$ relating to the slip control for regulating the drive torque of the engine on the basis of detection signals from the front wheel rotational speed sensor 66 and the rear wheel rotational speed sensors 80, 81 at step M4. The process is then passed to step M5 where the target drive torque $T_{oc}$ of the engine 11 associated with the turning control effected for regulating the drive torque of the engine 11 is computed in response to detection signals from the rear wheel rotational speed sensors 80, 81 and the steering angle sensor 84.

The TCL 76 selects, at step M6, an optimum final target drive torque $T_o$ out of these two target drive torques $T_{os}$ and $T_{oc}$ by a method described below with primary emphasis placed on safety. Further, in the case of sudden vehicle start or sudden change of the road surface conditions from normal dry to frozen states, for example, the operation of closing up the throttle valve 20 through the actuator 41 may fail to reduce the output of the engine 11 in time. In such a case, step M7 selects a retardation rate for correcting the basic retardation amount $p_B$ on the basis of the change rate $G_s$ of the amount s of slip of the front wheels 64, 65, and applies to the ECU 15 the data on the final target drive torque $T_o$ and the retardation rate of the basic retardation amount $p_B$ at step M8.

In the case where the driver is desirous of slip control or turning control by operating a manual switch (not shown), the ECU 15 controls the duty factor of a pair of torque control solenoids 51, 56 in such a manner that the drive torque of the engine 11 reaches the final target drive torque $T_o$. Further, the target retardation amount $p_o$ is computed in the ECU 15 on the basis of the data relating to the retardation rate of the basic retardation amount $p_B$, and the ignition timing P is retarded by the target retardation amount $p_o$ as required, whereby the vehicle 82 Is driven with appropriate safety.

In the case where the driver does not desire slip control or turning control by operating a manual switch (not show), on the other hand, the ECU 15 sets the duty factor of the pair of the torque control solenoid valves 51, 56 to 0%, with the result that the vehicle 82 is set in normal operating conditions corresponding to the amount of step-on of the accelerator pedal 31 by the driver.

In this way, step M9 controls the drive torque of the engine 11 until the count-down at intervals of 15 milliseconds providing a sampling period of the main timer is complete. This process is followed by the repetition of steps M2 to M10 until the turning off of the ignition key switch 75.

In computing the target drive torque $T_{oc}$ of the engine 11 by the turning control at step M5, the TCL 76 computes the vehicle speed V on the basis of the detection signals form the pair of the rear wheel rotational speed sensors 80, 81 in accordance with the equation (1) below and at the same time the steering angle $\delta$ of the front wheels 64, 65 in response to the detection signal produced from the steering angle sensor 84 in accordance with the equation (2) below, thus determining a target lateral acceleration $G_{YO}$ for the particular moment from the equation (3) shown below.

$$V = \frac{V_{RL} + V_{RR}}{2} \quad (1)$$

$$\delta = \frac{\delta_H}{\rho_H} \quad (2)$$

$$G_{YO} = \frac{\delta}{l \cdot \left(A + \frac{1}{V^2}\right)} \quad (3)$$

where $V_{RL}$ and $V_{RR}$ are the peripheral speeds (hereinafter referred to as the "rear wheel speeds") of the left and right rear wheels 78 and 79 respectively, $\rho_H$ the speed change ratio of the steering gear, $\delta_H$ the turning angle of the steering shaft 83, l the wheel base of the vehicle 82, and A the stability factor of the vehicle 82 described later.

As seen from equation (3), if the neutral position $\delta_H$ of the steering shaft 83 changes as a result of the toe-in adjustment of the front wheels 64, 65 at the time of maintenance or with secular variations including the wear of the steering gear not shown in the drawings, there occurs an error between the turning position $\delta_m$ of the steering shaft 83 and the actual steering angle $\delta$ of the front wheels 64, 65 providing steered wheels. As a result, it often becomes impossible to calculate the target lateral acceleration $G_{YO}$ of the vehicle 82 accurately, thereby making the turning control difficult. Further, in the case of the present embodiment, in view of the fact that the cornering drag correction means described later correct the reference drive torque of the engine 11 on the basis of the turning angle $\delta_H$ of the steering shaft 83 at the time of slip control at step M4, the slip control is also likely to fail. For these reasons, it is necessary to correct by learning the neutral position $\delta_M$ of the steering shaft 83 at step M3.

Figure 5:
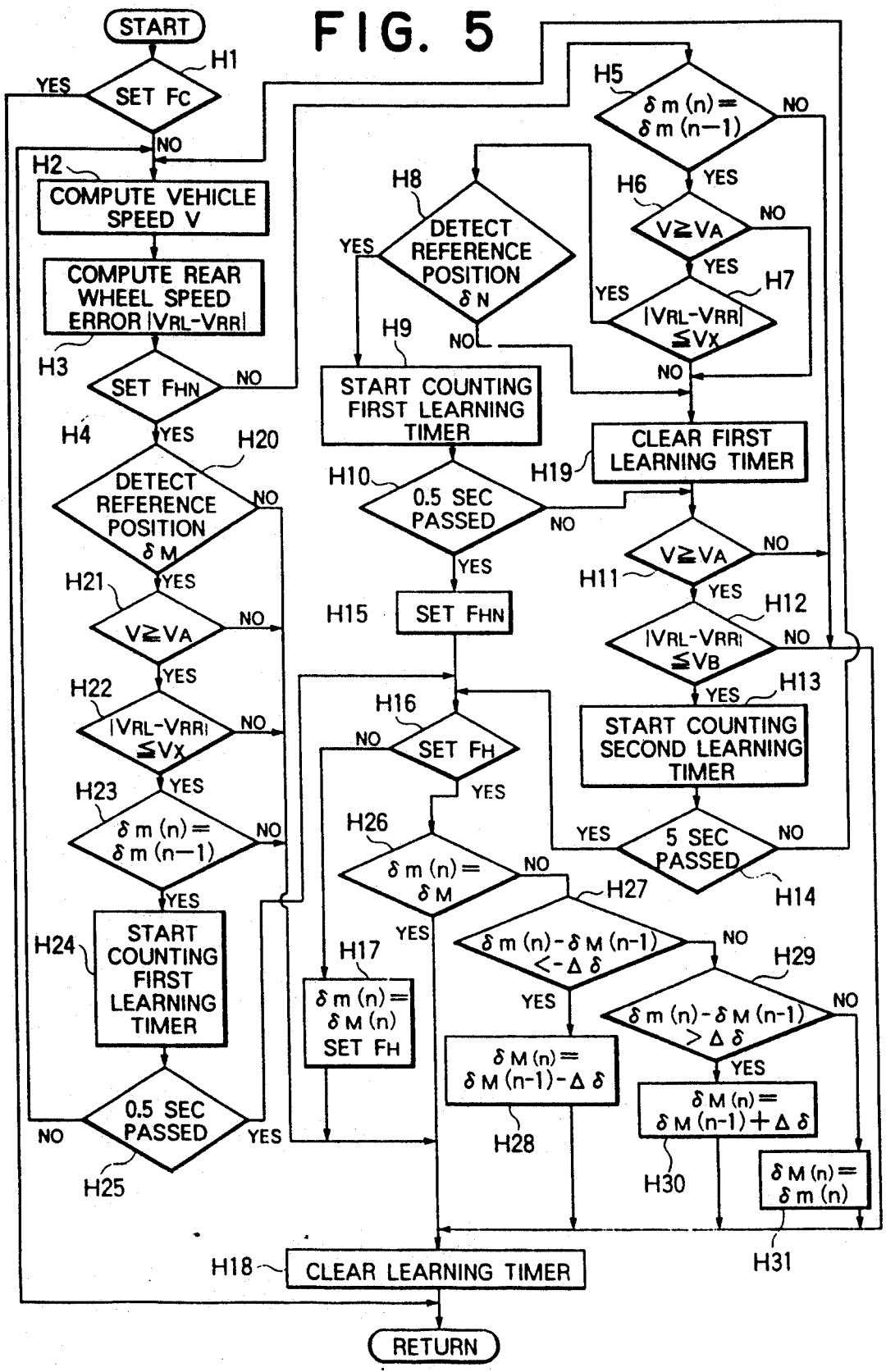
FIG. 5 is a flowchart representing a flow of correction by learning the neutral position of the steering shaft.

As seen from the diagram of FIG. 5 showing the sequence of processes for correcting by learning the neutral position $\delta_M$ of the steering shaft 83, the TCL 76 decides at step H1 whether or not the turning control operation flag $F_c$ is set. If step H1 decides that the vehicle 82 is under turning control, the correction by learning of the neutral position $\delta_M$ of the steering shaft 83 suddenly is likely to change the output of the engine 11, thus deteriorating the riding quality. The neutral position $\delta_M$ of the steering shaft 83, therefore, is not corrected by learning.

In the case where step H1 decides that the vehicle 82 is not under turning control, by contrast, no inconvenience is caused if the neutral position $\delta_M$ of the steering shaft 83 is corrected by learning. Therefore, in response to the detection signals from the rear wheel rotational speed sensors 80, 81, the TCL 76 computes at step H2, the vehicle speed V for the learning of the neutral position $\delta_M$ and the turning control described later, in accordance with the equation (1). Then, at step H3, the TCL 76 computes the difference between the rear wheel speeds $V_{RL}$ and $V_{RR}$ (hereinafter referred to as the "rear wheel speed error") $|V_{RL}-V_{RR}|$, and then decides at step H4 whether the neutral position $\delta_M$ has been corrected by learning with the reference position $\delta_N$ of the steering shaft 83 detected by the steering shaft reference position sensor 86, that is to say, whether or not the steering angle neutral position learning-over flag $F_{HN}$ is set with the reference position $\delta_N$ of the steering shaft 83 detected.

Immediately after the turning on of the ignition key switch 75, the steering angle neutral position learning-over flag $F_{HN}$ is not set, that is, the neutral position $\delta_M$ is learned for the first time. Therefore, step H5 decides whether the steering shaft turning position $\delta_{m(n)}$ computed presently is equal to the steering shaft turning position $\delta_{m(n-1)}$ computed the previous time. In the process, in order to avoid the effect of any manual maneuvering error of the driver himself, the resolution for the turning detection of the steering shaft 83 by the steering angle sensor 84 is desirably set to, say, about five degree.

If step H5 decides that -the steering shaft turning position $\delta_{m(n)}$ computed at the present time is equal to the steering shaft turning position $\delta_{m(n-1)}$ detected the previous time, step H6 decides whether the vehicle speed V is larger than a predetermined threshold value $V_A$. This operation is required in view of the fact that the rear wheel speed error $|V_{RL}-V_{RR}|$, or the like is incapable of being detected with the steering operation unless the vehicle 82 reaches a predetermined high speed level. The threshold value $V_A$ is thus set appropriately to, say, 10 km per hour as indicated by experiments based on the running characteristis or the like of the vehicle 82.

In the case where step H6 decides that the vehicle speed V is not less than the threshold value $V_A$, the TCL 76 decides at step H7 whether the rear wheel speed error $|V_{RL}-V_{RR}|$ is smaller than a predetermined threshold $V_X$ such as 0.3 km per hour, that is to say, whether the vehicle 82 is running straight or not. The reason why the threshold $V_X$ is not set to 0 km per hour is to prevent a hypothetical case of deciding that the vehicle 82 is not running straight as a result of different peripheral speeds $V_{RL}$ and $V_{RR}$ of the right and left rear wheels 78, 79 in spite of the vehicle 82 running straight with the tires of the right and left rear wheels 78, 79 under unequal air pressure.

Figure 6:
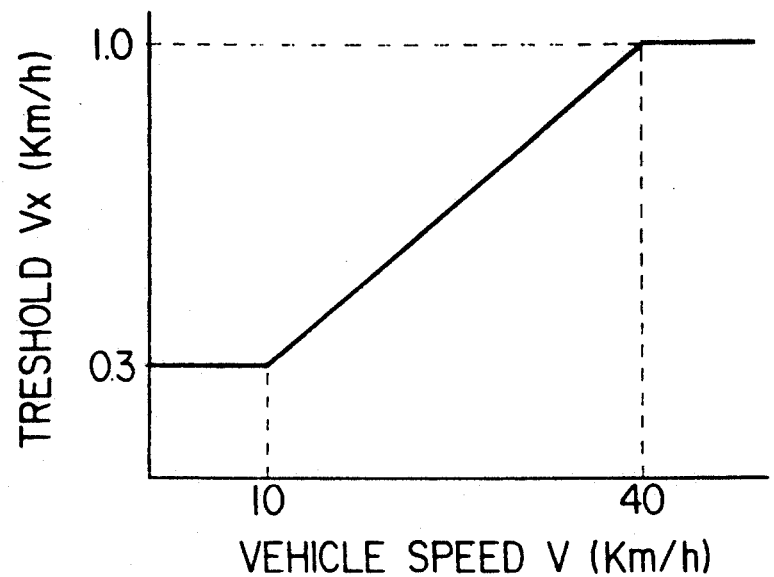
FIG. 6 is a map showing the relationship between vehicle speed and variable threshold.

In the case where the air pressures of the right and left rear wheels 78, 79 are not the same, the rear speed error $|V_{RL}-V_{RR}|$ tends to increase out of proportion to the vehicle speed V, and therefore, the threshold value $V_X$ is advisably represented in a map as shown in FIG. 6, from which can be read the threshold value $V_X$ on the basis of the vehicle speed V.

If step H7 decides that the rear wheel speed error $|V_{RL}-V_{RR}|$ is smaller than the threshold $V_X$, step H8 decides whether the steering shaft reference position sensor 86 has detected the reference position $\delta_N$ of the steering shaft 83 or not. In the case where it is decided at step H8 that the reference position $\delta_N$ of the steering shaft 83 has been detected by the steering shaft reference position sensor 86, that is, that the vehicle 82 is in the straight-running mode, then H9 starts the counting of a first learning timer (not shown) shown built in the TCL 76.

Then, at step H10, the TCL 76 decides whether it has passed 0.5 seconds from the starting of counting of the first learning counter, that is, whether or not the straight-running condition of the vehicle 82 has lasted for 0.5 seconds. If it has not yet passed 0.5 seconds from the starting of counting of the first learning counter, step H11 decides whether or not the vehicle speed V is higher than said threshold value $V_A$. If step H11 finds that the vehicle speed V is higher than the threshold value $V_A$, the process proceeds to step H12 for deciding whether the rear wheel speed error $|V_{RL}-V_{RR}|$ is smaller than the threshold value $V_B$, say, 0.1 km per hour. If step H12 decides that the rear wheel speed error $|V_{RL}-V_{RR}|$ is less than said threshold value $V_B$, that is, the vehicle 82 is under straight-running condition, then step H13 starts the counting of a second learning timer not shown built in the TCL 76.

As the next process, step H14 decides whether It has passed five seconds from the starting of counting the second learning timer, that is, whether or not the straight-running condition of the vehicle 82 has lasted for five seconds. If five seconds is not found to have passed from the starting of counting the second learning timer, the process is returned to said step H2 for repeating the operation of steps H2 to H14.

In the process of this repetitive operation, assume that step H8 decides that the steering shaft reference position sensor 86 is detecting the reference position $\delta_N$ of the steering shaft 83, that step H9 starts the counting of said first learning counter, and that step H10 decides that it has passed 0.5 seconds from the starting of counting the first learning timer, that is, that the vehicle 82 is continuing to run in straight direction for 0.5 seconds. Then, step H15 sets the steering angle neutral position learning-over flag $F_{HN}$ with the reference position $\delta_N$ of the steering shaft 83 detected, followed by step H16 for further deciding whether the steering angle neutral position learning-over flag $F_H$ is set with the reference position $\delta_N$ of the steering shaft 83 not detected. Also, in the case where said step H14 decides that it has passed five seconds after starting of counting the second learning timer, the process is passed to step H16.

In the aforementioned operation, the steering angle neutral position learning-over flag $F_H$ is not set with the reference position $\delta_N$ of the steering shaft 83 not yet detected. Step H16, therefore, decides that the steering angle neutral position learning-over flag $F_H$ is not set with the reference position $\delta_N$ of the steering shaft 83 not detected, that is, that the neutral position $\delta_M$ is learned for the first time with the reference position $\delta_N$ of the steering shaft 83 detected. Thus, step H17, considers the present steering shaft turning position $\delta_{m(n)}$ as a new neutral position $\delta_{M(n)}$ of the steering shaft 83, reads this neutral position $\delta_{M(n)}$ into the memory in the TCL 76 while at the same time setting the steering angle neutral position learning-over flag $F_H$ with the reference position $\delta_N$ of the steering shaft 83 not detected.

After setting a new neutral position $\delta_{M(n)}$ of the steering shaft 83 in this way, the turning angle $\delta_H$ of the steering shaft 83 is computed on the basis of the neutral position $\delta_M$ of the steering shaft 83, while at the same time clearing the count of the learning timer at step H18 to restart the learning of the neutral position of the steering angle.

Assume that said step H5 has decided that the steering shaft turning position $\delta_{m(n)}$ computed at the present time is not equal to the steering angle turning position $\delta_{m(n-1)}$ computed the previous time, or that step H11 has decided that the vehicle speed V is not higher than the threshold value $V_A$, that is to say, the rear wheel speed error $|V_{RL}-V_{RR}|$ computed at step H12 is not reliable, or that step H12 has decided that the rear wheel speed error $|V_{RL}-V_{RR}|$ is larger than the threshold value $V_B$. Then, in view of the fact that the vehicle is not running in straight direction in any of the cases mentioned above, the process proceeds to said step H18.

Also, if said step H7 decides that the rear wheel speed error $|V_{RL}-V_{RR}|$ is larger than the threshold value $V_X$, or step H8 decides that the steering shaft reference position sensor 86 is not detecting the reference position $\delta_N$ of the steering shaft 83, then, step H19 clears the count of said first learning counter, and the process is passed to said step H11. Also when said step H6 decides that the vehicle speed V is smaller than the threshold value $V_A$, it cannot be decided that the vehicle is running straight, and therefore the process proceeds to this step H11.

Assume, on the other hand, that said step H4 has decided that the steering angle neutral position learning-over flag $F_{HN}$ is set with the reference position $\delta_N$ of the steering shaft 83 detected, that is to say, that the neutral position $\delta_M$ is learned for the second or more time. Then, step H20 decides whether or not the steering shaft reference position sensor 86 is detecting the reference position $\delta_N$ of the steering shaft 83. If step H20 decides that the steering shaft reference position sensor 86 is detecting the reference position $\delta_N$ of the steering shaft 83, step H21 decides whether or not the vehicle speed V is larger than the predetermined threshold value $V_A$.

If step H21 decides that the vehicle speed V is larger than the threshold value $V_A$, the TCL 76 decides at step H22 whether the rear wheel speed error $|V_{RL}-V_{RR}|$ is smaller than said threshold value $V_X$, that is, whether or not the vehicle is in straight running condition. If step H22 decides that the rear wheel speed error $|V_{RL}-V_{RR}|$ is smaller than the threshold value $V_X$, step H23 decides whether or not the steering shaft turning position $\delta_{m(n)}$ computed at present time is equal to the steering shaft turning position $\delta_{m(n-1)}$ computed the previous time. In the case where step H23 has decided that the steering shaft turning position $\delta_{m(n)}$ computed the present time is equal to the steering shaft turning position $\delta_{m(n-1)}$ computed the previous time, then step 24 starts the counting of the first learning timer.

Next, the TCL 76 decides at step H25 whether or not it has passed 0.5 seconds from this starting of counting the first learning timer, that is to say, whether or not the vehicle 82 is running straight for 0.5 seconds continuously. If it is decided that it has not passed 0.5 seconds from the starting of counting of the first learning counter, the process is returned to said step H2, followed by repetition of said steps H2 to H4 and H20 to H25. In the case where this step H25 has decided that 0.5 seconds has passed from the starting of counting the first learning counter, by contrast, the process is passed to said step H16.

In the case where said step H20 decides that the steering shaft reference position sensor 86 is not detecting the reference position $\delta_N$ of the steering shaft 83, or where step H21 decides that the vehicle speed V is not higher than the threshold value $V_A$, that is, the rear wheel speed error $|V_{RL}-V_{RR}|$ computed at step H22 is not reliable, or where step H22 decides that the rear wheel speed error $|V_{RL}-V_{RR}|$ is larger than the threshold value $V_X$, or where step H23 decides that the steering shaft turning position $\delta_{m(n)}$ computed the present time is not equal to the steering shaft turning position $\delta_{m(n-1)}$ computed the previous time, then the process is passed to said step H18.

In the case where the step H16 decides that the steering angle neutral position learning-over flag $F_H$ is set, that is, that the neutral position $\delta_M$ is learned for the second or more time, then the TCL 76 decides at step H26 whether or not the present steering shaft turning position $\delta_{m(n)}$ is equal to the previous neutral position $\delta_{M(n-1)}$ of the steering shaft 83, that is to say, it decides whether the relationship shown below holds or not.

$$\delta m(n) = \delta M(n-1)$$

If it is decided that the present steering shaft turning position $\delta_{m(n)}$ is equal to the previous neutral position $\delta_{M(n-1)}$ of the steering shaft 83, then the process is passed directly to step H18 to learn the steering shaft neutral position for the next time.

If the step H26 decides that the present steering shaft turning position $\delta_{m(n)}$ is not equal to the neutral position $\delta_{M(n-1)}$ of the steering shaft 83 due to a play or the like of the steering system, according to the present embodiment, the present steering shaft turning position $\delta_{m(n)}$ is not directly determined as a new neutral position $\delta_{M(n)}$ of the steering shaft 83. Instead, in the case where the absolute value of the difference between the two positions is larger than a correction limit amount $\Delta\delta$ set in advance, the correction limit amount $\Delta\delta$ is subtracted from or added to the previous steering shaft turning position $\delta_{m(n-1)}$ and the result of this subtraction or addition, as the case may be, is used as a new neutral position $\delta_{M(n)}$ of the steering shaft 83 and written into the memory in the TCL 76.

In other words, the TCL 76 decides at step H27 whether or not the present steering shaft turning position $\delta_{m(n)}$ less the previous neutral position $\delta_{M(n-1)}$ of the steering shaft 83 is smaller or not than the negative correction limit amount $-\Delta\delta$ set in advance. If this step H27 decides that the result of subtraction is smaller than the correction limit amount $-\Delta\delta$, step H28 changes the new neutral position $\delta_{M(n)}$ of the steering shaft 83 as $$\delta M(n) = \delta M(n-1) - \Delta\delta$$

from the previous neutral position $\delta_{M(n-1)}$ of the steering shaft 83 and the negative correction limit amount $-\Delta\delta$, so that each learning correction amount may not increase in negative direction unconditionally.

As a result, even if an abnormal detection signal is produced from the steering angle sensor 84 for some reason or other, the neutral position $\delta_M$ of the steering shaft 83 is prevented from changing abruptly, thereby making it possible to take a measure against this malfunction with rapidity.

In the case where step H27 decides that the result of subtraction is larger than the negative correction limit amount $-\Delta\delta$, on the other hand, step 29 decides whether or not the present steering shaft turning position $\delta_{m(n)}$ less the previous neutral position $\delta_{M(n-1)}$ of the steering shaft 83 is larger than the positive correction limit amount $\Delta\delta$. In the case where this step H29 decides that the result of subtraction is larger than the positive correction limit amount $\Delta\delta$, step H30 changes the new neutral position $\delta_{M(n)}$ of the steering shaft 83 as $$\delta M(n) = \delta M(n-1) + \Delta\delta$$

from the neutral position $\delta_{M(n-1)}$ of the steering shaft 83 and the positive correction limit amount $\Delta\delta$, so that each learning correction amount may not increases unconditionally in positive direction.

As a consequence, even if an abnormal detection signal is produced from the steering angle sensor 84 for some reason or other, the neutral position $\delta_M$ of the steering shaft 83 does not change abruptly, thereby making it possible to take an action against this trouble promptly.

If step H29 decides that the result of subtraction is smaller than the positive correction limit amount $\Delta\delta$, step H31 reads out the present steering shaft turning position $\delta_{m(n)}$ directly as a new neutral position $\delta_{M(n)}$ of the steering shaft 83.

In this way, according to the present embodiment, in the process of correcting by learning the neutral position $\delta_M$ of the steering shaft 83, not only the rear wheel speed error $|V_{RL}-V_{RR}|$ but also the detection signal produced from the steering shaft reference position sensor 86 are utilized at the same time. It is thus possible to correct by learning the neutral position $\delta_M$ of the steering shaft 83 at a comparatively early time after start of the vehicle 82, and even in case of a malfunction of the steering shaft reference position sensor 86 for some reason, to correct by learning the neutral position $\delta_M$ of the steering shaft 83 only with the rear wheel speed error $|V_{RL}-V_{RR}|$, thereby improving the safety of the vehicle.

Figure 7:
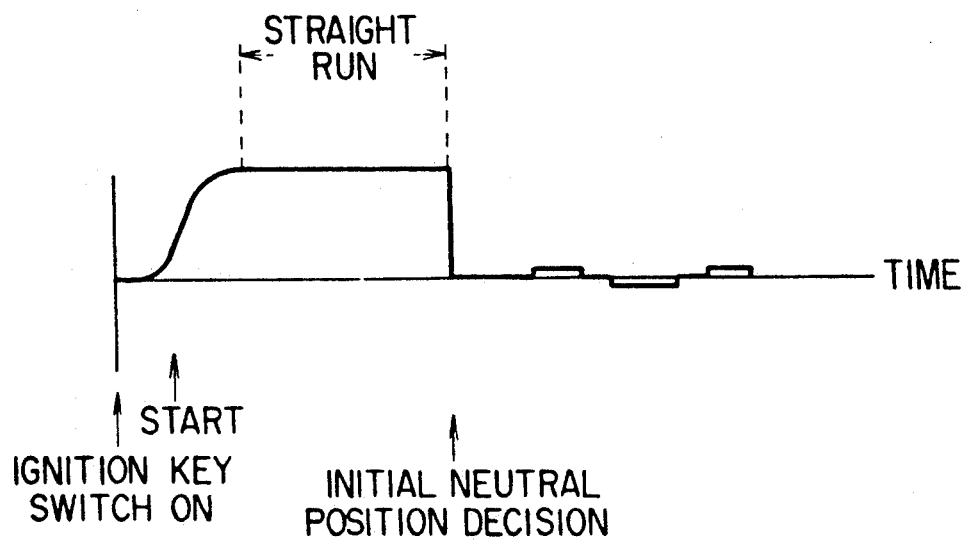
FIG. 7 is a graph showing an example of correction amount in the case of correction by learning of the neutral position of the steering shaft.

In the case where the vehicle 82 has started from the stationary state with the front wheels 64, 65 turned, therefore, as seen from FIG. 7 showing an example of change in the neutral position $\delta_M$ of the steering shaft 83 at this time, the correction amount from the initial value $\delta_{m(0)}$ of the steering shaft turning position at step M1 is very large when the learning of the neutral position $\delta_M$ of the steering shaft 83 is controlled for the first time, while the neutral position $\delta_M$ of the steering shaft 83 for the second and subsequent time is maintained in the controlled state by the operation at steps H17 and H19.

In this way, the target drive torque $T_{os}$ is computed for slip control to regulate the drive torque of the engine 11 on the basis of the detection signals from the rear wheel rotational speed sensors 80, 81 and the front wheel rotational speed sensor 66 after correcting by learning the neutral position $\delta_M$ of the steering shaft 83.

The friction coefficient between the tire and the road surface is considered to be equivalent to a change rate (hereinafter referred to as the "longitudinal acceleration") $G_X$ imposed on the vehicle 82. According to the present embodiment, therefore, the longitudinal acceleration $G_X$ is computed on the basis of the detection signal from the rear wheel rotational speed sensors 80, 81, and the reference drive torque $T_B$ of the engine 11 corresponding to the maximum value of this longitudinal acceleration $G_X$ is corrected on the basis of the error (hereinafter referred to as the "slip amount") s between the front wheel speed $V_F$ detected by the front wheel rotational speed sensor 66 and the target front wheel speed $V_{FO}$ corresponding to the vehicle speed V, thus computing the target drive torque $T_{os}$.

Figure 8:
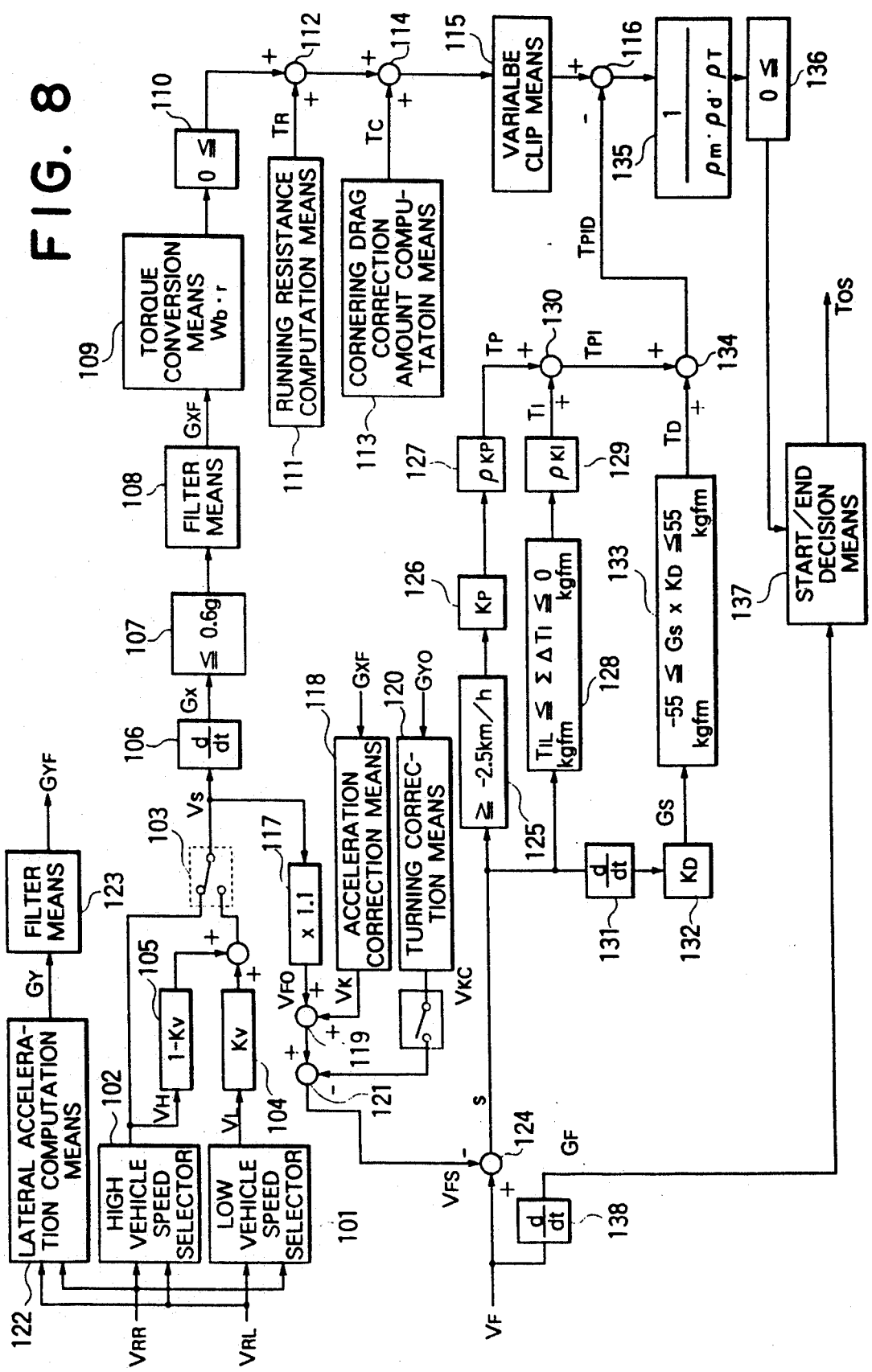
FIG. 8 is a block diagram showing the order of operation of a target drive torque for slip control.

An operation block diagram for computing the target drive torque $T_{os}$ of the engine 11 is shown in FIG. 8. First, the TCL 76 computes the vehicle speed $V_s$ for slip control on the basis of the rear wheel rotational speed sensors 80, 81. According to the present embodiment, the smaller of the two rear wheel speeds $V_{RL}$ and $V_{RR}$ is selected as a first vehicle speed $V_S$ for slip control at a low vehicle speed selector 101, and the greater of the two rear wheel speeds $V_{RL}$ and $V_{RR}$ is selected as a second vehicle speed $V_S$ at a high vehicle speed selector 102. After that, a change-over switch 103 is used to make further selection from the outputs of the two selectors 101 and 102.

According to the present embodiment, the first vehicle speed $V_S$ selected at the low vehicle speed selector 101 is determined by multiplying the smaller value $V_L$ of the two rear wheel speeds $V_{RL}$ and $V_{RR}$ by a weighting coefficient $K_v$ corresponding to the vehicle speed V computed from said equation (1) at a multiplier section 104, and further by adding the resulting product to the product of the greater value $V_H$ of the two rear wheel speeds $V_{RL}$ and $V_{RR}$ multiplied by $(1-K_v)$ at a multiplier section 105.

More specifically, the smaller of the two rear wheel speeds $V_{RL}$ and $V_{RR}$ is selected as the vehicle speed $V_s$ by the change-over switch 103 in the case where the drive torque of the engine 11 is actually reduced by slip control, that is, where the slip control flag $F_s$ is set, and the greater of the two rear wheel speeds $V_{RL}$ and $V_{RR}$ is selected as the vehicle speed $V_s$ in the case where the drive torque of the engine 11 is not reduced even though the driver desires slip control, that is, where the slip control flag $F_s$ is reset.

This is in order to make it difficult to transfer from the state where the drive torque of the engine 11 is not reduced to the state wherein the drive torque of the engine 11 is reduced, or in the opposite direction. In the case where the smaller of the two rear wheel speeds $V_{RL}$ and $V_{RR}$ is selected as the vehicle speed $V_s$ during the turning of the vehicle 82, for example, the drive torque of the engine 11 is prevented from being inconveniently reduced by erroneously deciding that a slip has occurred in front wheels 64, 65 in the absence of any such slip on the one hand, and once the drive torque of the engine 11 is reduced, this condition is continued in consideration of the running safety of the vehicle 82 on the other.

Also, the reason why, in computing the vehicle speed $V_s$ at the low vehicle speed selector 101, the smaller value $V_L$ of the two rear wheel speeds $V_{RL}$ and $V_{RR}$ is multiplied by the weighting coefficient $K_v$ at the multiplier section 104 and the resulting product is added to the product of the greater one $V_H$ of the two rear wheel speeds $V_{RL}$ and $V_{RR}$ multiplied by $(1-K_v)$ at the multiplier section 105, is that, when the vehicle runs through a curved path of a small radius of curvature such as turning to the right or left at an intersection, for example, the mean value of the peripheral speeds of the front wheels 64, 65 is different from the smaller value $V_L$ of the two rear wheel speeds $V_{RL}$ and $V_{RR}$ to such an extent that the correction amount of the drive torque by feedback is excessively great, thus often having an adverse effect on the accelerability of the vehicle 82.

Figure 9:
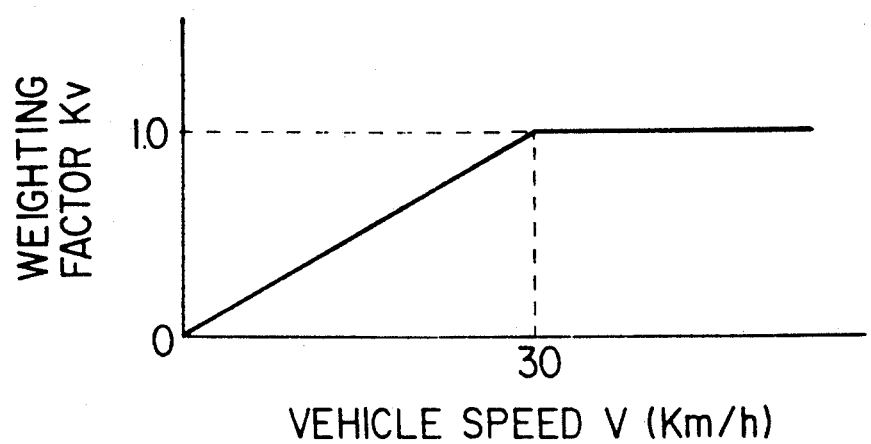
FIG. 9 is a map showing the relationship between vehicle speed and correction factor.

According to the present embodiment, said weighting coefficient $K_y$ is read from a map shown in FIG. 9 on the basis of the vehicle speed V shown in the equation (1) providing a mean value of the peripheral speeds of the rear wheels 78, 79.

The longitudinal acceleration $G_x$ is computed on the basis of the vehicle speed $V_s$ for slip control thus determined. First, from the vehicle speed $V_{s(n)}$ computed the present time and the vehicle speed $V_{s(n)}$ computed the immediately previous time, the present longitudinal acceleration $G_{X(n)}$ of the vehicle 82 is computed by differential operation means 106 in accordance with the equation below.

$$G_{X(n)} = \frac{V_{S(n)} - V_{S(n-1)}}{3.6 \cdot \Delta t \cdot g}$$

where $\Delta t$ is the sampling period of the present control which is 15 milli-seconds, and g the gravitational acceleration.

The longitudinal acceleration $G_{X(n)}$ computed, when increased to 0.6 g or more, is clipped to 0.6 g by clip means 107 in order to prevent the maximum value thereof from exceeding 0.6 g in consideration of safety against a computation error or the like. Further, a corrected longitudinal acceleration $G_{XF}$ is computed by the filtering processor for eliminating noises through filter means 108.

This filtering process is effected to correct the longitudinal acceleration $G_{X(n)}$ in view of the following: The longitudinal acceleration $G_{X(n)}$ of the vehicle 82 is considered to be equivalent to the friction coefficient between the tire and the road surface, and therefore, even in the case where the maximum value of the longitudinal acceleration $G_{X(n)}$ of the vehicle 82 undergoes such a change that the tire slip rate S becomes likely to deviate from a target slip rate $S_o$ or the like value corresponding to the maximum value of the friction coefficient between the tire and the road surface, the tire slip rate S is required to be maintained at a value near to but smaller than the target slip rate $S_o$ or the like value corresponding to the maximum value of the friction coefficient between the tire and the road surface. This filtering process is specifically conducted in the manner mentioned below.

If the present longitudinal acceleration $G_{X(n)}$ is larger than the previous corrected longitudinal acceleration $G_{XF(n-1)}$ that has gone through the filtering process, that is to say, if the vehicle 82 continues to be accelerated, the present corrected longitudinal acceleration $G_{XF(n)}$ is considered as $$G_{XF(n)} = \frac{28}{256} \cdot \Sigma (G_{X(n)} - G_{XF(n-1)})$$

and noises are removed by the retardation process, thereby causing the corrected longitudinal acceleration $G_{XF(n)}$ to follow the longitudinal acceleration $G_{X(n)}$ at a comparatively early time.

In the case where the present longitudinal acceleration $G_{X(n)}$ is smaller than the previous corrected longitudinal acceleration $G_{XF(n-1)}$ that is, if the vehicle 82 has yet to be accelerated to considerable extent, the process described below is effected at intervals of the sampling period $\Delta t$.

Under the condition where the slip control flag $F_s$ is not set, that is, where the drive torque of the engine 11 is not reduced by slip control, the vehicle 82 is under deceleration. Therefore, the relationship $$G_{XF(n)} = G_{XF(n-1)} - 0.002$$

is secured to dampen the reduction in the corrected longitudinal acceleration $G_{XF(n)}$, thereby assuring the responsiveness to the driver's demand of acceleration of the vehicle 82.

Also when the drive torque of the engine 11 is reduced by slip control with the slip amount s positive, that is, when the front wheels 64, 65 are subjected to a minor slip, the fact that the vehicle 82 is under deceleration poses no safety problem. Therefore, the relationship $$G_{XF(n)} = G_{XF(n-1)} - 0.002$$

is held to dampen the reduction in the corrected longitudinal acceleration $G_{XF}$, thus securing the responsiveness to the driver's demand of acceleration of the vehicle 82.

Further, in the case where the drive torque of the engine 11 is reduced by slip control with the slip amount s of front wheels 64, 65 negative, that is to say, where the vehicle 82 is under deceleration, the maximum value of the corrected longitudinal acceleration $G_{XF}$ is held, thereby securing the responsiveness to the driver's demand of acceleration of the vehicle 82.

In similar fashion, when the drive torque of the engine 11 is reduced by slip control while the hydraulic automatic transmission 13 is being shifted up by the hydraulic control system 16, the maximum value of the corrected longitudinal acceleration $G_{XF}$ is held in order to meet the requirement of securing the driver's feeling of acceleration.

The corrected longitudinal acceleration $G_{XF}$ from which noises have been removed at the filter means 108 is converted into a torque by torque conversion means 109. The value computed at this torque conversion means 109 should naturally be positive. In order to prevent a computation error, this value is clipped to 0 or more at clip means 110 and the result of clipping is added at adder means 112 to the running resistance $T_R$ computed at running resistance computation means 111. Further, the cornering drag correction torque $T_C$ computed at cornering drag correction amount computation means 113 on the basis of the detection signal from the steering angle sensor 84 is added at adder means 114 thereby to compute a reference drive torque $T_B$ shown by equation (4) below.

$$T_B = G_{FO} \cdot W_b \cdot r + T_R + T_C \quad (4)$$

where $W_b$ is the vehicle body weight, and r the effective radius of the front wheels 64, 65.

Figure 10:
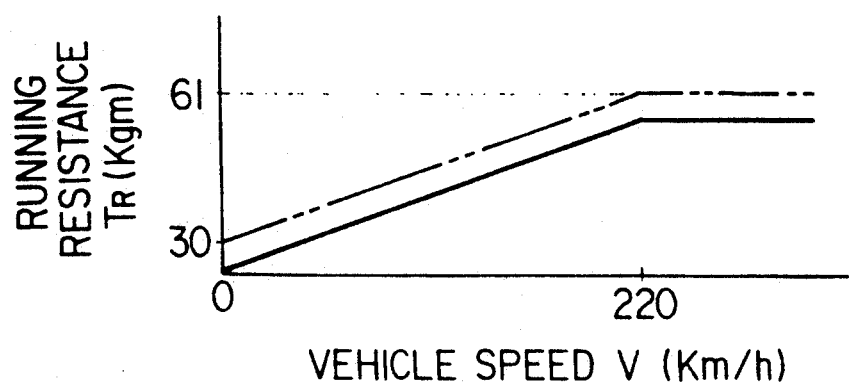
FIG. 10 is a map showing the relationship between vehicle speed and running resistance.

The running resistance $T_R$, which is capable of being computed as a function of the vehicle speed V, is determined from a map as shown in FIG. 10 according to the present embodiment. In this case, a flat road and an ascending slope offer different values of the running resistance $T_R$, and therefore the map contains two curves, one in solid line representing a flat road, and the other in two-dot chain indicating an ascending slope. In response to a detection signal produced from a slope sensor (not shown) built in the vehicle 82, either of the two running resistances is selected. It is also possible to set the running resistance $T_R$ more in detail so as to cover also a descending slope and the like.

Figure 11:
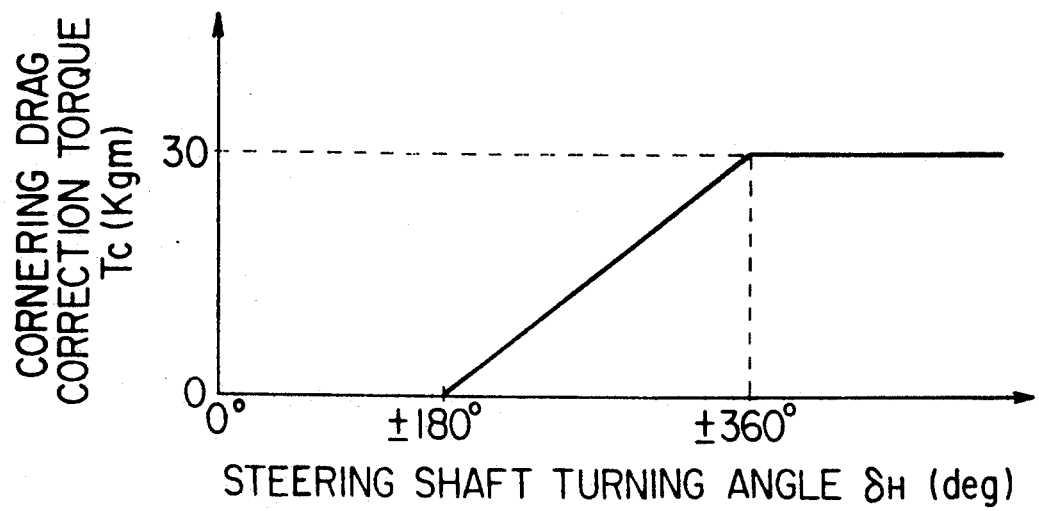
FIG. 11 is a map showing the relationship between the amount of turning the steering shaft and the correction torque.

Further, according to the present embodiment, the cornering drag correction torque $T_C$ is determined from a map shown in FIG. 11, whereby a reference drive torque $T_B$ of the engine 11 approximating the actual running conditions is capable of being set. In view of the fact that the reference drive torque $T_B$ of the engine 11 is set at a rather large level immediately after the turning, the acceleration feeling of the vehicle 82 after successfully negotiating a curved path is improved.

Figure 12:
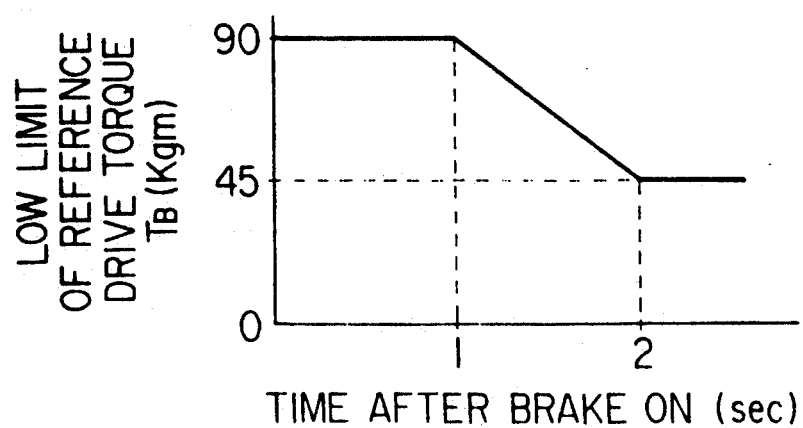
FIG. 12 is a map defining a low limit of target drive torque immediately after starting slip control.

According to the present embodiment, a low limit of the reference drive torque $T_B$ computed by said equation (4) is set by variable clip means 115, so that the difference between the reference drive torque $T_B$ and the final correction torque $T_{PID}$ described later produced from subtraction means 116 is prevented from becoming inconveniently negative. The low limit of the reference drive torque $T_B$ is progressively reduced with the lapse of time from the time point of starting the slip control as shown by the map of FIG. 12.

The TCL 76, on the other hand, computes the actual front wheel speed $V_F$ on the basis of the detection signal from the front wheel rotational speed sensor 66, and conducts the feedback control of said reference drive torque $T_B$ by the use of a slip amount s providing an error between this front wheel speed $V_F$ and a target front wheel speed $V_{FS}$ for correction torque computation set on the basis of the target front wheel speed $V_{FO}$ which in turn is set according to the vehicle speed $V_S$ for slip control, thus computing the target drive torque $T_{OS}$ of the engine 11.

Figure 13:
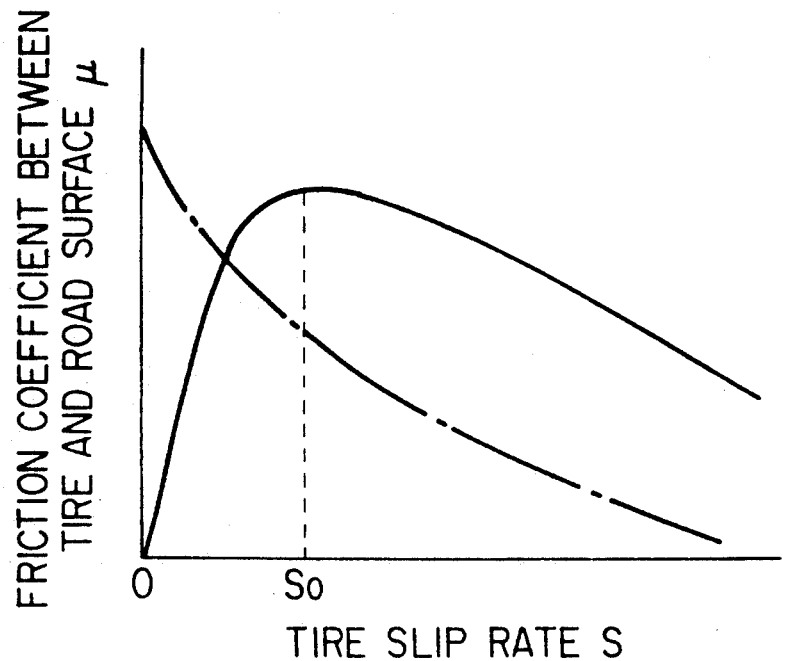
FIG. 13 is a graph showing the relationship between the friction coefficient between tire and road surface and slip rate.

If the drive torque generated in the engine 11 at the time of acceleration of the vehicle 82 is to work effectively, as shown by the solid line in FIG. 13, it is desirable to adjust the slip rate S of the tire of the front wheels 64, 65 of a running vehicle 82 to a target slip rate $S_O$ corresponding to the maximum value of the friction coefficient between the tire and the road surface or a value approximate to but smaller than the target slip rate $S_O$, thereby avoiding energy loss while at the same time preventing an adverse effect on the maneuverability or acceleration performance of the vehicle 82.

The target slip rate $S_O$ is known to fluctuate in the range between 0.1 and 0.25 depending on the road surface conditions. While the vehicle 82 is running, therefore, it is desirable to cause a slip amount s of about 10% against the road surface in the front wheels 64, 65 providing driving wheels. Taking the above-mentioned points into account, the target front wheel speed $V_{FO}$ is set by multiplier means 117 as shown in the equation below.

$$V_{FO} = 1.1 \, V$$

Figure 14:
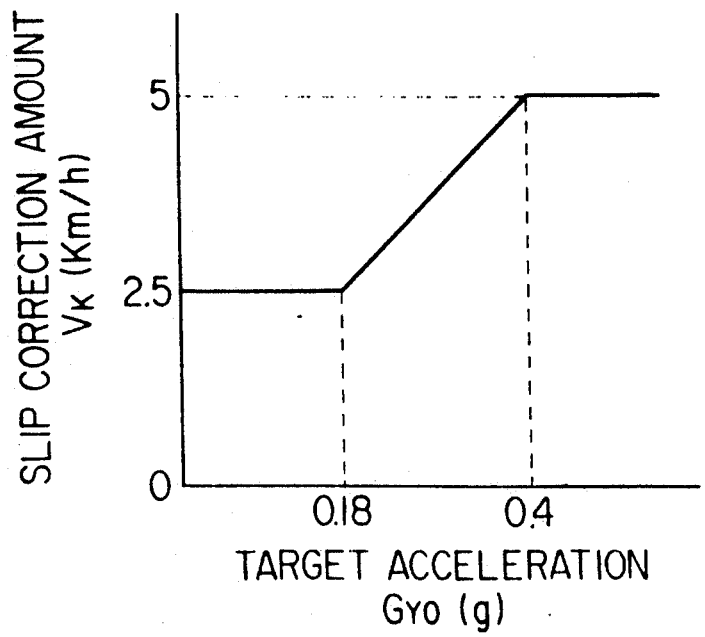
FIG. 14 is a map showing the relationship between a target lateral acceleration and the amount of speed acceleration.

The TCL 76 reads a slip correction amount $V_K$ corresponding to the above-mentioned corrected longitudinal acceleration $G_{XF}$ from the map as shown in FIG. 14 at acceleration correction means 118, and adds this slip correction amount $V_K$ thus read out to the target front wheel speed $V_{FO}$ for reference torque computation at adder means 119. This slip correction amount $V_K$ is given the tendency of increasing progressively with the value of the corrected longitudinal acceleration $G_{XF}$. According to the present embodiment, this map is prepared on the basis of a running test or the like.

As a result, the target front wheel speed $V_{FS}$ for correction torque computation is increased, and the slip rate S under acceleration is set to the target slip rate $S_O$ shown by solid line in FIG. 13 or a value in the vicinity of but smaller than the target slip rate $S_O$.

On the other hand, the relationship between the friction coefficient between tire of a turning vehicle 82 and road surface and the tire slip rate S is shown in FIG. 13. As seen from the dashed line in this diagram, the tire slip rate S associated with the maximum value of the friction coefficient between the tire of a turning vehicle and the road surface is considerably smaller than the target slip rate $S_O$ of the tire associated with the maximum friction coefficient between the tire of a straight-running vehicle 82 and the road surface. While the vehicle 82 is turning, therefore, it is desirable to set the target front wheel speed $V_{FO}$ at a value smaller than while running straight in order to enable the vehicle 82 to turn smoothly.

Figure 15:
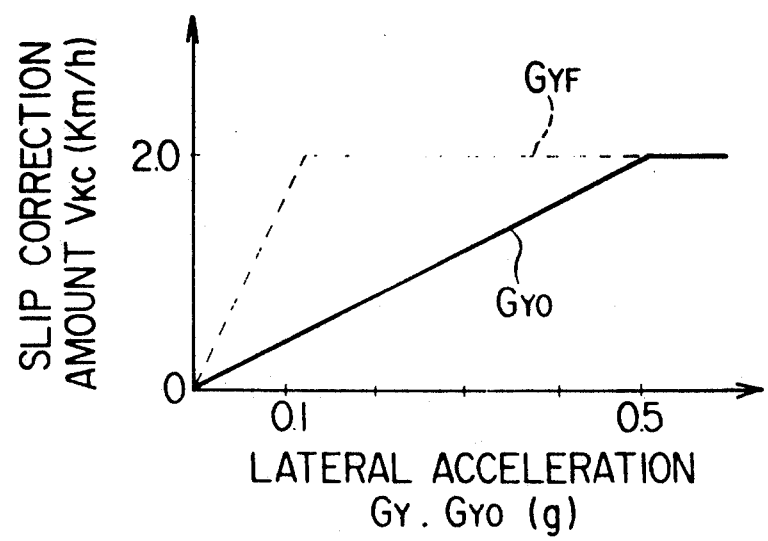
FIG. 15 is a map showing the relationship between the lateral acceleration and the amount of speed correction with the turning.

For this purpose, turning correction means 120 read a slip correction amount $V_{KC}$ corresponding to the target lateral acceleration $G_{YO}$ from a map as shown in FIG. 15, and subtraction means 121 subtract the slip correction amount $V_{KC}$ from the target front wheel speed $V_{FO}$ for computation of a reference torque. In view of the fact that the turning angle $\delta_H$ of the steering shaft 83 is not reliable until the first learning of the neutral position $\delta_M$ of the steering shaft 83 after the turning on of the ignition key switch 75, however, the slip correction amount $V_{KC}$ is read from a map as shown by dashed line in FIG. 15 on the basis of the lateral acceleration $B_Y$ actually acting on the vehicle 82 as a result of the peripheral speeds $V_{RL}$, $V_{RR}$ of the rear wheels 78, 79.

The target lateral acceleration $G_{YO}$ is determined by computing the steering angle $\delta$ from the equation (2) on the basis of a detection signal from the steering angle sensor 84 and from the equation (3) by use of this steering angle $\delta$, while at the same time correcting by learning the neutral position $\delta_M$ of the steering shaft 83.

In the event that a fault occurs in the steering angle sensor 84 or the steering shaft reference position sensor 86, the target lateral acceleration $G_{YO}$ is liable to assume a totally erroneous value. In the base of a fault of the steering angle sensor 84 or the like, the actual lateral acceleration $G_Y$ occurring in the vehicle 82 is computed by use of the rear wheel speed error $|V_{RL} - V_{RR}|$, and is used as an alternative to the target lateral acceleration $G_{YO}$.

Specifically, the actual lateral acceleration $G_Y$ is computed as shown in the following equation (5) at lateral acceleration computation means 122 built in the TCL 76 from the rear wheel speed error $|V_{RL} - V_{RR}|$ and the vehicle speed V, and the result of computation is applied through filter means 123 to remove noises therefrom, thus producing a corrected lateral acceleration $G_{YF}$ to be actually used.

$$G_Y = \frac{|V_{RL} - V_{RR}| \cdot V}{3.6^2 \cdot b \cdot g} \tag{5}$$

where b is the tread size of the rear wheels 78, 79. The filter means 123 subject the present corrected lateral acceleration $G_{YF(n)}$ to a low-pass filtering process by the digital operation shown below from the lateral acceleration $G_{Y(n)}$ computed the present time and the corrected lateral acceleration $G_{YF(n-1)}$ computed the previous time.

$$G_{YF(n)} = \Sigma \frac{20}{256} \{G_{Y(n)} - G_{YF(n-1)}\}$$

Figure 16:
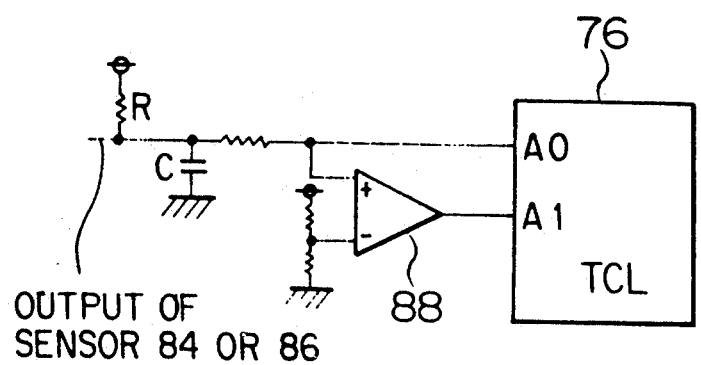
FIG. 16 is a circuit diagram for detecting a fault of a steering angle sensor.

Whether or not the steering angle sensor 84 or the steering shaft reference position sensor 86 has developed a fault is capable of being detected for example, by an disconnection detection circuit or the like shown in FIG. 16 through the TCL 76. Specifically, the outputs of the steering angle sensor 84 and the steering shaft reference position sensor 86 are pulled up by a resistor R while being grounded by a capacitor C. The outputs are directly applied to the A0 terminal of the TCL 76 for various controls on the one hand, and are applied to the A1 terminal through a comparator 88 on the other. The negative terminal of the comparator 88 is impressed with a prescribed value of 4.5 volts as a reference voltage, so that if the steering angle sensor 84 is disconnected, the input voltage at the A0 terminal exceeds the prescribed value and the comparator 88 is turned on, with the result that the input voltage at the A1 terminal continues to be a high level H. The program of the system is so set that in the case where the input voltage at the A1 terminal continues to be the high level H for, say, two seconds, therefore, it is decided that a disconnection has occurred and the action is taken to detect a fault which may have developed in the steering angle sensor 84 or the steering shaft reference position sensor 86.

Although a fault of the steering angle sensor 84 or the like is detected by hardware in the aforementioned embodiment, a similar function may of course be performed by detecting a fault in software fashion.

Figure 17:
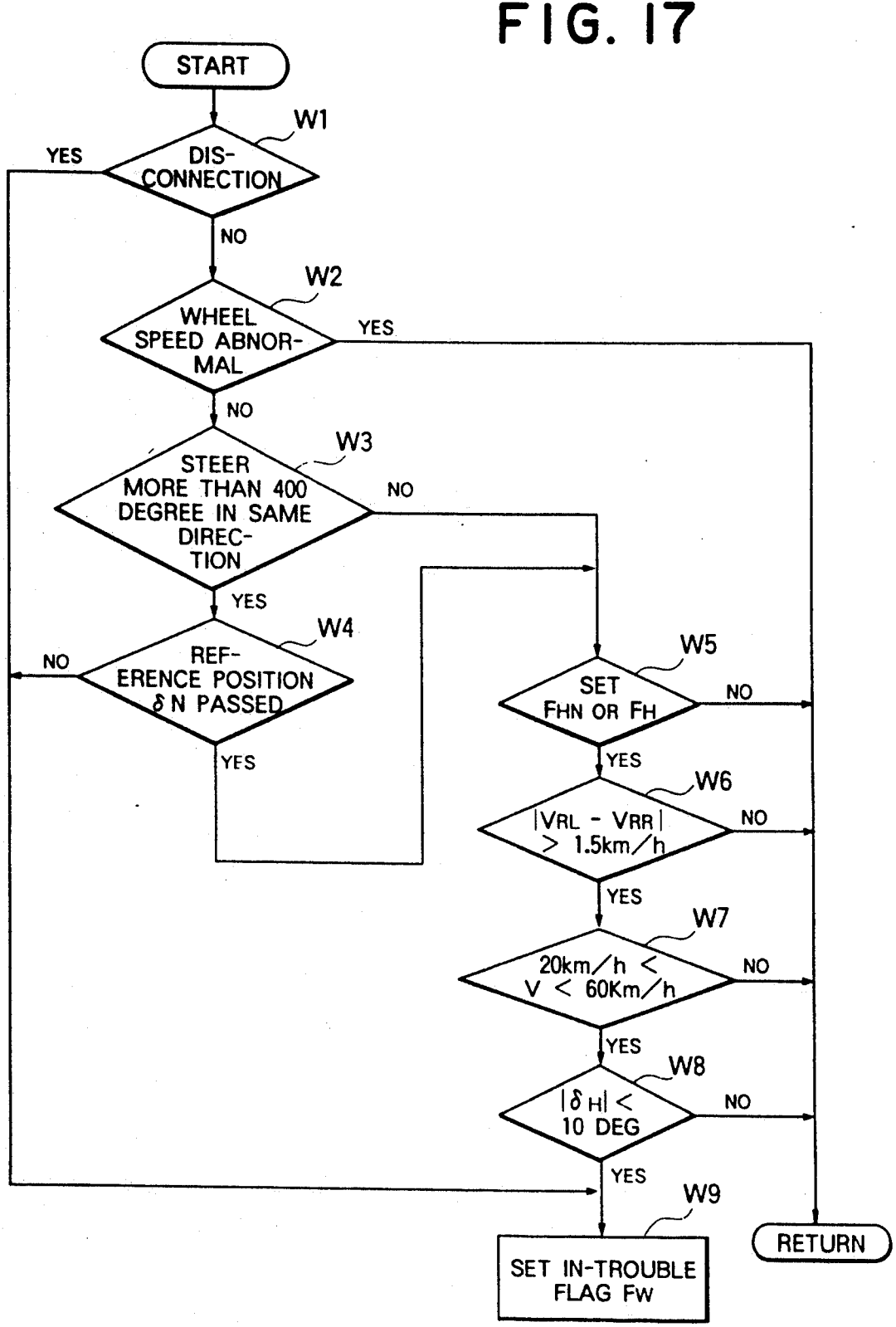
FIG. 17 is a flowchart showing a flow of the process of detecting a fault of the steering angle sensor.

An example of the procedure for fault detection is shown in FIG. 17. As shown in FIG. 17, the TCL 76 first decides on a fault as a result of detecting a disconnection at step W1, as discussed in FIG. 16. In the case where no fault is decided, step W2 decides whether or not there has developed a fault in the front wheel rotational speed sensor 66 or the rear wheel rotational speed sensors 80, 81. If step W2 decides that the rotational speed sensor 66, 80, 81 have not developed any fault, the process proceeds to step W3 for deciding whether the steering shaft 83 has been turned more than one revolution, say, more than 400 degree in a direction. If step W3 decides that the steering shaft 83 has been operated more than 400 degree in the same direction, step W4 decides whether or not the steering shaft reference position sensor 86 has produced a signal indicating the reference position $\delta_N$ of the steering shaft 83.

If step W4 decides that there is no signal supplied for indicating the reference position $\delta_N$ of the steering shaft 83 from the steering shaft reference position sensor 86, to the extent that the steering shaft reference position sensor 86 is normal in operation, there should be supplied, at least once, a signal for indicating the reference position $\delta_N$ of the steering shaft 83, so that step W4 decides that the steering angle sensor 84 is in trouble, thereby setting a fault-under-generation flag $F_W$.

In the case where said step W3 decides that the steering shaft 83 is not operated more than 400 degree in the same direction, or step W4 decides that a signal for indicating the reference position $\delta_N$ of the steering shaft 83 has been supplied from the steering shaft reference position sensor 86, then step W6 decides whether or not the neutral position $\delta_M$ has been learned, that is, whether or not at least one of the two steering angle neutral position learning-over flags $F_{HN}$, $F_H$ is set.

Assume that step W6 decides that the learning of the neutral position $\delta_M$ of the steering shaft 83 is complete. If step W7 decides that the rear wheel speed error $|V_{RL}-V_{RR}|$ exceeds, say, 1.5 km per hour, and step W8 decides that the vehicle speed V is intermediate 20 km per hour and 60 km per hour, for example, and step W9 decides that the absolute value of the steering angle $\delta_H$ of the steering shaft 83 is less than, say, 10 degree, i.e., that the vehicle 82 is turning at a speed higher than a predetermined level, then, to the extent that the steering angle sensor 84 functions normally, said absolute value of the steering angle $\delta_H$ should be more than 10 degree. Thus step W10 decides that the steering angle sensor 84 is in trouble.

Figure 18:
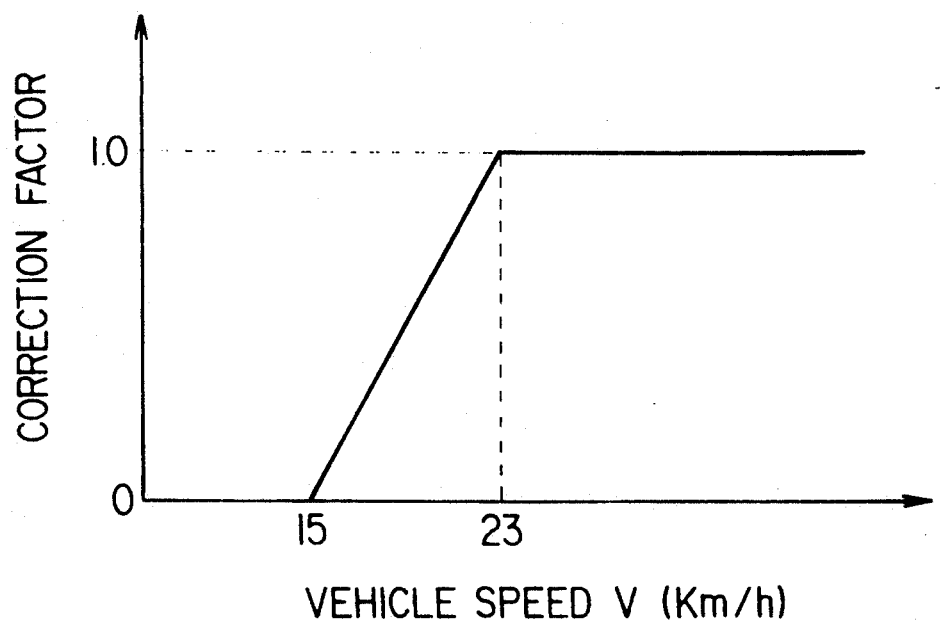
FIG. 18 is a map showing the relationship between vehicle speed and correction factor.

The slip correction amount $V_{KC}$ corresponding to the target lateral acceleration $G_{YO}$, taking the driver's turning addition into consideration, is set to a value slightly smaller than the slip correction amount $V_{KC}$ associated with the corrected lateral acceleration $G_{YF}$ in a region of a small target lateral acceleration $G_{YO}$. Also, in the region of small vehicle speed V, it is desirable to secure the acceleration characteristic of the vehicle 82, while in the range of vehicle speed V higher than a predetermined level, on the other hand, consideration is required for turning ease. In view of this, the corrected slip correction amount $V_{KF}$ is computed by multiplying the slip correction amount $V_{KC}$ read from FIG. 15 by a correction factor corresponding to the vehicle speed V as read from the map shown in FIG. 18.

As a consequence, the target front wheel speed $V_{FO}$ for correction torque computation is reduced, so that the slip rate S at the time of turning decreases below the target slip rate $S_O$, thereby securing a superior turning characteristic in spite of a possible slight deterioration in the acceleration characteristic of the vehicle 82.

Figure 19:
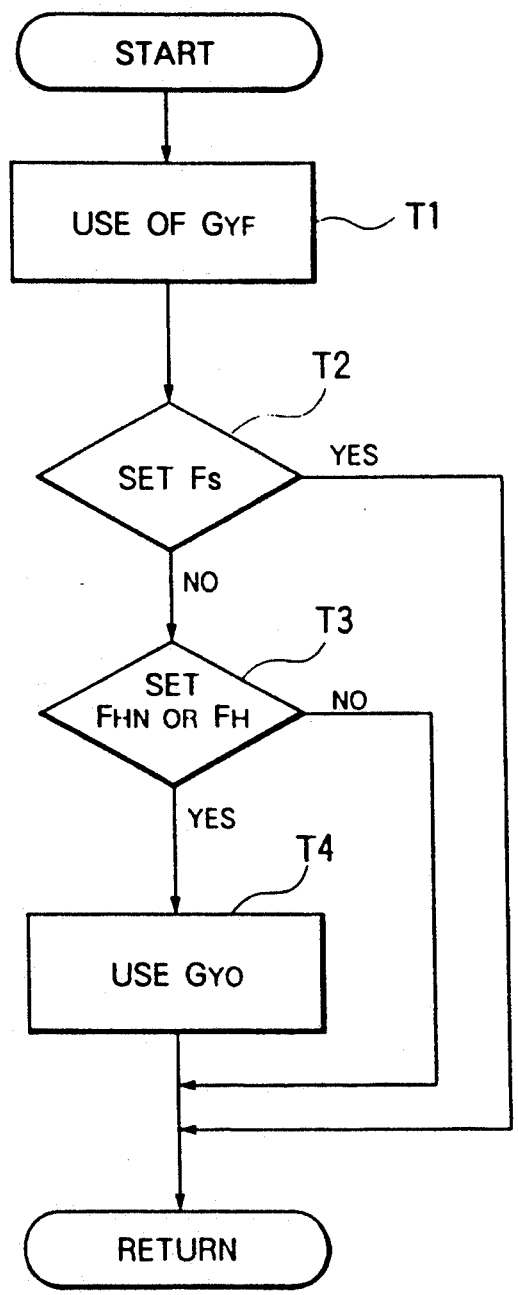
FIG. 19 is a flowchart showing a flow of the process of selecting the lateral acceleration.

A sequence for selecting the target lateral acceleration $G_{YO}$ and the actual lateral acceleration $G_Y$ is shown in FIG. 19. As shown in this diagram, the TCL 76 introduces, at step T1, the corrected lateral acceleration $G_{YF}$ from the filter means 123 as a lateral acceleration for computing the clip correction amount $V_{KC}$, and decides at step T2 whether or not the slip-under-control flag $F_S$ is set.

If step T2 decides that the slip-under-control flag $F_S$ is set, said corrected lateral acceleration $G_{YF}$ is employed as it is. This is due to the fact that if the lateral acceleration providing a basis for determining the slip correction amount $V_{KC}$ is changed considerably from a corrected lateral acceleration $G_{YF}$ to a target lateral acceleration $G_{YO}$ during slip control, the slip correction amount $V_{KC}$ would greatly change thereby often disturbing the behavior of the vehicle 82.

If said step T2 decides that the slip-under-control flag $F_S$ is not set, step T3 decides whether or not one of the two steering angle neutral position learning-over flags $F_{HN}$, $F_H$ is set. If it is decided that neither of the two steering angle neutral position learning-over flags $F_{HN}$, $F_H$ is set, the corrected lateral acceleration $G_{YF}$ is employed as it is. Also, if it is decided at step T3 that one of the two steering angle neutral position learning-over flags $F_{HN}$, $F_H$ is set, step T4 employs the target lateral acceleration $G_{YO}$ as a lateral acceleration for computing the slip correction amount $V_{KC}$.

As a result of the above-mentioned operations, the target front wheel speed $V_{FS}$ for correction torque computation is given as $$V_{FS} = V_{FO} + V_K - V_F$$

As the next process, the slip amount s providing an error between the actual front wheel speed $V_F$ produced from a detection signal of the front wheel rotational speed sensor 66 by filtering intended for removing noises and the target front wheel speed $V_{FS}$ for correction torque computation is computed at subtraction means 124. If this slip amount s is less than a negative setting, say, $-2.5$ km per hour, this value of $-2.5$ km per hour is clipped as a slip amount s at clip means 125. The slip amount s thus clipped is subjected to the proportional correction described below and the excessive control at this process of proportional correction is prevented, thereby preventing an output hunting.

Also, the slip amount s before clipping is subjected to an integral correction using an integration constant $\Delta T_I$ described later and further to a differential correction thereby to compute a final correction torque $T_{PID}$.

Figure 20:
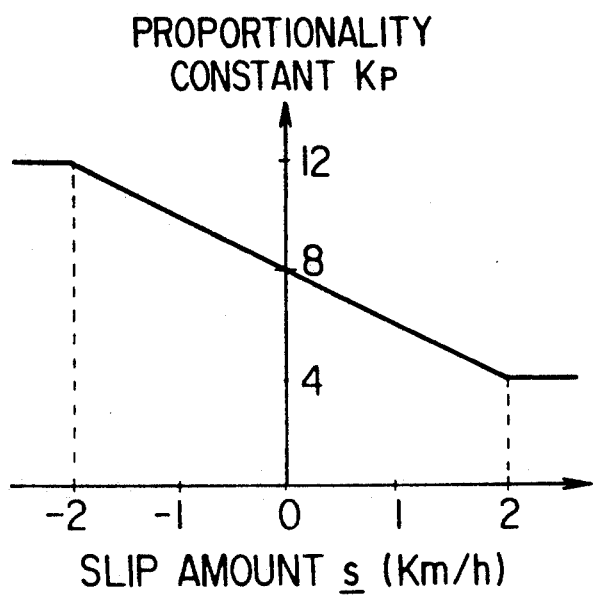
FIG. 20 is a map showing the relationship between slip amount and proportionality constant.

For the purpose of the proportional correction mentioned above, multiplier means 126 determine a basic correction amount by multiplying the slip amount s by a proportionality constant $K_P$, and further, multiplier means 127 produce a proportional correction torque $T_P$ by multiplying a predetermined correction factor $\rho_{KP}$ preset by a speed change ratio $\rho_m$ of the hydraulic automatic transmission 13. Incidentally, the proportionality constant $K_P$ is read out of the map shown in FIG. 20 in accordance with the slip amount s after the clipping process.

In order to realize the integrating correction corresponding to the gradual change in slip amount s, integrating operation means 128 compute a basic correction amount, and multiplier means 129 multiply this correction amount by a correction factor $\rho_{KI}$ set in advance on the basis of the speed change ratio $\rho_m$ of the hydraulic automatic transmission 13, thereby producing an integrating correction torque $T_I$. In this case, according to the present embodiment, a predetermined minor integrating correction torque $\Delta T_I$ is integrated. In the case where slip amount s is positive, the minor integrating correction torque $\Delta T_I$ is added at sampling intervals of 15 milliseconds. When the slip amount s is negative, by contrast, the minor integrating correction torque $\Delta T_I$ is subtracted.

Figure 21:
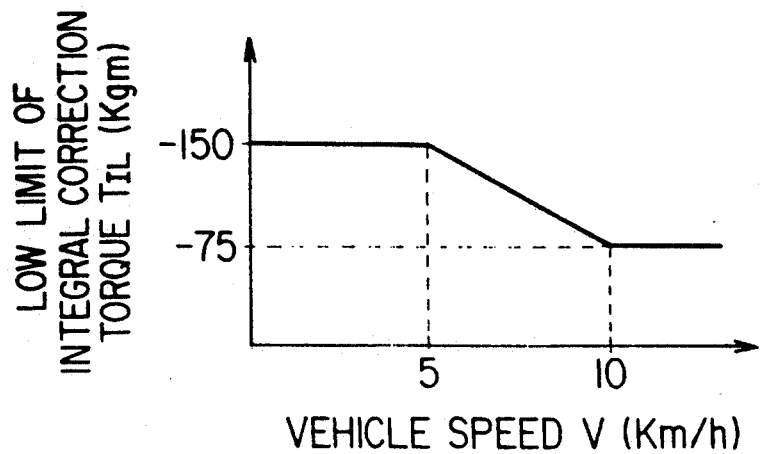
FIG. 21 is a map showing the relationship between vehicle speed and a low limit of the integral correction torque.

A low limit $T_{IL}$ variable in accordance with the vehicle speed V as shown in the map of FIG. 21 is set to the integrating correction torque $T_I$. As a result of this clipping process, at the time of starting the vehicle 82, especially, when starting midway of an ascending slope, a large integrating correction torque $T_I$ is produced to secure the driving force of the engine 11, and when the vehicle speed V increases to a predetermined level after starting the vehicle 82, the integrating correction torque $T_I$ is reduced because, if the correction is excessive, the control would lack stability. Also, in order to improve the convergence of the control operation, a high limit of the integrating correction torque $T_I$ is set to, say, 0 kgm, as a clipping process, whereby the integrating correction torque $T_I$ undergoes a change as shown in FIG. 22.

The proportional correction torque $T_P$ and the integrating correction torque $T_I$ thus computed are added to each other at adder means 130 thereby to compute a proportional integrating correction torque $T_{PI}$.

Figures 22, 23:
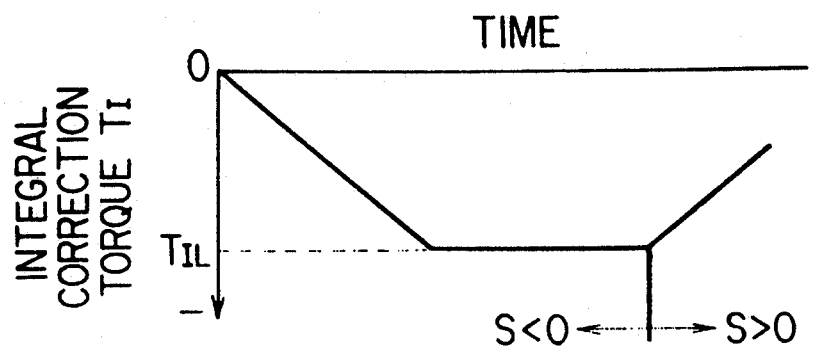
FIG. 22 is a graph showing a change area of the integral correction torque.
FIG. 23 is a map showing the relationship between each gear shift position of the hydraulic automatic transmission and the correction factor for each correction torque.

Said correction factors $\rho_{KP}$, $\rho_{KI}$ are read from a map shown in FIG. 23 predetermined in relation to the speed change ratio $\rho_m$ of the hydraulic automatic transmission 13.

According to the present embodiment, differential operation means 131 compute the change rate $G_S$ of the slip amount s, which is multiplied by the multiplication factor $K_D$ at multiplier means 132 thereby to compute a basic correction amount against a sudden change in slip amount s. The resultant value is defined by high and low limits and clipped by clip means 133 not to increase the differential correction torque $T_D$ to an extremely great value. A differential correction torque $T_D$ is thus produced. In view of the fact that the wheel speeds $V_F$, $V_{RL}$, $V_{RR}$ of a running vehicle 82 may instantaneously slip or enter a locked state depending on the road surface conditions or the running conditions of the vehicle 82, often with the result that the change rate $G_S$ of the slip amount s may increase to an extreme positive or negative value for a dissipated control and a lower responsiveness, the clip means 133 clip the low limit to $-55$ kgm and the high limit to 55 kgm, for example, thereby preventing the differential correction torque $T_D$ from assuming an extremely large value.

The proportional integrating correction torque $T_{PI}$ and the differential correction torque $T_D$ are added to each other at adder means 134, and the resultant final correction torque $T_{PID}$ is subtracted from the reference drive torque $T_{PID}$ at the subtraction means 116. Further, multiplier means 135 multiply the reciprocals of the total reduction ratios between the engine 11 and the wheel shafts 89, 90 of the front wheels 64, 65, thereby computing the target drive torque $T_{OS}$ for slip control as shown in the following equation (6).

$$T_{OS} = \frac{T_B - T_{PID}}{\rho_m \cdot \rho_d \cdot \rho_T} \tag{6}$$

where $\rho_d$ is the reduction ratio of the differential gear, and $\rho_T$ is the torque converter ratio. In conducting an up-shift speed change operation of the hydraulic automatic transmission 13, the speed change ratio $\rho_m$ on high-speed shift side is produced after the speed change operation. More specifically, if the speed change ratio $\rho_m$ on high speed side is employed at the time of output of a speed change signal in conducting an up-shift speed change operation of the hydraulic automatic transmission 13, as obvious also from the above-mentioned equation (6), the target drive torque $T_{OS}$ would increase to such an extent that the engine 11 would blow up during the speed change operation. For this reason, for a period of, say, 1.5 seconds after producing a speed change start signal to the completion of the speed change operation the speed change ratio $\rho_m$ on low speed side is held at a level permitting a further reduction in the target drive torque $T_{OS}$. The speed change ratio $\rho_m$ on high speed side is employed when the period of 1.5 seconds has passed after the production of a speed change start signal. For a similar reason, in the case of down-shift speed change operation of the hydraulic automatic transmission 13, the speed change ratio $\rho_m$ on low speed side is immediately employed at the time of output of a speed change signal.

The target drive torque $T_{OS}$ computed in said equation (6) should naturally become a positive value. In order to prevent a computation error, therefore, clip means 136 clip the target drive torque $T_{OS}$ to 0 or more, and the information on this target drive torque $T_{OS}$ is applied to the ECU 15 in accodance with the decision process at start/end decision means 137 for deciding on the start or end of slip control.

The start/end decision means 137 decide that the slip control be started and sets the slip-under-control flag $F_S$ when all the conditions set forth in (a) to (e) below are satisfied. At the same time, the output from the low vehicle speed selector 101 is selected as a vehicle speed $V_S$ for slip control by the operation of the change-over switch 103, and the information on the target drive torque $T_{OS}$ is applied to the ECU 15, while at the same time deciding to end the slip control and continuing the same process until the slip-under-control flag $F_S$ is reset.

(a) The driver is desirous of slip control by operating a manual switch (not shown).

(b) The drive torque $T_d$ demanded by the driver is a minimum torque, say, 4 kgm or more as required for driving the vehicle 82.

Figure 24:
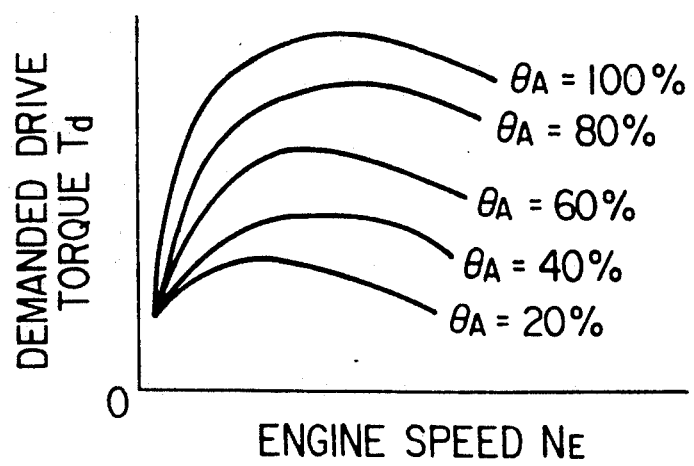
FIG. 24 is a map showing the relationship between the number of engine r.p.m., a demanded drive torque and an accelerator opening degree.

According to the present embodiment, this demanded drive torque $T_d$ is read out of a map as shown in FIG. 24 which is set in advance on the basis of an engine speed $N_E$ computed by a detection signal from the crank angle sensor 62 and an accelerator opening degree $\theta_A$ computed in accordance with a detection signal from the accelerator opening sensor 67.

(c) The slip amount s is at least 2 km per hour or more.

(d) The change rate $G_S$ of the slip amount s is at least 0.2 g or more.

(e) The actual front wheel acceleration $G_F$ obtained by differentiating the actual front wheel speed $V_F$ by time at differential operation means 138 is at least 0.2 g or more.

In the case where after the start/end decision means 137 has decided to start a slip control, any of the conditions (f) and (g) below is satisfied, a slip control end is decided and the slip-under-control flag $F_S$ is reset. Then the impartation of the target drive torque $T_{OS}$ to the ECU 15 is suspended, while at the same time energizing the change-over switch 103 in such a manner as to select the output of the high vehicle speed selector 102 as a vehicle speed $V_S$ for slip control.

(f) The target drive torque $T_{OS}$ continues to be more than the demanded drive torque $T_d$ and the slip amount s less than a predetermined value, say, $-2$ km per hour for more than a predetermined length of time, say, 0.5 seconds.

(g) The idle switch 68 turns on from off state, and remains on, that is, the driver continues to open the accelerator pedal 31 for more than a predetermined length of time, say, 0.5 seconds.

The aforementioned vehicle 82 is equipped with a manual switch (not shown) for enabling the driver to select the slip control, and when the driver operates this manual switch to select the slip control, the slip control operation described below is performed.

Figure 25:
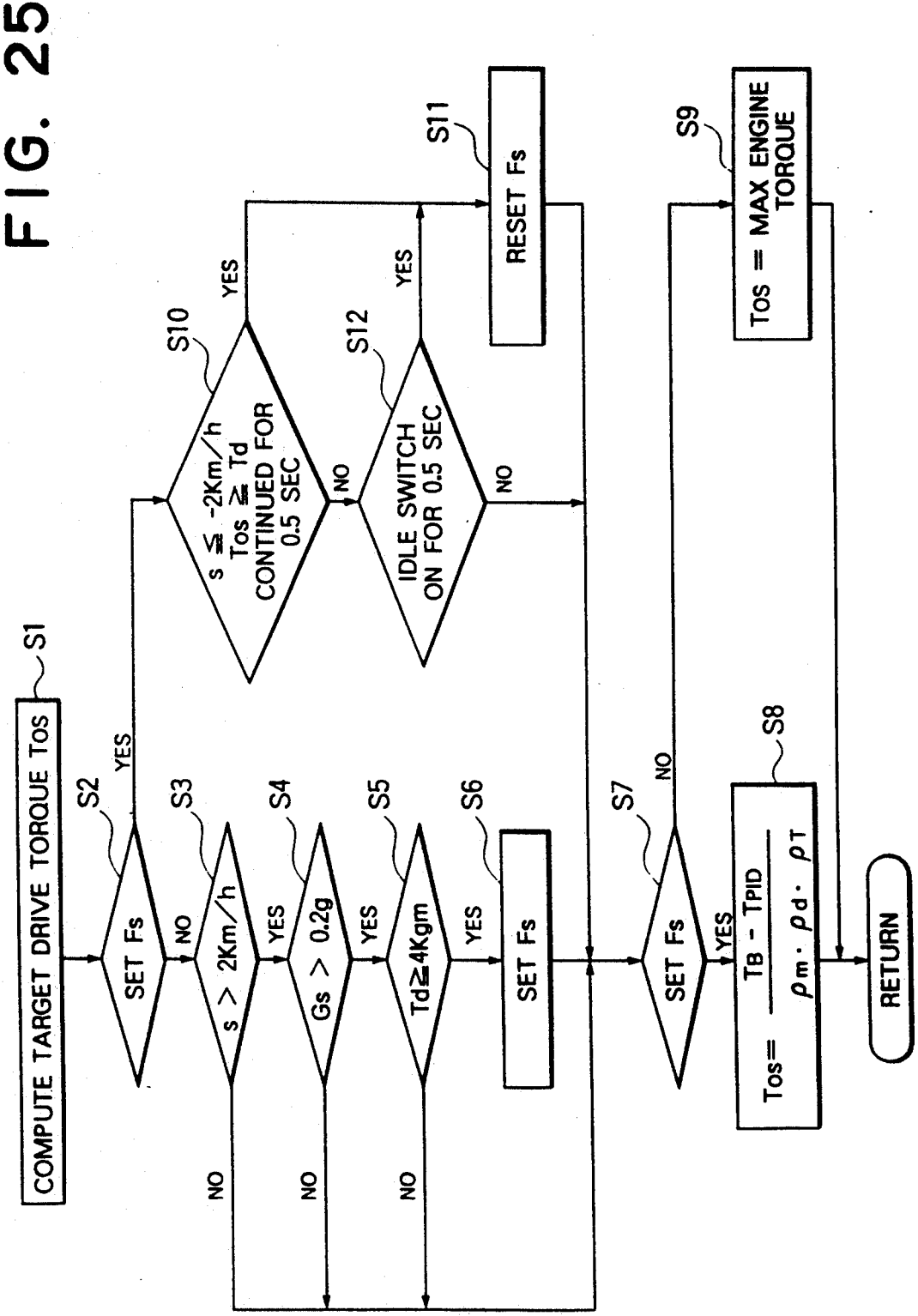
FIG. 25 is a flowchart showing a flow of slip control.

As seen from FIG. 25 showing a flow of the process of slip control, the TCL 76 detects and computes various data as described above at step S1 to compute the target drive torque $T_{OS}$. This operation is performed regardless of the manual switch operation described above.

Then, step S2 decides whether or not the slip-under-control flag $F_S$ is set. Since the slip-under-control flag $F_S$ is not set initially, the TCL 76 decides at step S3 whether the slip amount s of the front wheels 64, 65 is larger than a predetermined threshold value, say, 2 km per hour.

If this step S3 decides that the slip amount s is larger than 2 km per hour, the TCL 76 decides at step S4 whether the change rate $G_S$ of the slip amount s is larger than 0.2 g or not.

If this step S4 decides that the slip amount change rate $G_S$ is larger than 0.2 g, the TCL 76 decides at step S5 whether the drive torque $T_d$ demanded by the driver is larger than the minimum drive torque, say, 4 kgm, required for driving the vehicle 82, that is, whether or not the driver is willing to drive the vehicle 82.

If this step S5 decides that the demanded drive torque $T_d$ is larger than 4 kgm, i.e., that the driver is willing to drive the vehicle 82, then step S6 sets the slip-under-control flag $F_S$, followed by step S7 for deciding again whether the slip-under-control flag $F_S$ is set or not.

In the case where this step S7 decides that the slip-under-control flag $F_S$ is in set state, step S8 employs the target drive torque $T_{OS}$ for slip control computed in advance from said equation (6) as the target drive torque $T_{OS}$ of the engine 11.

In the event that said step S7 decides that the slip-under-control flag $F_S$ is in reset state, the TCL 76 produces, at step S9, the maximum torque of the engine 11 as a target drive torque $T_{OS}$, whereby the ECU 15 reduces the duty factor of the torque control solenoid valves 51, 56 to 0%, with the result that the engine 11 generates a drive torque commensurate with the amount of step-on of the accelerator pedal 31 by the driver.

In the case where step S3 decides that the slip amount s of the front wheels 64, 65 is smaller than 2 km per hour, or where step S4 decides that the slip amount change rate GS is smaller than 0.2 g, or where step S5 decides that the demanded drive torque $T_d$ is smaller than 4 kgm, then the process is directly passed to step S7, while the TCL 76 produces, at step S9, the maximum torque of the engine 11 as a target drive torque $T_{OS}$, whereby the ECU 15 reduces the duty factor of the torque control solenoid valves 51, 56 to 0%, with the result that the engine 11 generates a drive torque commensurate with the amount of step-on of the accelerator pedal by the driver.

If the step S2 decides that the slip-under-control flag $F_S$ is set, the process proceeds to step S10 for deciding whether the slip amount s of the front wheels 64, 65 remains less than the threshold value mentioned above, that is, $-2$ km per hour, and at the same time the demanded drive torque $T_d$ remains less than the target drive torque $T_{OS}$ for a time length of longer than 0.5 seconds or not.

In the case where this step S10 decides that the slip amount s remains smaller than 2 km per hour and at the same time the demanded drive torque $T_d$ remains less than the target drive torque $T_{OS}$ for a time length of longer than 0.5 seconds, that is to say, the driver is not desirous of accelerating the vehicle 82 any longer, then step 11 resets the slip-under-control flag $F_S$, followed by proceeding to step S7.

If said step S10 decides that the slip amount s remains larger than 2 km per hour or the demanded drive torque $T_d$ remains less than the target drive torque $T_{OS}$ for a time length not longer than 0.5 seconds, that is to say, the driver is desirous of accelerating the vehicle 82, then the TCL 76 decides at step S12 whether or not the idle switch 68 remains turned on, that is, whether the throttle valve 20 remains closed up for longer than 0.5 seconds.

If this step S12 decides that the idle switch 68 is on, in view of the indication that the driver has not stepped on the accelerator pedal 31, the process is passed to step S11 for resetting the slip-under-control flag $F_S$. If it is decided that the idle switch 68 is off, in contrast, it indicates that the driver has stepped on the accelerator pedal 31, and therefore the process is passed again to step S7.

In the event that the driver has not operated the manual switch for selecting the slip control, incidentally, the TCL 76 computes the target drive torque $T_{OS}$ for slip control in the manner mentioned above, and then computes the target drive torque of the engine 11 for the turning control.

Although the lateral acceleration $G_Y$ of the vehicle 82 is capable of being computed actually from the aforementioned equation (5) by the use of the rear wheel speed error $|V_{RL}-V_{RR}|$, the utilization of the steering shaft turning angle $\delta_H$ advantageously permits the value of the lateral acceleration $G_Y$ acting on the vehicle 82 to be forecast, thereby making possible rapid control.

In view of this, at the time of turning control of the vehicle 82, the TCL 76 computes the target lateral acceleration $G_{YO}$ of the vehicle 82 by the aforementioned equation (3) from the steering shaft turning angle $\delta_H$ and the vehicle speed V, and sets the vehicle acceleration in longitudinal direction, that is, the target longitudinal acceleration $G_{XO}$ on the basis of the target lateral acceleration $G_{YO}$ in such a way that the vehicle 82 may not be extremely understeered. The target drive torque $T_{OC}$ of the engine 11 corresponding to the target longitudinal acceleration $G_{XO}$ is thus computed.

Figure 26:
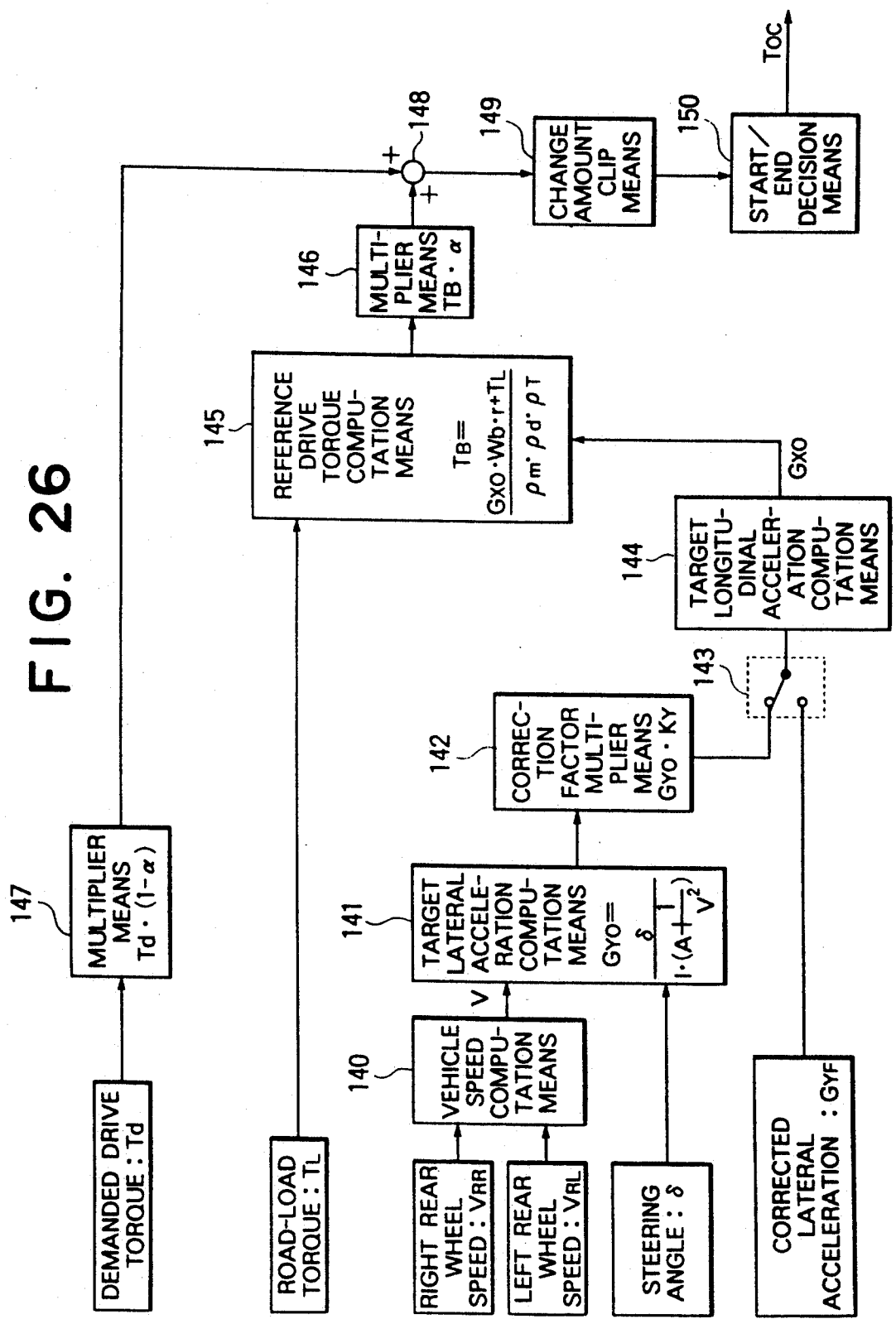
FIG. 26 is a block diagram showing steps of computing a target drive torque for the turning control.
Figure 27:
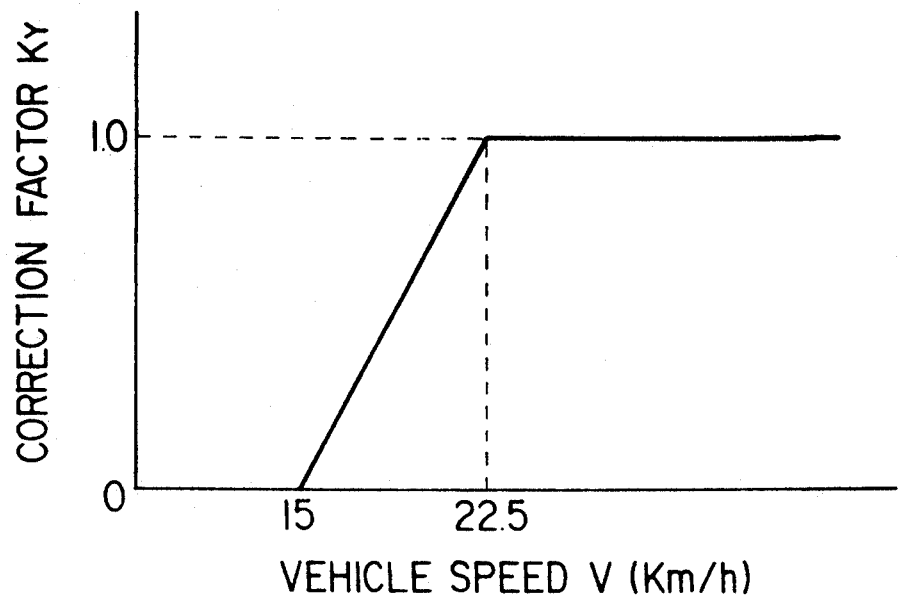
FIG. 27 is a map showing the relationship between vehicle speed and a correction factor.

As seen from FIG. 26 showing an operation block of such a turning control, the TCL 76 computes, at vehicle computation means 140, the vehicle speed V by the aforementioned equation (1) from the output of the pair of rear wheel rotational speed sensors 80, 81 on the one hand and the steering angle $\delta$ of the front wheels 64, 65 by the aforementioned equation (2) on the basis of a detection signal produced from the steering angle sensor 84 on the other hand, so that a corresponding target lateral acceleration $G_{YO}$ of the vehicle 82 is computed from the aforementioned equation (3) at target lateral acceleration computation means 141. In the process, if the vehicle speed V is in a small region, for example, less than 22.5 km per hour, the prohibition rather than the implementation of the turning control permits the vehicle to be accelerated to sufficient extent, often conveniently for safety, in turning to the right or left at an intersection with heavy traffic or the like. According to the present embodiment, therefore, the correction factor $K_Y$ as shown in FIG. 27 is multiplied by the target lateral acceleration $G_{YO}$ in accordance with the vehicle speed V at correction factor multiplier means 142.

Under the condition where the steering shaft neutral position $\delta_M$ is not learned, on the other hand, the computation of the target lateral acceleration $G_{YO}$ from the equation (3) on the basis of the steering angle $\delta$ poses a reliability problem. It is not desirable, therefore, to start the turning control until the steering shaft neutral position $\delta_M$ is learned. In the case of running along a curved path immediately after starting of the vehicle 82, however, the conditions of starting learning of the steering shaft neutral position would often inconveniently fail to be satisfied in spite of the need of the turning control of the vehicle 82. In order to obviate this inconvenience, according to the present embodiment, until the steering shaft neutral position $\delta_M$ is learned, the turning control may be effected, by operation of a change-over switch 143, using the corrected lateral acceleration $G_{YF}$ produced from the filter means 123 on the basis of the aforementioned equation (5). More specifically, as long as the two steering angle neutral position learning-over flags $F_{HN}$, $F_H$ are both reset, the corrected lateral acceleration $G_{YF}$ is employed through the change-over switch 143, whereas once at least one of the two steering angle neutral position learning-over flags $F_{HN}$, $F_H$ is set, the change-over switch 143 is used to select the target lateral acceleration $G_{YO}$ from the correction factor multiplier means 142.

Figure 28:
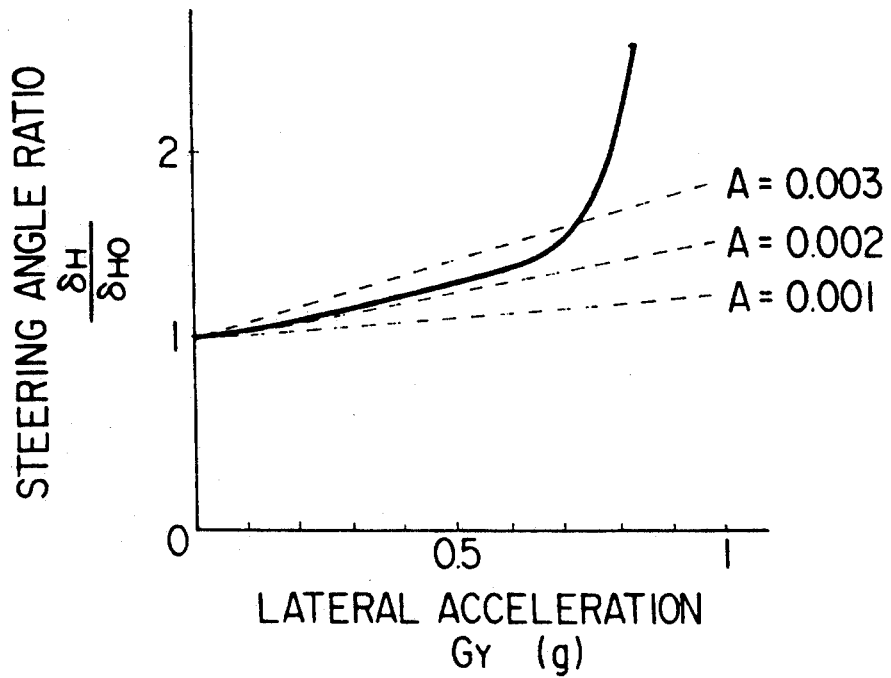
FIG. 28 is a graph showing the relationship between lateral acceleration and the steering angle ratio for explaining a stability factor.

The stability factor A described above, as well known, is a value dependent on such factors as the construction of the suspension, the tire characteristics of the vehicle 82 or the road surface conditions. More specifically, the stability factor A is expressed as an inclination of the tangent in a graph as shown in FIG. 28, for example, representing the relationship between the actual lateral acceleration $G_Y$ generated in the vehicle 82 at the time of normal circular turn and the corresponding steering angle ratio $\delta_H/\delta_{HO}$ of the steering shaft 83 (the ratio of the turning angle $\delta_H$ of the steering shaft 83 under acceleration to the turning angle $\delta_{HO}$ of the steering shaft under the drive at a very low speed where the lateral acceleration $G_Y$ approaches zero, with reference to the neutral position $\delta_M$ of the steering shaft 83). As seen from this graph, in a region where the lateral acceleration $G_Y$ is small with the vehicle speed not very high, the stability factor A assumes a substantially constant value (A=0.002). while once the lateral acceleration $G_Y$ exceeds 0.6 g, the stability factor A exhibits a sharp upturn, so that the vehicle 82 shows a very strong tendency toward an understeering.

For the reasons mentioned above, on the basis of FIG. 28 associated with a dry paved road (hereinafter referred to as a "high-$\mu$ road"), the stability factor A is set to 0.002, and the drive torque of the engine 11 is controlled to assure that the target lateral acceleration $G_{YO}$ of the vehicle 82 computed from the equation (3) is less than 0.6 g.

In the case of a slippery road surface such as frozen path (hereinafter referred to as a "low-$\mu$ road"), on the other hand, the stability factor A may be set to about 0.005. On a low-$\mu$ road, the target lateral acceleration $G_{YO}$ is larger than the actual lateral acceleration $G_Y$, and therefore it is decided whether or not the target lateral acceleration $G_{YO}$ is larger than a predetermined threshold value, say, ($G_{YF}-2$). If the target lateral acceleration $G_{YO}$ is larger than such a threshold level, it is decided that the vehicle is running on a low-$\mu$ road, and the turning control thereof against a low-$\mu$ road is effected as required. Specifically, by adding 0.05 g to the corrected lateral acceleration $G_{YF}$ computed on the basis of the aforementioned equation (5), it is decided whether or not the target lateral acceleration $G_{YO}$ is larger than a predetermined threshold value, that is, in view of the fact that the target lateral acceleration $G_{YO}$ assumes a larger value than the actual lateral acceleration $G_Y$ on a low-$\mu$ road, it is decided whether or not the target lateral acceleration $G_{YO}$ is larger than this threshold value. And if the target lateral acceleration $G_{YO}$ is larger than the threshold value, it is decided that the vehicle 82 is running on a low-$\mu$ road.

Figure 29:
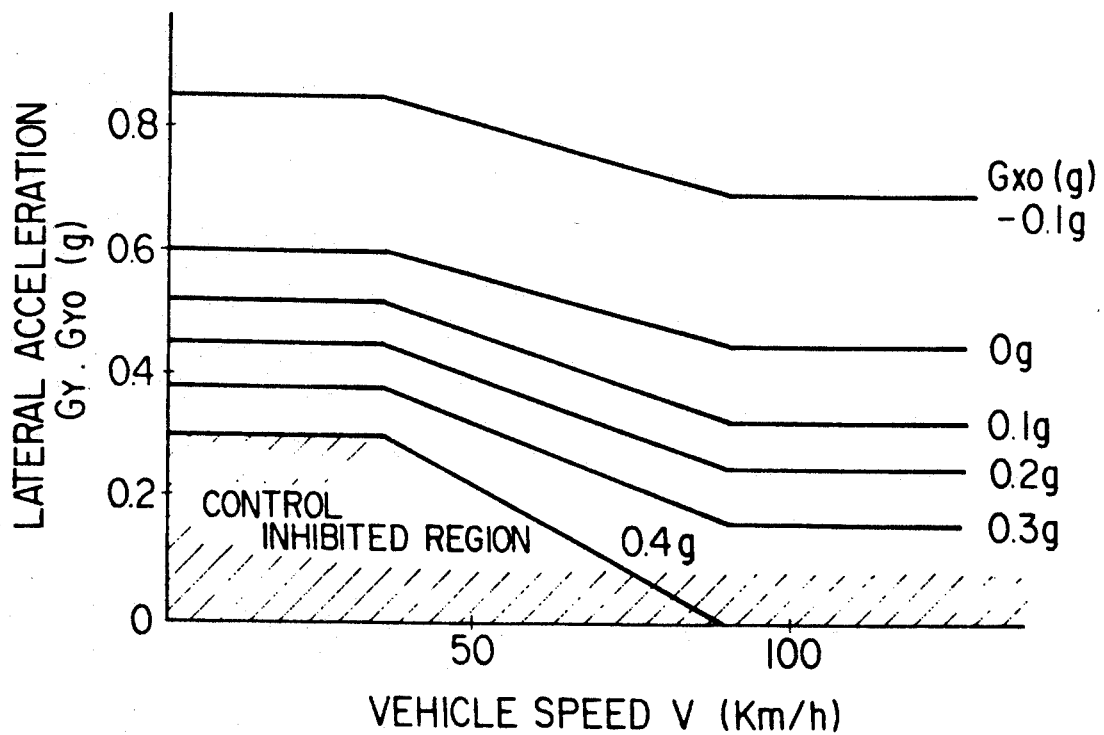
FIG. 29 is a map showing the relationship between a target lateral acceleration, lateral accelerations before and after the target and vehicle speed.
Figure 30:
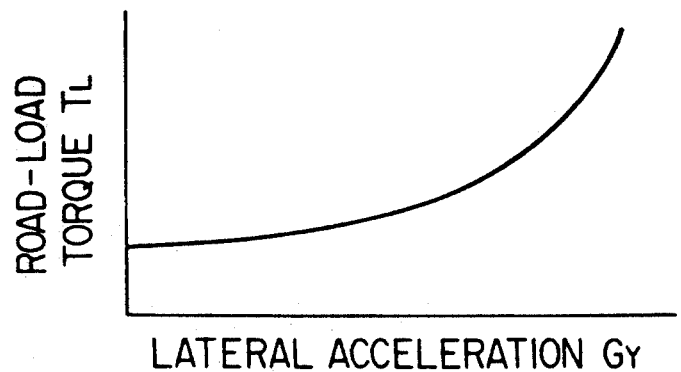
FIG. 30 is a map showing the relationship between lateral acceleration and load torque.

After computing the target lateral acceleration $G_{YO}$ in this way, the target longitudinal acceleration $G_{XO}$ of the vehicle 82 predetermined in accordance with the magnitude of said target lateral acceleration $G_{YO}$ and the vehicle speed V is read out of the map as shown in FIG. 29 stored in the ICL 76 beforehand by way of target longitudinal acceleration computation means 144. The reference drive torque $T_B$ of the engine 11 corresponding to such a target longitudinal acceleration $G_{XO}$ is computed from the following equation (7) by means of reference drive torque computation means 145.

$$T_B = \frac{G_{XO} \cdot W_b \cdot r + T_L}{\rho_m \cdot \rho_d \cdot \rho_T} \quad (7)$$

where $T_L$ is a road-load torque providing a road surface resistance determined as a function of the lateral acceleration $G_Y$ of the vehicle 82, and is obtained from the map as shown in FIG. 30 according to the present embodiment.

The determination of the target drive torque of the engine 11 from the steering shaft turning angle $\delta_H$ and the vehicle speed V would totally fail to reflect the will of the driver, often causing a persistent dissatisfaction with the maneuverability of the vehicle 82 on the part of the driver. It is desirable, therefore, to determine the drive torque $T_d$ of the engine 11 desired by the driver from the amount of step-on of the accelerator pedal 31 and to set a target drive torque of the engine 11 taking the demanded drive torque $T_d$ into consideration.

Accordingly, in the present embodiment, in order to determine the employment rate of the reference drive torque $T_B$, multiplier means 146 multiply the reference drive torque $T_B$ by a weighting factor $\alpha$ to determine a corrected reference drive torque. This weighting factor $\alpha$ is set experimentally by turning the vehicle 82, and assumes a value of approximately 0.6 for a high-$\mu$ road.

On the basis of the engine speed $N_E$ detected by the crank angle sensor 55 and the accelerator opening degree $\theta_A$ detected by the accelerator opening sensor 67, on the other hand, the drive torque $T_d$ desired by the driver is determined from the map as shown in FIG. 29, followed by the process at multiplier means 147 to compute the corrected demanded drive torque corresponding to said weighting factor $\alpha$ by multiplying the demanded drive torque $T_d$ by $(1-\alpha)$. If $\alpha$ is set to 0.6 for instance, the ratio of employment of the reference drive torque $T_B$ to the demanded drive torque $T_d$ is 6 to 4.

As a result, the target drive torque $T_{OC}$ of the engine 11 is computed from equation (8) below by adder means 148.

$$T_{OC} = \alpha \cdot T_B + (1-\alpha) \cdot T_d \quad (8)$$

In the case where the amount of change of the target drive torque $T_{OC}$ of the engine 11 set for every 15 milliseconds is very large, the shock caused with acceleration or deceleration of the vehicle 82 would deteriorate the riding quality. If the amount of change of the target drive torque $T_{OC}$ of the engine 11 is to such a degree as to deteriorate the riding quality of the vehicle 82, therefore, it is desirable to appropriately regulate the amount of increase or decrease of the target drive torque $T_{OC}$.

According to the present embodiment, change amount clip means 149 employ a computed present target drive torque $T_{OC(n)}$ as it is, if the absolute value $|\Delta T|$ of the difference between the presently computed target drive torque $T_{OC(n)}$ and the previously computed target drive torque $T_{OC(n-1)}$ is smaller than a tolerable change $T_K$, and sets the present target drive torque $T_{OC(n)}$ by the equation below, if the difference $\Delta T$ between the presently computed target drive torque $T_{OC(n)}$ and the previously computed target drive torque $T_{OC(n-1)}$ is not larger than a negative tolerable change $T_K$.

$$T_{OC(n)} = T_{OC(n-1)} - T_K$$

In other words, the decrement with respect to the previously computed target drive torque $T_{OC(n-1)}$ is regulated by the tolerable change $T_K$, thereby reducing the deceleration shock accompanying the reduction in drive torque of the engine 11. In the case where the difference $\Delta T$ between the presently computed target drive torque $T_{OC(n)}$, and the previously computed target drive torque $T_{OC(n-1)}$ is more than the tolerable change $T_K$, on the other hand, the present target drive torque $T_{OC(n)}$ is set by the following equation.

$$T_{OC(n)} = T_{OC(n-1)} + T_K$$

In other words, in the case where the difference $\Delta T$ between the presently computed target drive torque $T_{OC(n)}$ and the previously computed target drive torque $T_{OC(n-1)}$ exceeds the tolerable change $T_K$, the increment with respect to the previously computed target drive torque $T_{OC(n-1)}$ is regulated by the tolerable change $T_K$, thereby reducing the acceleration shock accompanying an increased drive torque of the engine 11.

In accordance with the process at start/end decision means 150 for deciding on the start or end of the turning control, the information on the aforementioned target drive torque $T_{OC}$ is applied to the ECU 15.

When all the conditions (a) to (d) described below are satisfied, the start/end decision means 150 decide to start the turning control, and set the turning-under-control flag $F_C$, while at the same time applying the information on the target drive torque $T_{OC}$ to the ECU 15. In this way, the start/end decision means 150 continue with this process until the means 150 decide that the turning control has ended and the turning-under-control flag $F_C$ is reset.

(a) The target drive torque $T_{OC}$ is smaller than the demanded drive torque $T_d$ less a threshold value, say, 2 kgm.
(b) The driver is desirous of a turning control by operating a manual switch not shown.
(c) The idle switch 68 is off.
(d) The control system for turning is normal.

In the case where any of the conditions described in (e) to (f) below is satisfied after the start/end decision means 150 decide that the turning control is started, on the other hand, it is decided that the turning control has ended, and the turning-under-control flag $F_C$ is reset with the transmission of the target drive torque $T_C$ to the ECU 15 suspended.

(e) The target drive torque $T_{OS}$ is more than the demanded drive torque $T_d$.
(f) The control system for turning is out of order, disconnected or otherwise faulty.

The output voltage of the accelerator opening degree sensor 77 and the accelerator opening degree $\theta_A$ are naturally in such a predetermined proportional relationship to each other that the accelerator opening degree sensor 77 is built in the throttle body 21 to ensure that the output voltage of the accelerator opening degree sensor 77 becomes 0.6 volts, for example, when the accelerator opening $\theta_A$ is closed up. After the accelerator opening degree sensor 77 is demounted from the throttle body 21 for the purpose of inspection or repair of the vehicle 82, however, it is virtually impossible to remount the accelerator opening degree sensor 77 into exactly the same position. In addition, the accelerator opening degree sensor 77 may be displaced in relation to the throttle body 21 due to secular variations or the like.

According to the present embodiment, the full-closure position of the accelerator opening degree sensor 77 is corrected by learning, whereby the reliability of the accelerator opening degree $\theta_A$ computed on the basis of the detection signal from the accelerator opening degree sensor 77 is secured.

Figure 31:
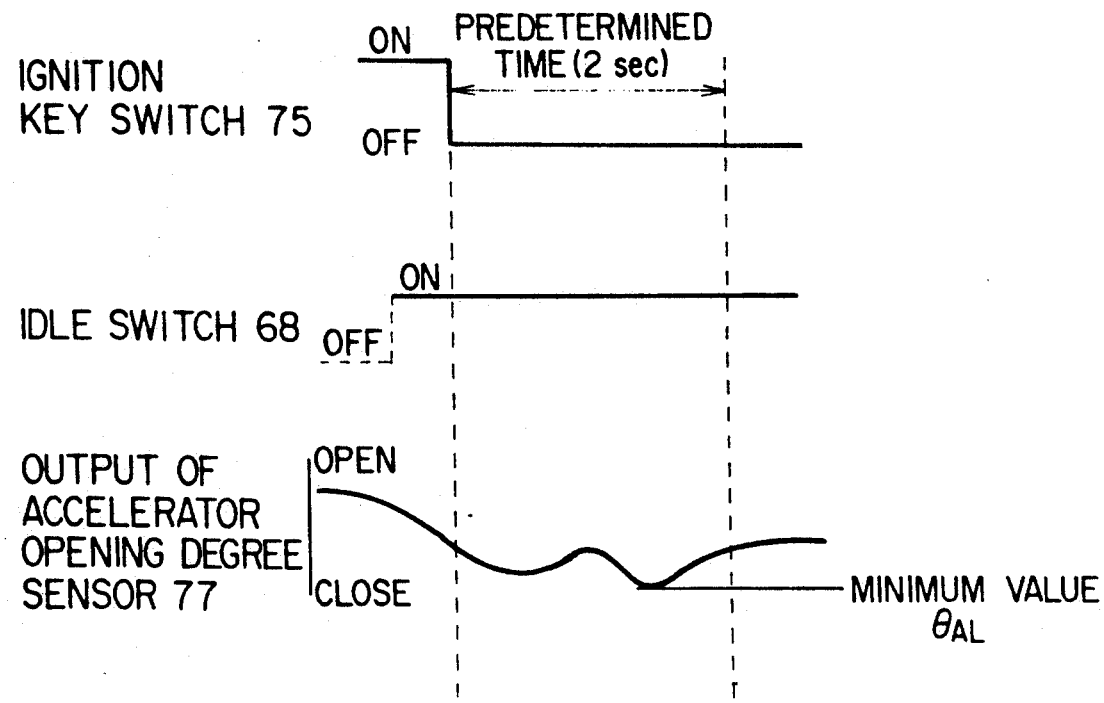
FIG. 31 is a graph showing an example of steps of correction by learning of a closed-up position of the accelerator pedal opening sensor.

The sequence of learning the full-closure position of the accelerator opening degree sensor 77 is shown in FIG. 31. The output of the accelerator opening degree sensor 77 is monitored for a predetermined length of time, say, 2 seconds after the idle switch 68 is turned on with the ignition switch 75 turned off, and in the meantime, the minimum value of the output of the accelerator opening degree sensor 77 is fetched as a full-closure position of the accelerator opening degree $\theta_A$ and stored in a not-shown backed-up RAM incorporated in the ECU 15, so that the accelerator opening degree $\theta_A$ is corrected on the basis of the minimum value of the output of the accelerator opening degree sensor 77 before the next learning.

Figure 32:
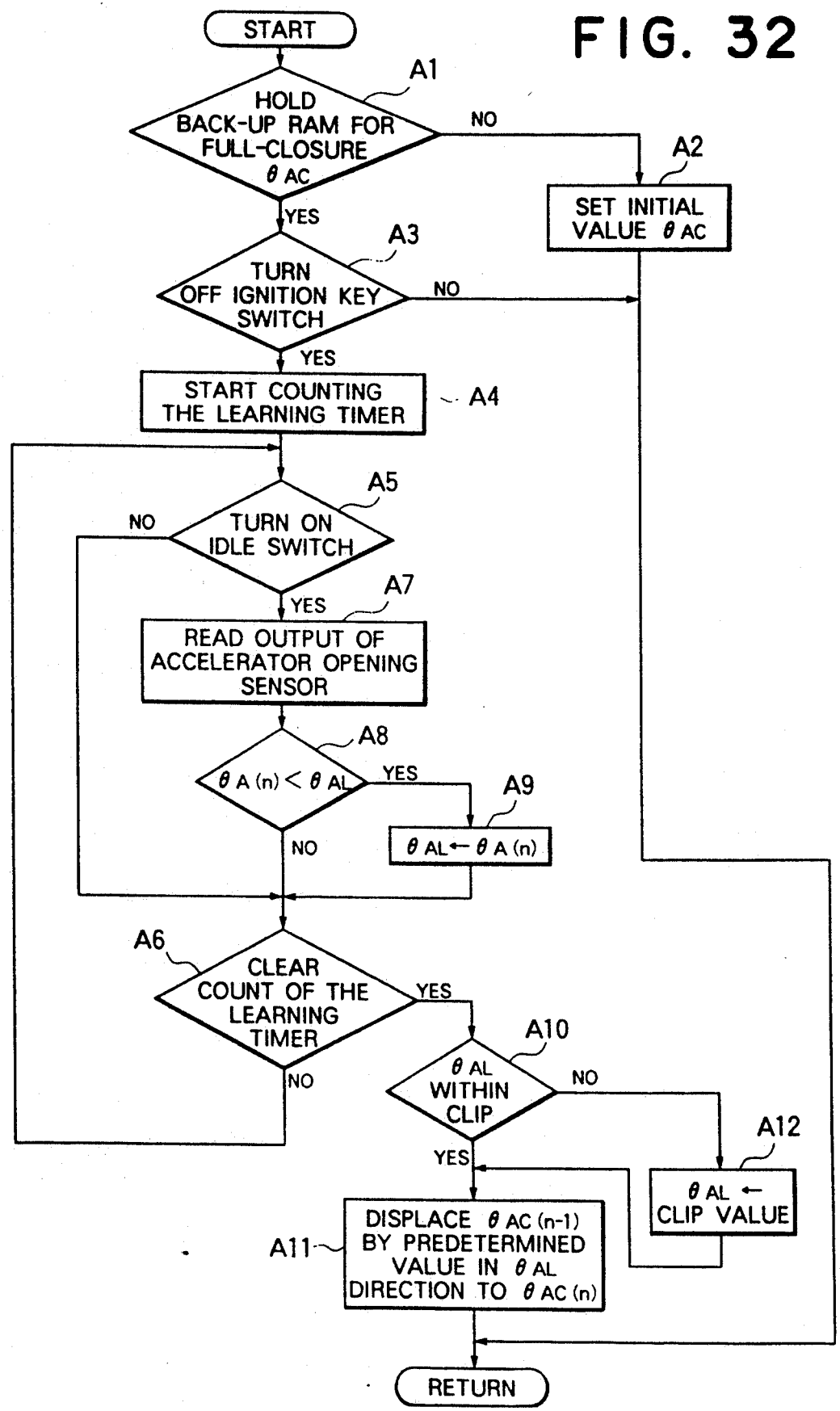
FIG. 32 is a flowchart showing another example of the flow of correction by earning of the closed-up position of the accelerator pedal opening sensor.

In the case where the storage battery not shown is demounted from the vehicle 82, however, the data in the RAM is erased, and therefore the learning procedure shown in FIG. 32 is employed.

More specifically the TCL 76 decides at step A1 whether or not the full-closure value $\theta_{AC}$ of the accelerator opening degree $\theta_A$ is stored in the RAM, and if this step A1 decides that the full-closure value $\theta_{AC}$ of the accelerator opening degree $\theta_A$ is not stored in the RAM, the initial value $\theta_{A(O)}$ is stored in the RAM at step A2.

In the case where this step A1 decides that the full-closure value $\theta_{AC}$ of the accelerator opening degree $\theta_A$ is stored in the RAM, step A3 decides whether or not the ignition switch 75 is on. If this step A3 decides that the ignition switch 75 has turned from on to off state, a learning timer (not shown) is energized to start counting at step A4. After this learning timer starts counting, step A5 decides whether or not the idle switch 68 is turned on.

If this step A5 decides that the idle switch 68 is off, step A6 decides whether or not the count of said learning timer has reached a setting, say, two seconds, followed by returning to step A5. In the event that step A5 decides that the idle switch 68 is on, the process is passed to step A7 for reading the output of the accelerator opening degree sensor 77 at predetermined time intervals, followed by step A8 for deciding whether or not the present accelerator opening degree $\theta_{A(n)}$ is smaller than the minimum value $\theta_{AL}$ of the past accelerator opening degree $\theta_A$.

If the decision is that the present accelerator opening degree $\theta_{A(n)}$ is larger than the minimum value $\theta_{AL}$ of the past accelerator opening degree $\theta_A$, the minimum value $\theta_{AL}$ of the past accelerator opening degree $\theta$ is held as it is. In the case where it is decided that the present accelerator opening degree $\theta_{A(n)}$ is smaller than the minimum value $\theta_{AL}$ of the past accelerator opening degree $\theta_A$, by contrast, step A9 updates the accelerator opening degree $\theta_{A(n)}$ as a new minimum value $\theta_{AL}$. This operation is repeated until the count of the learning timer reaches a setting, say, two seconds at step A6.

When the count of the learning timer has reached the setting, step A10 decides whether or not the minimum value $\theta_{AL}$ of the accelerator opening degree $\theta_A$ is in a predetermined clip range, say, between 0.3 volts and 0.9 volts. If it is decided that the minimum value $\theta_{AL}$ of the accelerator opening degree $\theta_A$ is included in the clip value range, step A11 employs, as a presently-learned full-closure value $\theta_{AC(n)}$ of the accelerator opening degree $\theta_A$, the initial value $\theta_{A(O)}$ or the full-closure value $\theta_{AC}$ of the accelerator opening degree $\theta_A$ nearer by a predetermined value, say, 0.1 volt to said minimum value $\theta_{AL}$. In other words, in the case where the initial value $\theta_{A(O)}$ or the full-closure value $\theta_{AC}$ of the accelerator opening degree $\theta_A$ is larger than the minimum value $\theta_{AL}$, the value $\theta_{AC(n)}$ is set as shown below.

$$\theta_{AC(n)} = \theta_{A(O)} - 0.1$$

$$\text{or } \theta_{AC(n)} = \theta_{AC(n-1)} - 0.1$$

In the case where the initial value $\theta_{A(O)}$ or the full-closure value $\theta_{AC}$ of the accelerator opening degree $\theta_A$ is larger than the minimum value $\theta_{AL}$ thereof, by contrast, the setting is made as shown below.

$$\theta_{AC(n)} = \theta_{A(O)} + 0.1$$

$$\text{or } \theta_{AC(n)} = \theta_{AC(n-1)} + 0.1$$

In the case where said step A10 decides that the minimum value $\theta_{AL}$ of the accelerator opening degree $\theta_A$ is not in the clip value range set in advance, step A12 replaces the displaced clip value with the minimum value $\theta_{AL}$ of the accelerator opening degree $\theta_A$, followed by proceeding to said step A11 for correcting by learning the full-closure value $\theta_{AC}$ of the accelerator opening degree $A$.

By setting high and low limits of the minimum value $\theta_{AL}$ of the accelerator opening degree $\theta_A$ in this way, the learning is not likely to fail even in the case of a fault of the accelerator opening degree sensor 77. Also, as a result of setting a unit learning correction amount to a predetermined value, a learning error is avoided even against an external disturbance such as noises.

In the aforementioned embodiment, the timing of starting of learning the full-closure value $\theta_{AC}$ of the accelerator opening degree sensor 77 is based on a time point of change from on to off state of the ignition key switch 75. As an alternative, a seating sensor (not shown) built in the seat may be used in such a manner that the driver leaving the seat is detected by the use of a pressure change of the seat or a positional change by a seating sensor even when the ignition key switch 75 is in on state, thereby starting the learning process of said step A4 and subsequent steps. It is also possible to start the learning of the full-closure value $\theta_{AC}$ of the accelerator opening degree sensor 77 at the time of detecting that a door lock means (not shown) is operated from outside of the vehicle 82 or by a key entry system. As another alternative method, the learning process may be implemented when the shift lever (not shown) of the hydraulic automatic transmission 13 is at neutral or parking position (the neutral position in the case of a vehicle having a manual transmission mounted thereon) or the manual brake is operated with the air-conditioner off that is, under other than an idle-up condition.

The aforementioned vehicle 82 is equipped with a manual switch (not shown) for enabling the driver to select the turning control. In the case where the driver selects the turning control by operation of this manual switch, the turning control is effected in the manner described below.

Figure 33:
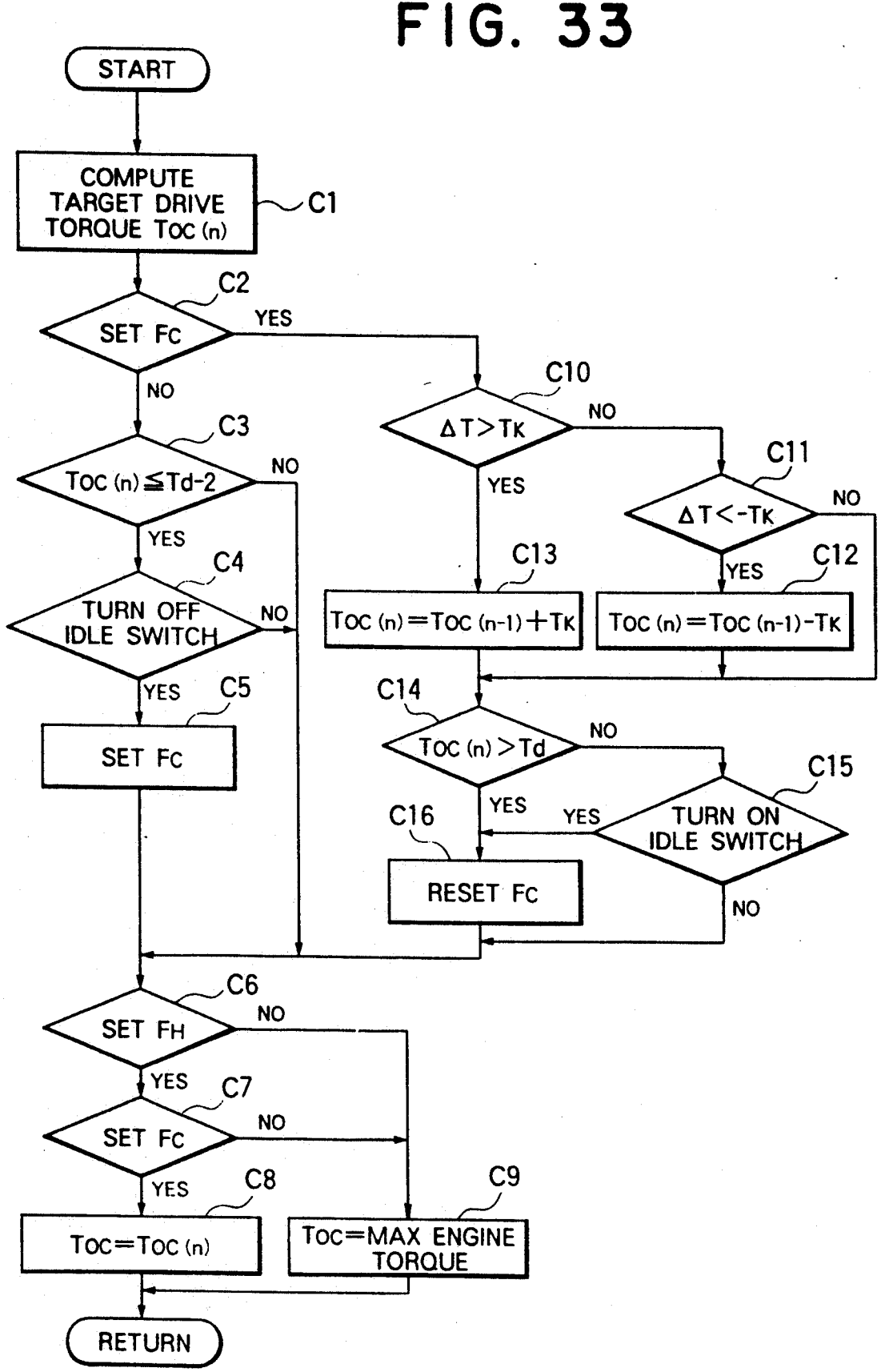
FIG. 33 is a flowchart showing a flow of turning control.

A flow of control for determining the target drive torque $T_{OC}$ for turning control is shown in FIG. 33. As shown in this diagram, step C1 computes the target drive torque $T_{OC(n)}$ by detection and computation of the various data described above. This operation is performed regardless of the operation of the above-mentioned manual switch.

Then, it is decided at step C2 whether or not the turning of the vehicle 82 is controlled, that is, turning-under-control flag $F_C$ is set. The turning is not controlled initially, and therefore it is decided that the turning-under-control flag $F_C$ is reset, followed by step C3 for deciding whether or not the target drive torque $T_{OC}$ is less than the threshold value $(T_d-2)$. More specifically, the target drive torque $T_{OC}$, which may be computed even while the vehicle 82 is running straight, is usually larger than the drive torque $T_d$ demanded by the driver. During the turning of the vehicle 82, however, this demanded drive torque $T_d$ generally assumes a small value, so that the starting condition is determined as a time point when the presently-computed target drive torque $T_{OC}$ is decreased below the threshold value $(T_d-2)$.

The threshold value is set to $(T_d-2)$ in order to form a hysteresis for preventing a control hunting.

If step C3 decides that the presently-computed target drive torque $T_{OC}$ is lower than the threshold value $(T_d-2)$, step C4 decides whether or not the idle switch 68 is off.

If this step C4 decides that the idle switch 68 is off, that is, the accelerator pedal 31 is stepped on by the driver, then, step C5 sets the turning-under-control flag $F_C$. Then, step C6 decides whether or not the steering angle neutral position learning-over flag $F_H$ is set, that is, whether the steering angle δ detected by the steering angle sensor 84 is reliable or not.

If step C6 decides that the steering angle neutral position learning-over flags $F_H$ is set, the process is passed to step C7 for deciding again whether or not the turning-under-control flag $F_C$ is set.

In the procedure described above, the turning-under-control flag $F_C$ is set at step C5, and therefore step C7 decides that the turning-under-control flag $F_C$ is set, so that the target drive torque $T_{OC(n)}$ computed presently at step C1 is employed directly as a target drive torque $T_{OC}$ for turning control.

Also in the case where step C6 decides that the steering angle neutral position learning-over flag $F_H$ is not set, or in the case where the step C7 decides that the turning-under-control flag $F_C$ is not set, then the target drive torque $T_{OC(n)}$ computed presently is not employed, but the TCI 76 produces the maximum torque of the engine 11 at step C9 as a target drive torque $T_{OC}$ for turning control, whereby the ECU 15 reduces the duty factor of the torque-controlling solenoid valves 51, 56 to 0% side, with the result that the engine 11 generates a drive torque commensurate with the amount of step-on of the accelerator pedal 31 by the driver.

If the step C3 decides that the target drive torque $T_{OC(n)}$ is not less than the threshold value $(T_d-2)$, on the other hand, the process is not passed to the turning control, but from step C6 or C7 to step C9, so that the TCL 76 produces a maximum torque of the engine 11 as a target drive torque $T_{OC}$, whereby the ECU 15 reduces the duty factor of the torque-controlling solenoid valves 51, 56 to 0% side, with the result the engine 11 generates a drive torque commensurate with the amount of step-on of the accelerator pedal 31 by the driver.

In similar fashion, also when step C4 decides that the idle switch 68 is on, that is, when the accelerator pedal 31 is not stepped on by the driver, the TCL 76 produces a maximum torque of the engine 11 as a target drive torque $T_{OC}$, whereby the ECU 15 reduces the duty factor of the torque-controlling solenoid valves 51, 56 to 0% side, with the result that the engine 11 generates a drive torque commensurate with the amount of step-on of the accelerator pedal 31 by the driver without transferring to the turning control.

In the case where said step C2 decides that the turning-under-control flag $F_C$ is set, step C10 decides whether or not the difference $\Delta T$ between the presently-computed target drive torque $T_{OC(n)}$ and the previously-computed target drive torque $T_{OC(n-1)}$ larger than a predetermined tolerable change T.. This tolerable change $T_K$ is an amount of torque change sufficiently small not to cause any feeling of acceleration or deceleration of the vehicle 82 by the passenger. In the case where it is desired to keep the target longitudinal acceleration $G_{XO}$ of the vehicle 82 to 0.1 g per second, for example, the value $T_K$ is given by use of the aforementioned equation (7) as $$T_K = 0.1 \cdot \frac{W_b \cdot r}{\rho_m \cdot \rho_d \cdot \rho_T} \cdot \Delta T$$

If said step C10 decides that the difference $\Delta T$ between the presently-computed target drive torque $T_{OC(n)}$ and the previously-computed drive torque $T_{OC(n-1)}$ is not larger than a predetermined tolerable change $T_K$, step C11 decides whether or not the difference $\Delta T$ between the presently-computed target drive torque $T_{OC(n)}$ and the previously-computed target drive torque $T_{OC(n-1)}$ is larger than a negative tolerable change $T_K$.

If step C11 decides that the difference $\Delta T$ between the presently-computed target drive torque $T_{OC(n)}$ and the previously-computed target drive torque $T_{OC(n-1)}$ is larger than the negative tolerable change $T_K$, then the presently-computed target drive torque $T_{OC(n)}$ is employed as it is, in view of the fact that the absolute value $|\Delta T|$ of the difference between the presently-computed target drive torque $T_{OC(n)}$ and the previously-computed drive torque $T_{OC(n-1)}$ is smaller than the tolerable change $T_K$.

Upon decision at step C11 that the difference $\Delta T$ between the presently-computed target drive torque $T_{OC(n)}$ and the previously-computed target drive torque $T_{OC(n-1)}$ is not larger than a negative tolerable change $T_K$, step C12 sets the present target drive torque $T_{OC(n)}$ by the following equation.

$$T_{OC(n)} = T_{OC(n-1)} - T_K$$

In other words, the magnitude of decrease from the previously-computed target drive torque $T_{OC(n-1)}$ is regulated by the tolerable change $T_K$, thereby alleviating the deceleration shock caused by a reduced drive torque of the engine 11.

If the step C10 decides that the difference $\Delta T$ between the presently-computed target drive torque $T_{OC(n)}$ and the previously-computed target drive torque $T_{OC(n-1)}$ exceeds the tolerable change $T_K$, on the other hand, step C13 sets the present target drive torque $T_{OC(n)}$ by the following equation:

$$T_{oc(n)} = T_{OC(n-1)} + T_K$$

Specifically, also in the case of an increased drive torque, as in the case of a decreased drive torque, the increment from the previously-computed target drive torque $T_{OC(n-1)}$ is regulated by the tolerable change $T_K$, if the difference $\Delta T$ between the presently-computed target drive torque $T_{OC(n)}$ and the previously-computed target drive torque $T_{OC(n-1)}$ is larger than the tolerable change $T_K$ thereby to alleviate the acceleration shock caused by an increased torque of the engine 11.

Once the target drive torque $T_{OC(n)}$ is set as described above, the TCL 76 decides, at step C14, whether or not the target drive torque $T_{OC(n)}$ thus set is larger than the drive torque T. demanded by the driver.

If the turning-under-control flag $F_C$ is set under this condition, it is indicative of the fact that the set target drive torque $T_{OC(n)}$ is not larger than the drive torque $T_d$ demanded by the driver, and therefore step C15 decides whether or not the idle switch 68 is turned on.

In the case where step C15 decides that the idle switch 68 is not on, it indicates that the turning control is required, and therefore the process proceeds to the step C6.

Also, in the case where said the C14 decides that the set target drive torque $T_{OC(n)}$ is larger than the drive torque $T_d$ demanded by the driver, on the other hand, it indicates that the turning of the vehicle 82 has ended. So, the TCL 76 resets the turning-under-control flag $F_c$ at step C16. In similar fashion, if step C15 decides that the idle switch 68 is on, it is an indication that the accelerator pedal 31 is not stepped on, and therefore the process is passed to step C16 thereby to reset the turning-under-control flag $F_c$.

Once step C16 resets the turning-under-control flag $F_C$, the TCL 76 produces a maximum torque of the engine 11 as a target drive torque $T_{OC}$ for turning control at step C9, whereby the ECU 15 reduces the duty factor of the torque-controlling solenoid valves 51, 56 to 0% side, whereby the engine generates a drive torque commensurate with the amount by which the accelerator pedal 31 is stepped on by the driver.

For simplifying the procedure for turning control, it is of course possible to ignore the driver's demand for the drive torque $T_d$, in which case the reference drive torque $T_B$ computable from the aforementioned equation (7) may be employed as a target drive torque. Also, when taking into consideration the drive torque $T_d$ demanded by the driver as in the present embodiment, the weighting factor $\alpha$ may not be fixed but may be gradually reduced with the lapse of time following the start of control, or with the vehicle speed V, while increasing the rate of employment of the demanded drive torque $T_d$ by the driver. In similar fashion, it is possible, as another alternative, to fix the value of the factor $\alpha$ for a predetermined length of time after starting the control followed by gradually reducing the same, or the factor $\alpha$ may be increased with the increase in the steering shaft turning amount $\delta_H$, so that the vehicle 82 may be driven safely especially against a curved path of a progressively decreased radius of curvature.

In the above-mentioned embodiment, the target drive torque only for a high-$\mu$ road was computed. Instead, target drive torques for turning control adapted to high-$\mu$ and low-$\mu$ roads may be computed respectively, and a final target drive torque may be selected therefrom with equal effect. Also, unlike in the above-mentioned method of operation where a target drive torque $T_{OC}$ is appropriately regulated by a tolerable change $T_K$ in computing the target drive torque $T_{OC}$ in order to prevent an acceleration or deceleration shock due to a sudden change in drive torque of the engine 11, such a regulating operation may also be applied to the target longitudinal acceleration $G_{XO}$.

After computing the target drive torque $T_{OC}$ for turning control in this way, the TCL 76 selects a final target drive torque $T_O$ from these two target drive torques $T_{OS}$, $T_{OC}$ and applies it to the ECU 15. In this process, priority is given to a target drive torque smaller in numerical value taking the running safety of the vehicle 82 into consideration. Generally, however, in view of the fact that the target drive torque $T_{OS}$ for slip control is always smaller than the target drive torque $T_{OC}$ for turning control, the final target drive torque $T_O$ is selected from the one for slip control and the one for turning control in that order.

Figure 34:
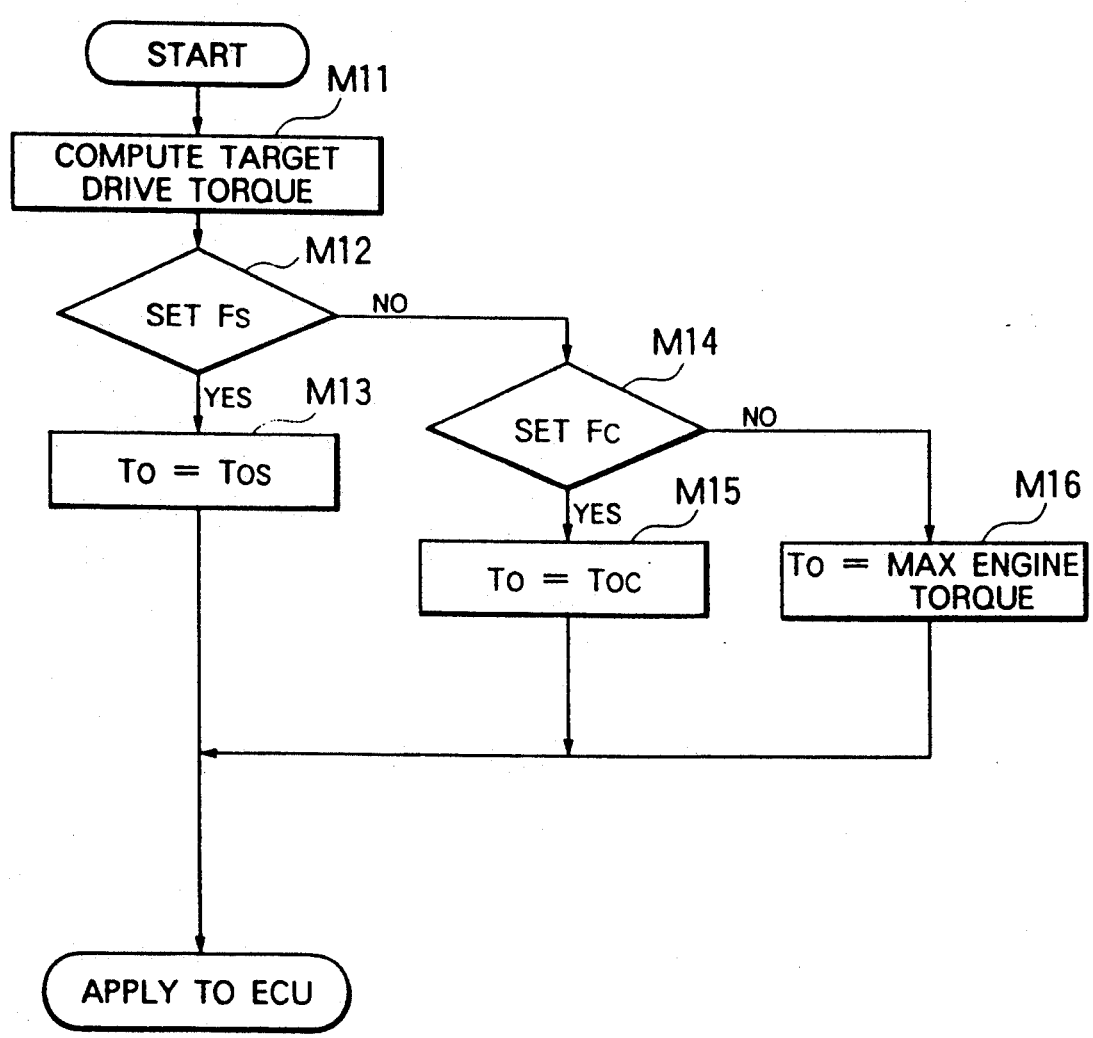
FIG. 34 is a flowchart showing a flow of selective operation of a final target torque.

This flow of processes is shown in FIG. 34. As seen from this diagram, step M11 computes the target drive torque $T_{OS}$ for slip control and the target drive torque $T_{OC}$ for turning control, followed by step M12 for deciding whether the slip-under-control flag $F_S$ is set or not, and if it is decided that the slip-under-control flag $F_S$ is set, the target drive torque $T_{OS}$ for slip control is selected as a final target drive torque $T_O$ at step M13 and is applied to the ECU 15.

If the decision at step M12 is that the slip-under-control flag $F_S$ is not set, by contrast, step M14 decides whether the turning-under-control flag $F_C$ is set or not, and ii the decision at step M14 is such that the turning-under-control flag $F_C$ is set, the target drive torque $T_{OC}$ for turning control is selected at M15 and applied to the ECU 15 as a final target drive torque $T_O$.

If the step M14 decides that the turning-under-control flag $F_C$ is not set, on the other hand, the TCL 76 applies the maximum torque of the engine 11 as a final target drive torque $T_O$ to the ECU 15 at step M16.

Apart from the selection of the final target drive torque $T_O$ as described above, the TCL 76 sets a retardation rate against the basic retardation $p_B$ of the ignition timing P set at the ECU 15 and applies the setting to the ECU 15, also in the case of such a sudden vehicle start as not to permit the output reduction of the engine in timing even by closing up the throttle valve 20 through the actuator 41 or when the road surface undergoes an abrupt change from a normal dry road to a frozen one.

Said basic retardation amount $p_B$ is such a maximum value of retardation angle as not to cause any adverse effect on the operation of the engine 11, and is set on the basis of the intake amount and the rotational speed $N_E$ of the engine 11. The present embodiment includes four settings of the retardation rate: 0 level in which the basic retardation angle $p_B$ is reduced to zero; I level in which the basic retardation angle $p_B$ is compressed to two thirds; II level in which the basic retardation angle $p_B$ is produced as it is; and III level in which the basic retardation angle $p_B$ is produced as it is while at the same time closing up the throttle valve 20. Basically, however, the retardation rate is selected in such a manner as to assure a retardation angle which increases with the increase in the change rate $G_S$ of the slip amount s.

Figure 35:
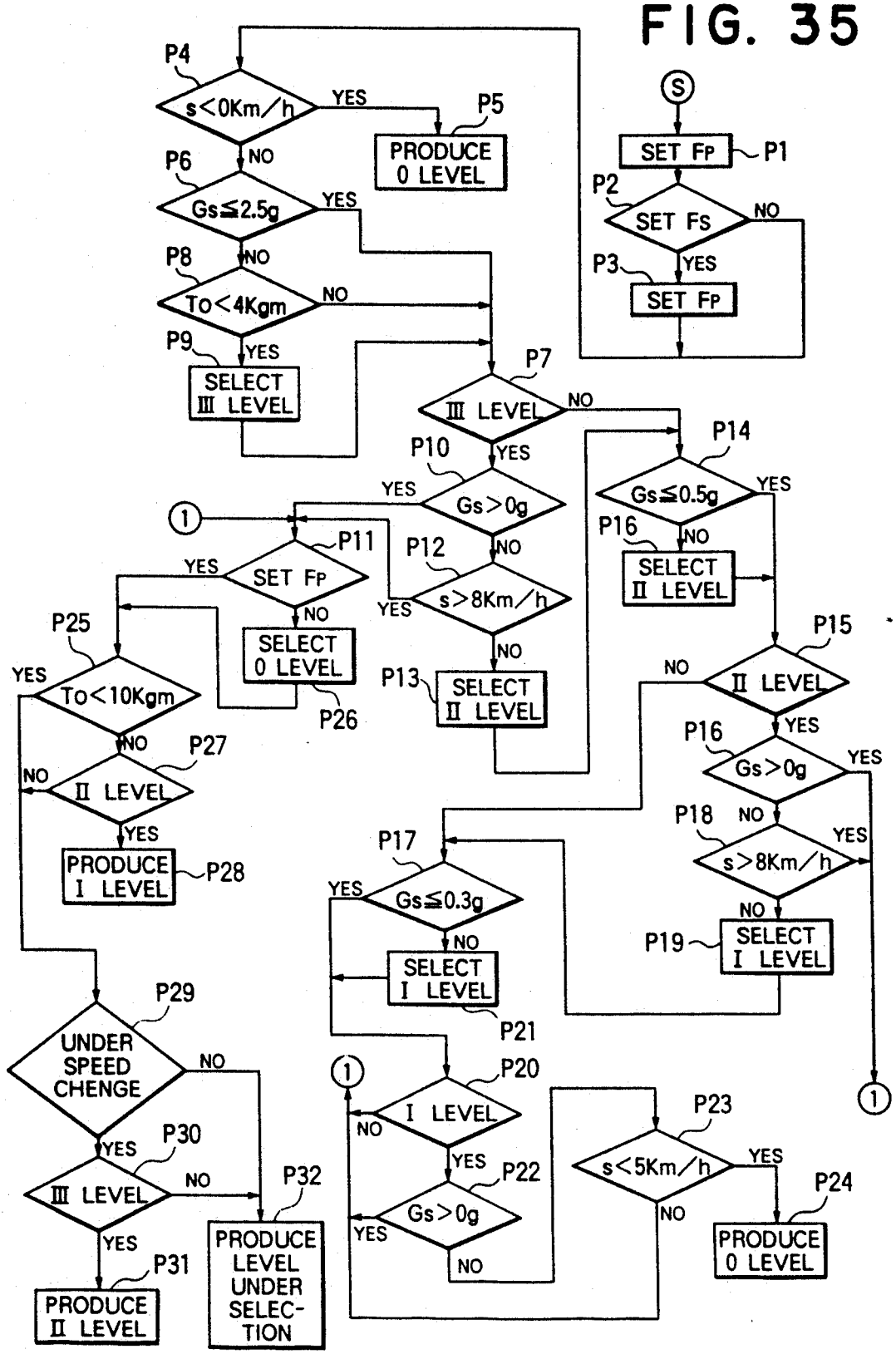
FIG. 35 is a flowchart showing a flow o selective operation of a retardation ratio.

The procedure for reading this retardation rate is shown in FIG. 35. As seen from this diagram, the TCL 76 first resets the ignition time-under-control flag $F_P$ at step P1, followed by step P2 for deciding whether or not the slip-under-control flag $F_S$ is set. If step P2 decides that the slip-under-control flag $F_S$ is set, the process proceeds to step P3 for setting the ignition timing-under-control flag $F_P$, followed by step P4 for deciding whether or not the slip amount s is less than 0 km per hour. In the case where step P2 decides that the slip-under-control flag F, is not set, on the other hand, the process is passed to said step P4.

If this step P4 decides that the slip amount s is less than 0 km per hour, that is, that no problem will be posed by increasing the drive torque of the engine 11, then step P5 sets the retardation rate to 0 level and applies the same level to the ECU 15. If the decision at this step P4 is such that the slip amount s is 0 km or more per hour, by contrast, step P6 decides whether or not the slip amount change rate $G_S$ is 2.5 g or less. In the case where the decision at step P6 is that the slip amount change rate $G_S$ is 2.5 g or less, then step P7 decides whether the retardation rate is III level or not.

If the step P6 decides that the slip change rate $G_S$ exceeds 2.5 g, that is, that the front wheels 64, 65 are slipping sharply, step P8 decides whether or not the final target drive torque $T_O$ is less than 4 kgm. In the case where it is decided that the final target drive torque $T_O$ is less than 4 kgm, that is, that the drive torque of the engine 11 is required to be dampened sharply, then step P9 sets the retardation rate to III level, and the process proceeds to the step P7. If step P8 decides that the final target drive torque $T_O$ is 4 kgm or more, by contrast, the process is passed directly to step P7.

If this step P7 decides that the retardation rate is III level, the process proceeds to step P10 for deciding whether or not the slip amount change rate $G_S$ exceeds 0 g or not. If the decision at step P10 is that the slip amount change rate $G_S$ exceeds 0 g, that is to say that the slip amount s is on up trend, step P11 decides whether the ignition timing-under-control flag F, is set or not. If step P10 decides that the slip amount change rate $G_S$ is 0 g or less, that is, that the slip amount s is on down trend, step P12 decides whether the slip amount s exceeds 8 km per hour or not.

In the case where this step P12 decides that the slip amount s exceeds 8 km per hour, the process is passed to said step P11, whereas if the decision is that the slip amount s is 8 km or less per hour step P13 switches the retardation rate from III to II level, followed by step P14 for deciding whether or not the slip amount change rate $G_S$ is 0.5 g or less. In similar manner, also in the case where said step P7 decides that the retardation rate is not III level, the process proceeds to this step P14.

In the case where this step P14 decides that the slip amount change rate $G_S$ is 0.5 g or less, i.e., that the slip amount change is not very sharp, step P15 decides whether the retardation rate is II level or not. If step P14 decides that the slip amount change rate $G_S$ is not 0.5 g or less, step P16 sets the retardation rate to II level, and the process proceeds to step P15.

In the event that this step P15 decides that the retardation rate is II level, step P16 decides whether the slip amount change rate $G_S$ exceeds 0 g or not, while if the decision is that the retardation rate is not II level, step P17 decides whether or not the slip amount change rate $G_S$ is 0.3 g or less. In the case where the step P16 decides that the slip amount change rate $G_S$ is not more than 0 g, i.e., that the slip amount s is on down trend, step P18 decides whether the slip amount s exceeds 8 km per hour or not. And if the decision at this step P18 is that the slip amount s is 8 km per hour or less, step P19 switches the retardation rate from II to I level, and the process is passed to the step P17. If the step P16 decides that the slip amount change rate $G_S$ is 0 g or more, on the other hand, that is to say, that the slip amount s is on up trend, or step P18 decides that the slip amount s exceeds 8 km per hour, that is to say, that the slip amount is large, then the process proceeds to the step P11 respectively.

If the step P17 decides that the slip amount change rate $G_S$ is 0.3 g or less, i.e., that the slip amount s is not substantially on up trend then step P20 decides whether or not the retardation rate is I level. In the case where step P17 decides that the slip amount change rate $G_S$ exceeds 0.3 g, i.e., that the slip amount s, though small, is on up trend, step P21 sets the retardation rate to I level.

In the case where step P20 decides that the retardation rate is I level, step P22 decides whether or not the slip amount change rate $G_S$ exceeds 0 g. If the decision is that the slip amount change rate $G_S$ is 0 g or less, that is, that the slip amount s is on down trend, step P23 decides whether or not the slip amount s is less than 5 km per hour. If step P23 decides that the slip amount s is less than 5 km per hour, that is, that the front wheels 64, 65 are not substantially slipping, step P24 sets the retardation rate to 0 level and applies the same level to the ECU 15. In the case where step P20 decides that the retardation rate is not I level or step P22 decides that the slip amount change rate $G_S$ exceeds 0 g, that is to say, that the slip amount s is on up trend, or step P23 decides that the slip amount s is 5 km per hour or more, that is, that the slip amount s is comparatively large, then in each of these cases, the process is passed to said step P11.

If this step P11 decides that the ignition timing-under-control flag F, is set, on the other hand, step P25 decides whether or not the final target drive torque $T_O$ is less than 10 kgm. If step P11 decides that the ignition timing-under-control flag $F_P$ is not set, by contrast, step P26 sets the retardation rate to 0 level, after which the process proceeds to step P25.

If this step P25 decides that the final target drive torque $T_O$ is 10 kgm or more, that is, that the engine 11 is generating a rather large driving power, then step P27 decides whether or not the retardation rate is II level. If the decision is that the retardation rate is II level, step P28 reduces the retardation rate to I level and applies it to the ECU 15.

In the case where the step P25 decides that the final target drive torque $T_O$ is less than 10 kgm, or step P27 decides that the retardation rate is not II level, then step P29 decides whether or not the hydraulic automatic transmission 13 is changing the speed. If it is decided that the hydraulic automatic transmission 13 is changing the speed, step P30 decides whether or not the retardation rate is III level. In the case where step P30 decides that the retardation rate is III level, step P31 reduces the retardation rate to II level and applies the same to the ECU 15. If step P29 decides that the hydraulic automatic transmission 13 is not changing the speed, or in the case where step P30 decides that the retardation rate is not III level, on the other hand, the retardation rate set previously at step P32 is applied as it is to the ECU 15.

In the case where step P9 sets the retardation rate to III level, or if it is decided that the slip amount change rate $G_S$ exceeds 0 g with the slip amount s exceeding 8 km per hour, that is, that the rate of increase of the slip amount s is so sharp that it is difficult to dampen the slip of the front wheels 64, 65 sufficiently by the mere operation of retarding the ignition timing as the final target drive torque $T_O$ is less than 10 kgm, then the retardation rate of III level is selected to forcibly close up the throttle valve 20, thereby efficiently dampening the slip in its initial stages of occurrence.

The aforementioned ECU 15 reads the ignition timing P and the basic retardation angle $p_S$ on the basis of detection signals produced by the crank angle sensor 62 and the air flow sensor 70 from a map (not shown) relating to the ignition timing P and the basic retardation angle $p_S$ set in advance according to the engine speed $N_S$ and the engine intake amount. The ignition timing P and the basic retardation angle $p_S$ thus read are corrected on the basis of the retardation rate sent from the TCL 76 thereby to compute a target retardation amount $p_O$. In the process, the high limit value of the target retardation $p_O$ is set in accordance with such a high limit of the exhaust gas temperature as not to damage an exhaust gas purification catalyst (not shown). The temperature of this exhaust gas is detected by a detection signal from an exhaust gas temperature sensor 74.

In the case where the cooling water temperature of the engine 11 detected by the water temperature sensor 71 is lower than a predetermined value, retardation of the ignition timing P is liable to induce a knocking or stall of the engine 11, and therefore the operation of retarding the ignition timing P described below is not implemented.

Figure 36:
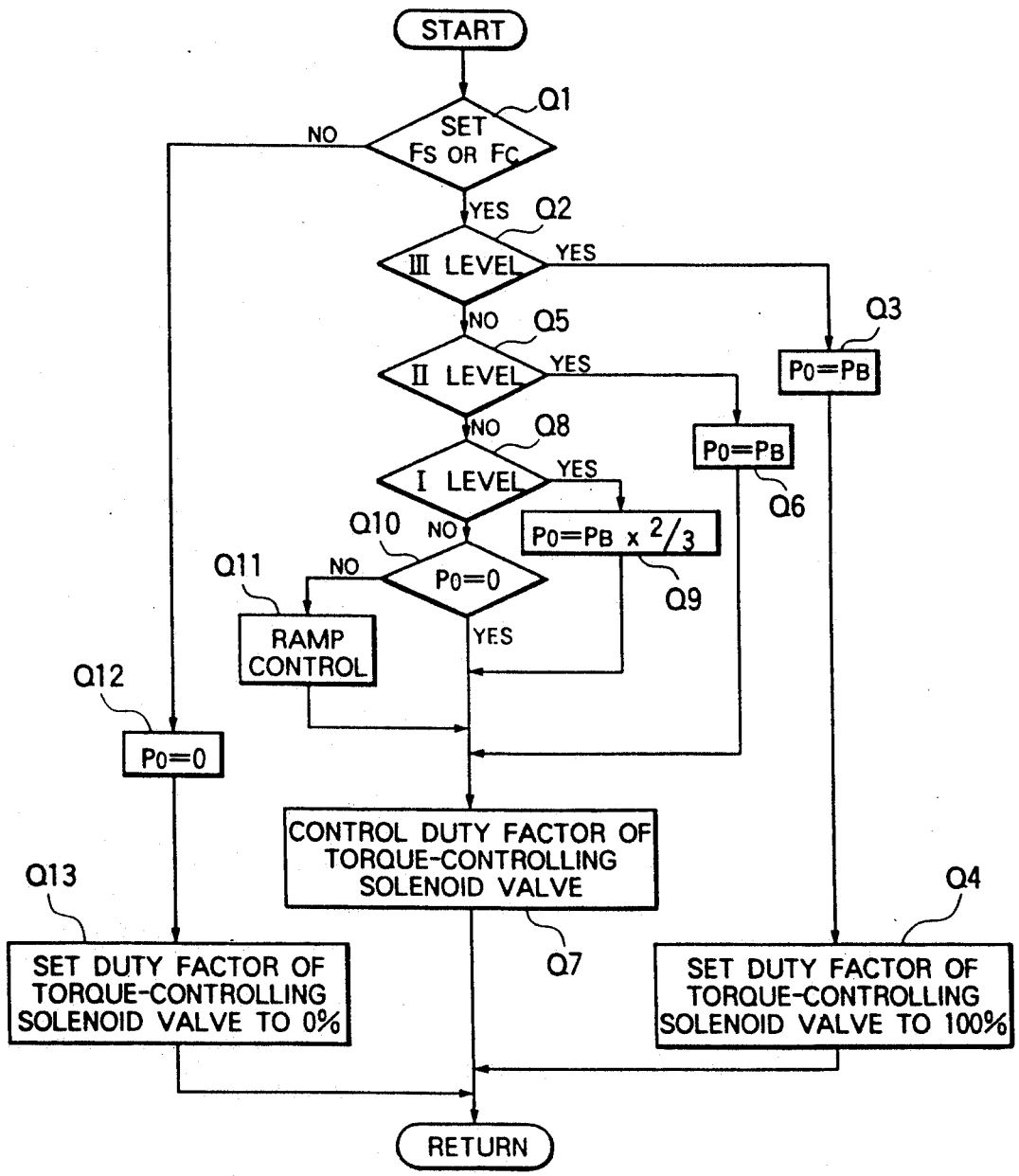
FIG. 36 is a flowchart showing the steps of output control of the engine.

The sequence of computation of the target retardation angle $p_O$ for this retardation control is shown in FIG. 36. First, the ECU 15 decides at step Q1 whether or not the aforementioned slip-under-control flag $F_S$ is set, and if it is decided that the slip-under-control flag $F_S$ is set, step Q2 decides whether the retardation rate is set to III level or not.

If this step Q2 decides that the retardation rate is set to III level, step Q3 uses the basic retardation angle $p_S$ read from the map as it is as a target retardation angle $p_O$, so that the ignition timing P is retarded by the target retardation amount $p_O$. Further, step Q4 sets the duty factor of the torque-controlling solenoid valves 51, 56 to 100% in such a manner that the throttle valve 20 may be closed up regardless of the value of the final target drive torque $T_O$, thereby forcibly realizing a closed-up state of the throttle valve 20.

In the case where step Q2 decides that the retardation rate is not III level, on the other hand, step Q5 decides whether the retardation rate is set to II level or not. If the decision at this step Q5 is that the retardation rate is II level, step Q6, like said step Q3, uses the basic retardation angle $p_B$ read from the map directly as the target retardation amount $p_O$, thereby retarding the ignition timing P by the target retardation amount $p_O$. Further, at step Q7, the ECU 15 sets the duty factor of the torque-controlling solenoid valves 51, 56 in accordance with the value of the target drive torque $T_{OS}$, thus reducing the drive torque of the engine 11 regardless of the amount of step-on of the accelerator pedal 31 by the driver.

The ECU 15 has stored therein a map for determining the throttle opening degree $\theta_T$ with the engine speed $N_E$ and the engine drive torque as a parameter. Using this map, the ECU 15 reads the target throttle opening degree $\theta_{TO}$ corresponding to the target drive torque $T_{OS}$ and the present engine speed $N_E$.

Then, the ECU 15 determines the error between this target throttle opening degree $\theta_{TO}$ and the actual throttle opening degree $\theta_T$ produced from the throttle opening sensor 67, and sets the duty factor of a pair of the torque-controlling solenoid valves 51, 56 to a value commensurate with the above-mentioned error. Thus, the solenoids for the plungers 52, 57 of the torque-controlling solenoid valves 51, 56 are supplied with a current, so that the operation of the actuator 41 is controlled to reduce the actual throttle opening degree $\theta^T$ to a target throttle opening degree $\theta_{TO}$.

In the case where the maximum torque of the engine 11 is applied to the ECU 15 as a target drive torque $T_{OS}$, the ECU 15 reduces the duty factor of the torque-controlling solenoid valves 51, 56 to 0% side, thereby generating a drive torque corresponding to the amount of step-on of the accelerator pedal 31 by the driver in the engine 11.

In the case where said step Q6 decides that the retardation rate is not II level, the process is passed to step Q8 for deciding whether or not the retardation rate is set to I level. If this step Q8 decides that the retardation rate is set to I level, the target retardation amount $p_O$ is set in the manner shown in the equation below, so that the ignition timing P is retarded by the target retardation amount $p_O$, followed by proceeding to said step Q7.

$$p_O = p_B \cdot \frac{2}{3}$$

In the case where said step Q8 decides that the retardation rate is not I level, on the other hand, step Q10 decides whether or not the target retardation $p_O$ is zero, and if the target retardation $p_O$ is zero, the process proceeds to step Q7 for not retarding the ignition timing P but setting the duty factor of the torque-controlling solenoid valves 51, 56 appropriately, thereby reducing the drive torque of the engine 11 without regard to the amount of step-on of the accelerator pedal 31 by the driver.

In the case where said step Q10 decides that the target retardation amount $p_O$ is not zero, on the other hand, step Q11 continues to reduce the target retardation $p_O$ at intervals of the sampling period $\Delta t$ of the main timer by ramp control in steps until $p_O$ decreases to zero, and after the shock caused by variations in the drive torque of the engine 11 is reduced, the process is passed to step Q7.

In the case where the aforementioned step Q1 decides that the slip-under-control flag $F_S$ is reset, the vehicle is subjected to normal running control without reducing the drive torque of the engine 11. Thus, without retarding the ignition timing P at step Q12 by setting $p_O$ to zero, step Q13 sets the duty factor of the torque-controlling solenoid valves 51, 56 to 0%, whereby the engine 11 generates a drive torque corresponding to the amount of step-on of the accelerator pedal 31 by the driver.

Figure 38:
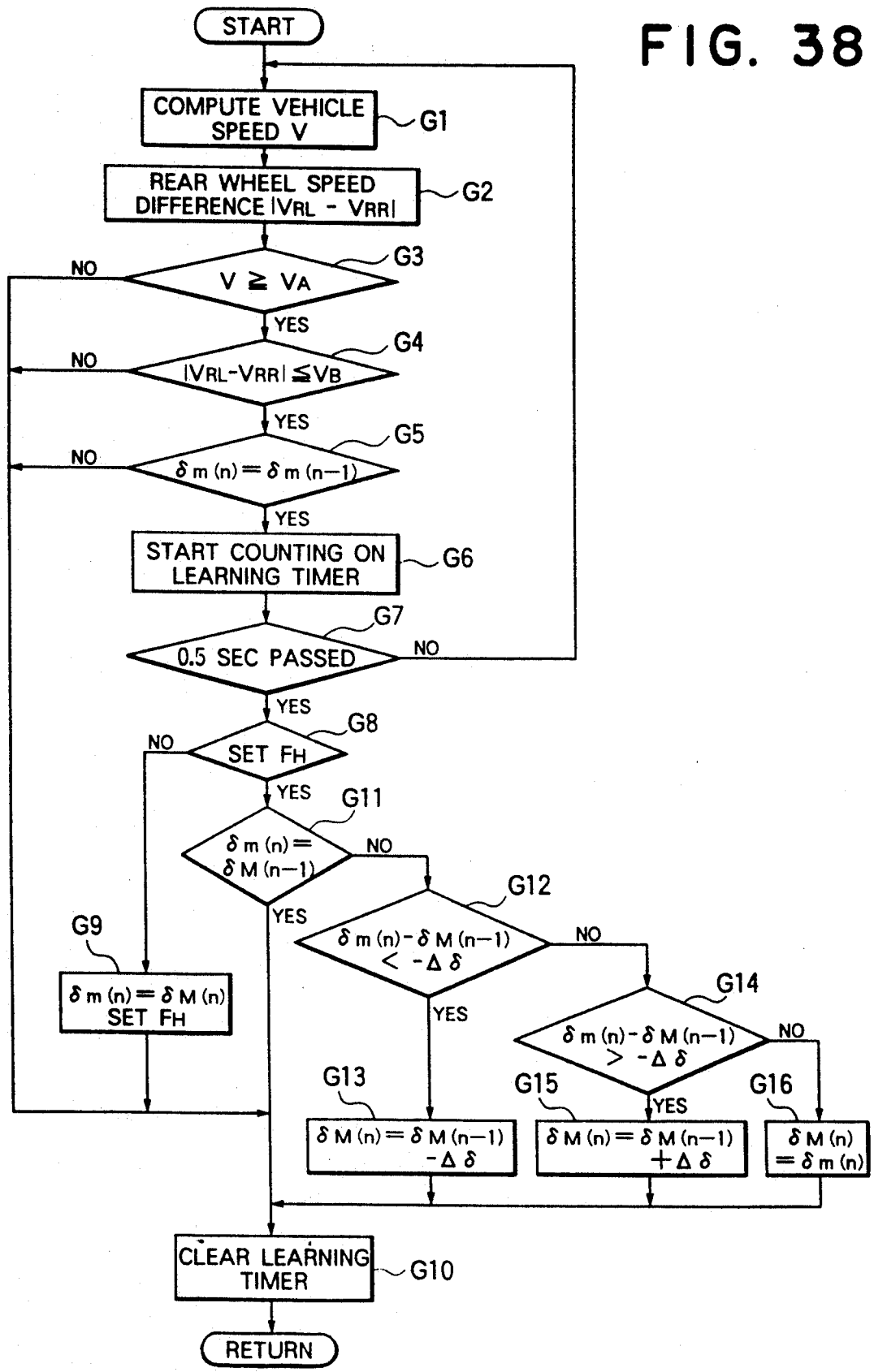
FIG. 38 is a flowchart representing a flow of correction control by learning of the neutral position of the steering shaft according to another embodiment of the present invention.

Another embodiment of the present invention has a simplified procedure shown in FIG. 38 for correction by learning of the neutral position $\delta_M$ of the steering shaft 83 shown in FIG. 5. Specifically, the TCL 76 computes the vehicle speed V from the aforementioned equation (1) at step G1 on the basis of the detection signal from the rear wheel rotational speed sensors 80, 81.

Next, the TCL 76 computes at step G2 the difference in peripheral speed (hereinafter referred to as "the rear wheel speed error") $|V_{RL}-V_{RR}|$ between a pair of the right and left rear wheels 78, 79.

After that the TCL 76 decides at step G3 whether or not the vehicle speed V is larger than a predetermined threshold value $V_A$. This operation is required because the rear wheel speed error $|V_{RL}-V_{RR}|$ or the like is incapable of being detected unless the vehicle speed 82 reaches a certain level. This threshold value $V_A$ is appropriately set to, say, 20 km per hour as indicated by experiments based on the running characteristics and the like of the vehicle 82.

In the case where it is decided that the vehicle speed V is not less than the threshold value $V_A$, the TCL 76 decides at step G4 whether or not the rear wheel speed error $|V_{RL}-V_{RR}|$ is smaller than a threshold value $V_B$, say, 0.1 km per hour, that is, whether the vehicle 82 is running straight or not. In the process, the threshold $V_B$ is not set to 0 km per hour in view of the fact that if the tires of the right and left rear wheels 78, 79 have no equal air pressure, the peripheral speeds $V_{RL}$, $V_{RR}$ of the right and left rear wheels 78, 79 would undesirably become different even when the vehicle 82 may be running straight.

If this step G4 decides that the rear wheel speed error $|V_{RL}-V_{RR}|$ is not more than the threshold value $V_B$, the TCL 76 decides at step G5 whether or not the present steering shaft turning position $\delta_{m(n)}$ is the same as the previous turning shaft turning position $\delta_{m(n-1)}$ detected by the steering angle sensor 84. In the process, in order to prevent the effect of a minor manual error or the like of the driver, the resolution of turning detection of the steering shaft 83 by the steering angle sensor 84 is desirably set to approximately to, say, five degree.

In the case where this step G5 decides that the present steering shaft turning position $\delta_{m(n)}$ is equal to the previous steering shaft turning position $\delta_{m(n-1)}$ then the TCL 76 decides at step G6 that the vehicle 82 is presently running straight and starts and continues to count on for, say, 0.5 seconds a learning timer (not shown) built therein.

As the next step, the TCL 76 decides at step G7 whether or not the time length of 0.5 seconds has passed since the starting of counting on the learning timer, that is, whether the vehicle 82 has continued to run straight for 0.5 seconds. In this case, in initial stages of running of the vehicle 82, the time length of 0.5 seconds has not passed from the starting of counting on the learning timer, and therefore steps G1 to G7 are repeated.

Upon deciding that it has passed 0.5 seconds since starting of counting on the learning timer, the TCL 76 decides at step G8 whether the steering angle neutral position learning-over flag $F_H$ is set or not, that is, whether the present learning is the first one or not.

If this step G8 decides that the steering angle neutral position learning-over flag $F_H$ is not set, step G9 sets the steering angle neutral position learning-over flag $F_H$ by regarding the present steering shaft turning position $\delta_{m(n)}$ as a new neutral position $\delta_{M(n)}$ the steering shaft 83 and reading this neutral position $\delta_{M(n)}$ into the memory of the TCL 76.

After the new neutral position $\delta_{M(n)}$ of the steering shaft 83 is set in this manner, the turning angle $\delta_H$ of the steering shaft 83 is computed on the basis of the neutral position $\delta_{M(n)}$ of the steering shaft 83 on the one hand, and step G10 clears the count of the learning timer in preparation for a repeated learning of the steering angle neutral position on the other.

In the case where said step G8 decides that the steering angle neutral position learning-over flag $F_H$ is set, that is, that the learning of the steering angle neutral position is a second or subsequent one, the TCL 76 decides at step G11 whether the present steering shaft turning position $\delta_{m(n)}$ is equal to the previous neutral position $\delta_{M(n-1)}$ of the steering shaft 83, that is, whether the relationship shown below holds.

$$\delta_{m(n)}=\delta_{M(n-1)}$$

And if the decision is that the present steering shaft turning position $\delta_{m(n)}$ is equal to the previous neutral position $\delta_{M(n-1)}$ of the steering shaft 83, the process is returned to step G10 directly in preparation for the next learning of the steering angle neutral position.

In the case where step G11 decides that the present steering shaft turning position $\delta_{m(n)}$ is not equal to the previous neutral position $\delta_{M(n-1)}$ of the steering shaft 83 due to the play of the steering system or the like, the present steering shaft turning position $\delta_{m(n)}$ is not determined to be the new neutral position $\delta_{M(n)}$ of the steering shaft 83. Instead, if the absolute value of the difference between the present steering shaft turning position $\delta_{m(n)}$ and the new neutral position $\delta_{M(n)}$ of the steering shaft 83 is displaced from each other by more than a predetermined correction limit $\Delta\delta$, the sum of or the difference between the previous neutral position $\delta_{M(n-1)}$ of the steering shaft 82 and the correction limit amount $\Delta\delta$ is employed as a new neutral position $\delta_{M(n)}$ of the steering shaft 83, which value is read into the memory of the TCL 76.

More specifically, the TCL 76 decides whether or not the present steering shaft turning position $\delta_{m(n)}$ less the previous neutral position $\delta_{M(n-1)}$ of the steering shaft 83 is smaller than a predetermined negative correction limit amount $-\Delta\delta$. If this step G12 decides that the difference is smaller than the negative correction limit amount $-\Delta\delta$, step G13 changes the new neutral position $\delta_{M(n)}$ of the steering shaft 83 on the basis of the previous neutral position $\delta_{M(n-1)}$ of the steering shaft 83 and the negative correction limit $-\Delta\delta$, in the manner $$\delta_{M(n)}=\delta_{M(n-1)}-\Delta\delta$$

thereby assuring that each amount of correction by learning does not unconditionally increase to negative side.

As a result, should an abnormal detection signal be produced from the steering angle sensor 84 for some reason or other, the neutral position $\delta_M$ of the steering shaft 83 is prevented from undergoing a sudden change, thus assuring a prompt measure against a fault.

In the case where it is decided that the difference obtained at step G12 is larger than the negative correction limit amount $-\Delta\delta$, by contrast, step G14 decides whether or not the present steering shaft turning position $\delta_{m(n)}$ less the previous neutral position $\delta_{M(n-1)}$ of the steering shaft 83 is larger than the positive correction limit amount $\Delta\delta$. If it is decided that the difference obtained at this step G14 is larger than the positive correction limit amount Δδ step G15 changes the new neutral position $\delta_{M(n)}$ of the steering shaft 83 as shown below on the basis of the previous neutral position $\delta_{M(n-1)}$ of the steering shaft 83 and the positive correction limit amount Δδ.

$$\delta_{M(n)} = \delta_{M(n-1)} + \Delta\delta$$

It is thus assured to prevent each amount of correction by learning from being increased unconditionally toward positive side.

As a consequence, even if an abnormal detection signal is produced from the steering angle sensor 84 for some reason or not, the neutral position $\delta_M$ of the steering shaft 83 is not changed abruptly, thereby meeting the fault in rapid action.

In the case where step G14 decides that the difference is smaller than the positive correction limit amount Δδ, however, step G16 reads the present steering shaft turning position $\delta_{m(n)}$ directly as a new neutral position $\delta_{M(n)}$ of the steering shaft 83.

Thus, in the case of starting the vehicle 82 from a stationary position with the front wheels 64, 65 turned, although the correction from the initial value $\delta_{m(0)}$, of the steering shaft turning position at the aforementioned step M1 is considerable in the first learning control of the neutral position $\delta_M$ of the steering shaft 83 as shown in FIG. 7 representing the change involved of the neutral position $\delta_M$ of the steering shaft 83, the correction of the neutral position $\delta_M$ of the steering shaft 83 for the second and subsequent learning controls is suppressed by the operation at steps G13 and G14.

In this way, the neutral position $\delta_M$ of the steering shaft 83 is corrected by learning.

It will thus be understood from the foregoing description that in a method of learning the neutral position of the vehicle steering angle according to the present invention, the neutral position of the steering angle is learned by the running speed, the difference in rotational speed between the right and left driven wheels and the time covered by running, so that an error, if any, between the turning angle of the steering wheel and the actual steering angle due to toe-in adjustment or secular variations is automatically corrected. As a result, the driving power is capable of being controlled with high accuracy for an improved maneuvering stability.

Also, even when the steering shaft reference position sensor fails to detect a reference position, second neutral position decision means is available for deciding a neutral position.

Further, in view of the fact that second and subsequent learning correction amounts are suppressed to a predetermined amount, the neutral position is not changed abruptly, thereby maintaining a high stability.

We claim:

1. A method of learning a neutral position of a vehicle steering angle, comprising:
   detecting a reference position of a steering shaft by a steering shaft reference position sensor;
   detecting a turning angle of said steering shaft by a steering angle detection means;
   detecting the peripheral speeds of right and left driven wheels of the vehicle and a running speed of the vehicle by running speed detection means; and
   deciding said neutral position of said steering angle by first neutral position decision means, said first neutral position decision means deciding said neutral position of said steering angle wherein the following four criteria are satisfied, first, when said vehicle running speed is not less than a first predetermined threshold value, second, when a difference in peripheral speed between said right and left driven wheels is smaller than a second predetermined threshold value; third, when said steering shaft reference position sensor continues to detect said reference position of said steering shaft within a predetermined range for at least a first count time and fourth, when said steering angle detection means continues to detect substantially the same turning angle for at least said first count time.

2. A method according to claim 1, wherein deciding said neutral position of said steering angle further comprises deciding said neutral position by second neutral position decision means, said second neutral position decision means deciding said neutral position of said steering angle wherein the following three criteria are satisfied, first, when said vehicle running speed is not less than said first predetermined threshold value, second, when said difference between peripheral speeds of said right and left driven wheels is smaller than a third predetermined threshold value and third, when said second condition that said difference between the peripheral speeds of said right and left driven wheels is smaller than said third predetermined threshold value continues to be detected for at least a second count time, and
   selectively using said first neutral position decision means and said second neutral position decision means.

3. A method according to claim 1, where said second predetermined threshold value is changed in accordance with said vehicle running speed.

4. A method according to claim 1, wherein said neutral position of said steering angle obtained by a previous learning is changed only up to a predetermined maximum amount in second and subsequent learnings of said neutral position.

5. An apparatus for learning a neutral position of a vehicle steering angle, comprising:
   a steering shaft reference position sensor for detecting a reference position of a steering shaft;
   running speed detection means for detecting peripheral speeds of right and left driven wheels of the vehicle and a running speed of the vehicle;
   steering angle detection means for detecting a turning angle of said steering shaft; and
   a first neutral position decision means for deciding on said neutral position, said first neutral position decision means deciding said neutral position of said steering angle wherein the following four criteria are satisfied, first, when said running speed detection means detects that said vehicle running speed is not less than a first predetermined threshold value, second, that a difference in peripheral speed between said right and left driven wheels is smaller than a second predetermined threshold value, third, when said steering shaft reference position sensor continues to detect a reference position of said steering shaft within a predetermined range for at least a first count time and fourth, when said steering angle detection means continues to detect substantially the same turning angle for at least said first count time.

6. An apparatus according to claim 5, further comprising a second neutral position decision means connected in parallel to said first neutral position decision means for deciding on said neutral position when the following three criteria are satisfied, first, when said running speed detection means detects that said vehicle running speed is not less than said first predetermined threshold value, second, when said difference between peripheral speeds of said right and left driven wheels is smaller than a third predetermined threshold value and third, that said difference in peripheral speed between said right and left driven wheels continues to be smaller than said third predetermined threshold value for at least a second count time, and means for selecting one of said first neutral position decision means and said second neutral position decision means.

7. An apparatus according to claim 5, wherein said first neutral position decision means includes therein means for changing said second predetermined threshold value in accordance with said vehicle running speed.

8. An apparatus according to claim 5, further comprising means for preventing said neutral position of said steering shaft from being changed by more than a predetermined maximum amount as compared with a steering shaft neutral position determined by a previous learning in second and subsequent processes of learning of said neutral position.

9. A method of learning a neutral position of a vehicle steering angle, comprising:
  detecting a reference position of a steering shaft within a predetermined range;
  detecting a turning angle of said steering shaft;
  detecting peripheral speeds of right and left driven wheels of the vehicle and a running speed of the vehicle; and
  deciding a neutral position of said steering angle when the following four criteria are satisfied, first, when said vehicle running speed is not less than a first predetermined threshold value, second, when a difference in peripheral speed between said right and left driven wheels is smaller than a second predetermined threshold value, third, when said detection of said reference position of said steering shaft within a predetermined range continues for at least a first count time and fourth, when said detected turning angle remains unchanged for said first count time.

10. A method according to claim 9, further comprising:
  deciding a neutral position of said steering angle when the following three criteria are satisfied, first, when said vehicle running speed is not less than said first predetermined threshold value, second, when said difference in peripheral speed between said right and left driven wheels is smaller than a third predetermined threshold value and third, when said difference in peripheral speed between said right and left driven wheels continues to be smaller than said third predetermined threshold value for at least a second count time.

11. A method according to claim 9, further comprising:
  changing said second predetermined threshold value in accordance with said vehicle running speed.

12. A method according to claim 9, wherein said neutral position of said steering angle obtained by a previous learning is changed only up to a predetermined maximum amount in second and subsequent learnings of said neutral position.

* * * * *

UNITED STATES PATENT AND TRADEMARK OFFICE
CERTIFICATE OF CORRECTION

PATENT NO. : 5,253,172                                      Page 1 of 4
DATED       : October 12, 1993
INVENTOR(S) : Masayoshi Ito, Kiichi Yamada, Katsunori Otake, Yasunobu Miyata and Masayuki Hashiguchi It is certified that error appears in the above-indentified patent and that said Letters Patent is hereby corrected as shown below:

Cover page, under References Cited, OTHER PUBLICATIONS, "application" should read --applications--
and under U.S. PATENT DOCUMENTS, add --4,722,545 2/1988 Gretz et al. ... 180/79X--
and after U.S. PATENT DOCUMENTS listing, insert --FOREIGN PATENT DOCUMENTS 0015270 1/1985 Japan ... 180/79--.

Column 4 Line 12 "rate:" should read --rate;--.

Column 4 Line 59 "earning" should read --learning--.

Column 4 Line 65 "o" should read --of--.

Column 5 Line 19 after "13" insert --of oil-hydraulic type--.

Column 5 Line 20 after "13" delete "of oil-hydraulic type".

Column 7 Line 60 "s" should read --a--.

Column 9 Line 25 "o" should read --of--.

UNITED STATES PATENT AND TRADEMARK OFFICE
CERTIFICATE OF CORRECTION

PATENT NO. : 5,253,172

DATED : October 12, 1993

INVENTOR(S) : Masayoshi Ito, Kiichi Yamada, Katsunori Otake, Yasunobu Miyata and Masayuki Hashiguchi It is certified that error appears in the above-indentified patent and that said Letters Patent is hereby corrected as shown below:

Column 10 Line 2 "Is" should read --is--.

Column 10 Line 5 "show" should read --shown--.

Column 11 Line 39 "-the" should read --the--.

Column 11 Line 66 after "rear" insert --wheel--.

Column 12 Line 13 after "shown)" delete "shown".

Column 12 Line 32 "It" should read --it--.

Column 18 Line 8 "$G_{XF(n-1}$" should read --$G_{XF(n-1)}$--.

Column 20 Line 45 "base" should read --case--.

Column 24 Line 27 "$T_{PID}$" should read --$T_B$--.

Column 28 Line 31 "(A=0.002)." should read --(A=0.002),--.

UNITED STATES PATENT AND TRADEMARK OFFICE
CERTIFICATE OF CORRECTION

PATENT NO. : 5,253,172

DATED : October 12, 1993

INVENTOR(S) : Masayoshi Ito, Kiichi Yamada, Katsunori Otake, Yasunobu Miyata and Masayuki Hashiguchi It is certified that error appears in the above-indentified patent and that said Letters Patent is hereby corrected as shown below:

Column 29 Line 2 "ICL" should read --TCL--.

Column 31 Line 61 "θ" should read --$\theta_A$--.

Column 34 Line 20 before "larger" insert --is--.

Column 34 Line 21 "T.." should read --$T_K$--.

Column 35 Line 21 "T." should read --$T_d$--.

Column 35 Line 31 "said the C14" should read --the step C14--.

Column 36 Line 38 "ii" should read --if--.

Column 36 Line 56 "Said" should read --The--.

Column 37 Line 43 "F," should read --$F_P$--.

Column 38 Line 13 after "amount" insert --s--.

UNITED STATES PATENT AND TRADEMARK OFFICE
CERTIFICATE OF CORRECTION

PATENT NO. : 5,253,172
DATED : October 12, 1993
INVENTOR(S) : Masayoshi Ito, Kiichi Yamada, Katsunori Otake, Yasunobu Miyata and Masayuki Hashiguchi It is certified that error appears in the above-indentified patent and that said Letters Patent is hereby corrected as shown below:

Column 38 Line 42 "F," should read --$F_P$--.

Column 39 Line 15 "$P_S$" should read --$P_B$--.

Column 39 Line 19 "$P_S$" should read --$P_B$--.

Column 39 Line 20 "$N_S$" should read --$N_E$--.

Column 39 Line 21 "$P_S$" should read --$P_B$--.

Column 40 Line 11 "51. 56" should read --51, 56--.

Column 40 Line 41 "ii" should read --if--.

Claim 3 Line 33 Column 44 "where" should read --wherein--.

Signed and Sealed this

Fourteenth Day of June, 1994

Attest:

Attesting Officer

BRUCE LEHMAN

Commissioner of Patents and Trademarks